US 9,294,634 B2

(12) United States Patent
Fagans et al.

(10) Patent No.: US 9,294,634 B2
(45) Date of Patent: Mar. 22, 2016

(54) APPLICATION FOR DESIGNING PHOTO ALBUMS

(75) Inventors: Joshua Fagans, Redwood City, CA (US); Eric Hanson, Emeryville, CA (US); Jeff Robbin, Los Altos, CA (US); Timothy B Martin, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 1155 days.

(21) Appl. No.: 13/230,818

(22) Filed: Sep. 12, 2011

(65) Prior Publication Data

US 2012/0109776 A1    May 3, 2012

Related U.S. Application Data

(63) Continuation of application No. 11/032,322, filed on Jan. 9, 2005, now Pat. No. 8,024,658.

(51) Int. Cl.
*G06Q 30/06* (2012.01)
*H04N 1/00* (2006.01)

(52) U.S. Cl.
CPC ....... *H04N 1/00132* (2013.01); *G06Q 30/0621* (2013.01); *H04N 1/00137* (2013.01); *H04N 1/00145* (2013.01); *H04N 1/00159* (2013.01); *H04N 1/00164* (2013.01); *H04N 1/00167* (2013.01); *H04N 1/00185* (2013.01); *H04N 1/00188* (2013.01); *H04N 1/00196* (2013.01); *H04N 1/00198* (2013.01)

(58) Field of Classification Search
USPC ......... 715/243, 246, 700, 730, 743, 776, 810, 715/828; 345/156, 419; 705/26.5
See application file for complete search history.

(56) References Cited

U.S. PATENT DOCUMENTS

| 4,723,209 | A | 2/1988 | Hernandez et al. |
| 5,416,900 | A | 5/1995 | Blanchard et al. |
| 5,553,225 | A | 9/1996 | Perry |
| 5,666,215 | A | 9/1997 | Fredlund et al. |
| 5,706,097 | A | 1/1998 | Schelling et al. |
| 5,706,457 | A | 1/1998 | Dwyer et al. |
| 5,751,287 | A | 5/1998 | Hahn et al. |
| 5,835,094 | A | 11/1998 | Ermel et al. |

(Continued)

OTHER PUBLICATIONS

Portions of Prosecution History of U.S. Appl. No. 11/272,258, filed Jul. 1, 2010 Reid, Glenn, et al.

(Continued)

*Primary Examiner* — Doon Chow
*Assistant Examiner* — Wendy Nicholas
(74) *Attorney, Agent, or Firm* — Adeli LLP

(57) ABSTRACT

Some embodiments of the invention provide a computer-based application that allows its users to insert their pictures in a variety of different photo books. Each photo book has several pages that have one or more picture fields for presenting pictures. Different photo books can differ in their size, themes, covers, page designs, page colors, picture-field designs, picture-field layouts, and/or other attributes. In some embodiments, the application also allows the users to modify photo books that they select. For instance, a user can modify the page design, color, frame design, and/or other thematic aspects of a selected photo books. Also, in some embodiments, the user can add picture and text fields to the photo book. Once the user has completed designing the photo book and inserting pictures in the photo book, the user can order the photo book through an online transaction that is initiated through the application.

18 Claims, 72 Drawing Sheets

(56) References Cited

U.S. PATENT DOCUMENTS

| | | | |
|---|---|---|---|
| 5,838,317 A | 11/1998 | Bolnick et al. | |
| 5,943,050 A | 8/1999 | Bullock et al. | |
| 5,959,624 A | 9/1999 | Johnston, Jr. et al. | |
| 5,978,016 A | 11/1999 | Lourette et al. | |
| 5,986,670 A | 11/1999 | Dries et al. | |
| 6,026,433 A * | 2/2000 | D'Arlach et al. | 709/217 |
| 6,028,603 A * | 2/2000 | Wang | G06F 3/0483 707/E17.026 |
| 6,073,161 A | 6/2000 | DeBoskey et al. | |
| 6,097,389 A | 8/2000 | Morris et al. | |
| 6,111,573 A | 8/2000 | McComb et al. | |
| 6,111,586 A | 8/2000 | Ikeda et al. | |
| 6,151,421 A | 11/2000 | Yamada | |
| 6,154,755 A | 11/2000 | Dellert et al. | |
| 6,181,838 B1 | 1/2001 | Knowlton | |
| 6,202,061 B1 | 3/2001 | Khosla et al. | |
| 6,237,010 B1 | 5/2001 | Hui et al. | |
| 6,301,586 B1 * | 10/2001 | Yang et al. | |
| 6,324,545 B1 | 11/2001 | Morag | |
| 6,335,742 B1 | 1/2002 | Takemoto | |
| 6,362,900 B1 | 3/2002 | Squilla et al. | |
| 6,424,385 B1 | 7/2002 | Koyama et al. | |
| 6,431,448 B1 | 8/2002 | Nelson et al. | |
| 6,453,078 B2 | 9/2002 | Bubie et al. | |
| 6,557,017 B1 | 4/2003 | Venable | |
| 6,574,636 B1 | 6/2003 | Balon et al. | |
| 6,601,057 B1 | 7/2003 | Underwood et al. | |
| 6,620,206 B1 | 9/2003 | Seaman et al. | |
| 6,629,104 B1 | 9/2003 | Parulski et al. | |
| 6,636,648 B2 | 10/2003 | Loui et al. | |
| 6,714,209 B2 | 3/2004 | Van Valer | |
| 6,727,909 B1 * | 4/2004 | Matsumura et al. | 345/629 |
| 6,747,674 B1 | 6/2004 | Asami | |
| 6,771,801 B1 * | 8/2004 | Fisher et al. | 382/112 |
| 6,781,610 B2 | 8/2004 | Van Os et al. | |
| 6,784,925 B1 | 8/2004 | Tomat et al. | |
| 6,813,746 B1 | 11/2004 | O'Shea | |
| 6,833,848 B1 * | 12/2004 | Wolff et al. | 715/719 |
| 6,850,247 B1 | 2/2005 | Reid et al. | |
| 6,856,422 B1 | 2/2005 | Higashibata et al. | |
| 6,912,327 B1 | 6/2005 | Hori et al. | |
| 6,915,273 B1 * | 7/2005 | Parulski | 705/26.5 |
| 6,970,185 B2 | 11/2005 | Halverson | |
| 7,003,723 B1 | 2/2006 | Kremer et al. | |
| 7,020,663 B2 * | 3/2006 | Hay et al. | 434/317 |
| 7,148,990 B2 | 12/2006 | Atkins et al. | |
| 7,188,310 B2 | 3/2007 | Schwartzkopf | |
| 7,190,473 B1 * | 3/2007 | Cook et al. | 358/1.15 |
| 7,243,079 B1 | 7/2007 | Manolis et al. | |
| 7,289,132 B1 | 10/2007 | Reid et al. | |
| 7,299,268 B2 | 11/2007 | Kuroiwa et al. | |
| 7,394,562 B2 | 7/2008 | Nakagiri et al. | |
| 7,411,578 B2 | 8/2008 | Shuhami | |
| 7,469,380 B2 | 12/2008 | Wessling et al. | |
| 7,546,544 B1 | 6/2009 | Weber et al. | |
| 7,586,524 B2 | 9/2009 | Tsue et al. | |
| 7,629,984 B2 | 12/2009 | Reid et al. | |
| 7,710,439 B2 | 5/2010 | Reid et al. | |
| 7,768,535 B2 | 8/2010 | Reid et al. | |
| 7,970,240 B1 * | 6/2011 | Chao et al. | 382/305 |
| 8,013,874 B2 | 9/2011 | Reid et al. | |
| 8,024,658 B1 | 9/2011 | Fagans et al. | |
| 8,184,130 B2 | 5/2012 | Reid et al. | |
| 8,330,844 B2 | 12/2012 | Reid et al. | |
| 8,416,265 B2 | 4/2013 | Reid et al. | |
| 8,487,964 B2 | 7/2013 | Reid et al. | |
| 2001/0020956 A1 | 9/2001 | Moir | |
| 2001/0035875 A1 * | 11/2001 | Suzuki et al. | 345/723 |
| 2001/0039552 A1 | 11/2001 | Killi et al. | |
| 2001/0042084 A1 | 11/2001 | Seaman | |
| 2001/0046330 A1 | 11/2001 | Shaffer et al. | |
| 2001/0056434 A1 | 12/2001 | Kaplan et al. | |
| 2002/0000998 A1 | 1/2002 | Scott et al. | |
| 2002/0019833 A1 | 2/2002 | Hanamoto | |
| 2002/0032696 A1 | 3/2002 | Takiguchi et al. | |
| 2002/0040375 A1 | 4/2002 | Simon et al. | |
| 2002/0054059 A1 | 5/2002 | Schneiderman | |
| 2002/0054300 A1 | 5/2002 | Trenz | |
| 2002/0057272 A1 | 5/2002 | Hamada et al. | |
| 2002/0069127 A1 | 6/2002 | Enari | |
| 2002/0070982 A1 * | 6/2002 | Hill et al. | 345/835 |
| 2002/0097250 A1 | 7/2002 | Fukushima et al. | |
| 2002/0113994 A1 | 8/2002 | Smith, II et al. | |
| 2002/0122067 A1 * | 9/2002 | Geigel | G06F 17/30265 715/788 |
| 2002/0126149 A1 | 9/2002 | Umeda | |
| 2002/0145614 A1 | 10/2002 | Van Valer | |
| 2002/0186402 A1 * | 12/2002 | Jackson et al. | 358/1.15 |
| 2003/0052897 A1 | 3/2003 | Lin | |
| 2003/0055871 A1 | 3/2003 | Roses | |
| 2003/0063770 A1 | 4/2003 | Svendsen et al. | |
| 2003/0072486 A1 * | 4/2003 | Loui | G06T 11/60 382/175 |
| 2003/0078994 A1 | 4/2003 | Ishizuka | |
| 2003/0090493 A1 | 5/2003 | Masuda et al. | |
| 2003/0108241 A1 | 6/2003 | Colmenarez et al. | |
| 2003/0128389 A1 | 7/2003 | Matraszek et al. | |
| 2003/0210429 A1 * | 11/2003 | Yamashita | 358/1.18 |
| 2004/0046788 A1 | 3/2004 | Keane et al. | |
| 2004/0100486 A1 | 5/2004 | Flamini et al. | |
| 2004/0133924 A1 | 7/2004 | Wilkins et al. | |
| 2004/0174563 A1 * | 9/2004 | Cassidy, Jr. | H04N 1/3873 358/1.18 |
| 2004/0175764 A1 * | 9/2004 | Nishiyama et al. | 435/7.2 |
| 2004/0179115 A1 | 9/2004 | Tomat et al. | |
| 2004/0201715 A1 | 10/2004 | Ishimura et al. | |
| 2004/0250205 A1 * | 12/2004 | Conning | 715/517 |
| 2005/0057576 A1 * | 3/2005 | Shen et al. | 345/619 |
| 2005/0091599 A1 | 4/2005 | Yamakado et al. | |
| 2005/0149969 A1 | 7/2005 | Kumar et al. | |
| 2005/0166159 A1 | 7/2005 | Mondry et al. | |
| 2005/0225799 A1 | 10/2005 | Berarducci et al. | |
| 2005/0261979 A1 | 11/2005 | Cohen | |
| 2005/0278625 A1 | 12/2005 | Wessling et al. | |
| 2006/0103891 A1 * | 5/2006 | Atkins | 358/450 |
| 2006/0109516 A1 * | 5/2006 | Catalan et al. | 358/302 |
| 2006/0109517 A1 | 5/2006 | Catalan | |
| 2006/0181736 A1 | 8/2006 | Quek et al. | |
| 2007/0180374 A1 | 8/2007 | Gormish | |
| 2008/0007625 A1 | 1/2008 | Reid et al. | |
| 2008/0111829 A1 | 5/2008 | Reid et al. | |
| 2008/0270930 A1 | 10/2008 | Slosar | |
| 2010/0037128 A1 | 2/2010 | Reid et al. | |
| 2011/0292073 A1 | 12/2011 | Reid et al. | |
| 2011/0296326 A1 | 12/2011 | Reid et al. | |
| 2012/0017154 A1 | 1/2012 | Fagans et al. | |

OTHER PUBLICATIONS

Portions of Prosecution History of U.S. Appl. No. 12/498,354, filed Dec. 28, 2011 Reid, Glenn, et al.

Portions of Prosecution History of U.S. Appl. No. 11/032,322, filed Jul. 25, 2011 Fagans, Joshua, et al.

Author Unknown, "Adobe Photoshop Version 6.0—New Feature Highlights, Mac OS 8.5, 8.6, and 9.0/Windows 98/Windows NT 4.0/Windows 2000," Month Unknown, 2000, Adobe Systems Incorporated, San Jose, California, USA.

Author Unknown, "Step by Step Microsoft FrontPage," Month Unknown, 2001, version 2002, pp. 35-39, Microsoft Press, WA, USA.

Bunzel, Tom, "Sams Teach Yourself Microsoft Office PowerPoint 2003 in 24 hours," Sep. 2003, pp. 1-6.

Bunzel, Tom, "Sams Teach Yourself Microsoft Office PowerPoint 2003 in 24 hours," Sep. 2003, pp. L1, L2.

Chastain, Sue, "How to Remove Red Eye in Photoshop (any Version)" printed on Apr. 7, 2011, p. 1, About.com, Graphics Software.

Millhollon, Mary et al., Microsoft Office Word 2003 Inside Out, Nov. 5, 2003, Microsoft Press.

Updated portions of Prosecution History of U.S. Appl. No. 12/498,354, filed May 14, 2012, Reid, Glenn, et al.

(56) References Cited

OTHER PUBLICATIONS

Updated portions of Prosecution History of U.S. Appl. No. 12/498,354, filed Jun. 14, 2012, Reid, Glenn, et al.

Portions of Prosecution History of U.S. Appl. No. 13/184,481, filed Jun. 19, 2014, Fagans, Joshua, et al.

Author Unknown, "How to View and Edit Pictures," Shutterfly, Apr. 10, 2014, pp. 1-14, available at http://www.shutterfly.com/howto/view/get_started.jsp.

Rachna, "Dreamweaver Photo Album/Picture Gallery," Month Unknown, 2014, 2 pages, available at http://www.entheosweb.com/website_design/web_photo_album.asp.

\* cited by examiner

APPLICATION FOR DESIGNING PHOTO ALBUMS

CLAIM OF BENEFIT TO PRIOR APPLICATIONS

This application is a continuation application of U.S. patent application Ser. No. 11/032,322, filed Jan. 9, 2005, now issued as U.S. Pat. No. 8,024,658. U.S. patent application Ser. No. 11/032,322, now issued as U.S. Pat. No. 8,024,658 is incorporated herein by reference.

FIELD OF THE INVENTION

The present invention relates to applications for designing photo albums.

BACKGROUND OF THE INVENTION

Digital photography has increased the number of images a typical user stores and manages. There is no longer the need to buy expensive, single use film. There is no longer the need to carefully manage this film both before and after development of the film into costly inconvenient prints. There is also no longer the need to carefully select shots to conserve film or money. Film has essentially become an unlimited resource.

Consequently, a typical user with access to widely available modern image acquisition technologies (e.g., a scanner, a camera, etc.) may store many thousands of images on even more widespread storage technologies (e.g., memory cards, magnetic disks, optical disks, etc.). As many photographers, both amateur and professional, have come to realize, the trick with snapping a few good shots is no longer simply having the right light or the right film. Although the traditional issues of image acquisition still exist, new complications of how to edit and manage the volume of image data accumulating on a typical computer hard drive now burden the typical computer user.

In the past, image collectors would develop, edit, and assemble hard wrought photo/journalistic creations into scrapbooks, photo albums, and other culminations or creative work of this sort. The development of computer applications for editing images and assembling the images have greatly reduced the effort needed to create a modern masterpiece out of a few pictures. However, the field of existing image management applications is still in its infancy. These applications suffer from lack of usability and may require users a high degree of technical knowledge and/or creative talent to produce a quality result or even any result. The existing applications may further limit a user's ability to customize their creations.

Thus, there is a need in the art to assist users in managing the volumes of their image data. There is also a need to allow users to edit and organize the image data into quality forms of expression. There is further a need to allow users additional means to custom tailor their creative works involving image data.

SUMMARY OF THE INVENTION

Some embodiments of the invention provide a computer-based application that allows its users to insert their pictures in a variety of different photo album books (called photo books below). Each photo book has several pages that have one or more picture fields for presenting pictures. Different photo books can differ in their size, themes, covers, page designs, page colors, picture-field designs, picture-field layouts, and/or other attributes.

In some embodiments, the application also allows the users to modify photo books that they select. For instance, in some embodiments, a user can modify the page design, color, frame design, and/or other thematic aspects of a selected photo books. Also, in some embodiments, the user can add picture and text fields to the photo book. Once the user has completed designing the photo book and inserting pictures in the photo book, the user can order the photo book through an online transaction that is initiated through the application.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purposes of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a computer-based application that allows its users to insert their pictures in a variety of different photo album books (called photo books below). Each photo book has several pages that have one or more picture fields for presenting pictures. Different photo books can differ in their size, themes, covers, page designs, page colors, picture-field designs, picture-field layouts, and/or other attributes.

In some embodiments, the application also allows the users to modify photo books that they select. For instance, in some embodiments, a user can modify the page design, color, frame design, and/or other thematic aspects of a selected photo books. Also, in some embodiments, the user can add picture and text fields to the photo book. Once the user has completed designing the photo book and inserting pictures in the photo book, the user can order the photo book through an online transaction that is initiated through the application.

I. Overview of Picture Editing and Organizing Application

Figure 1:
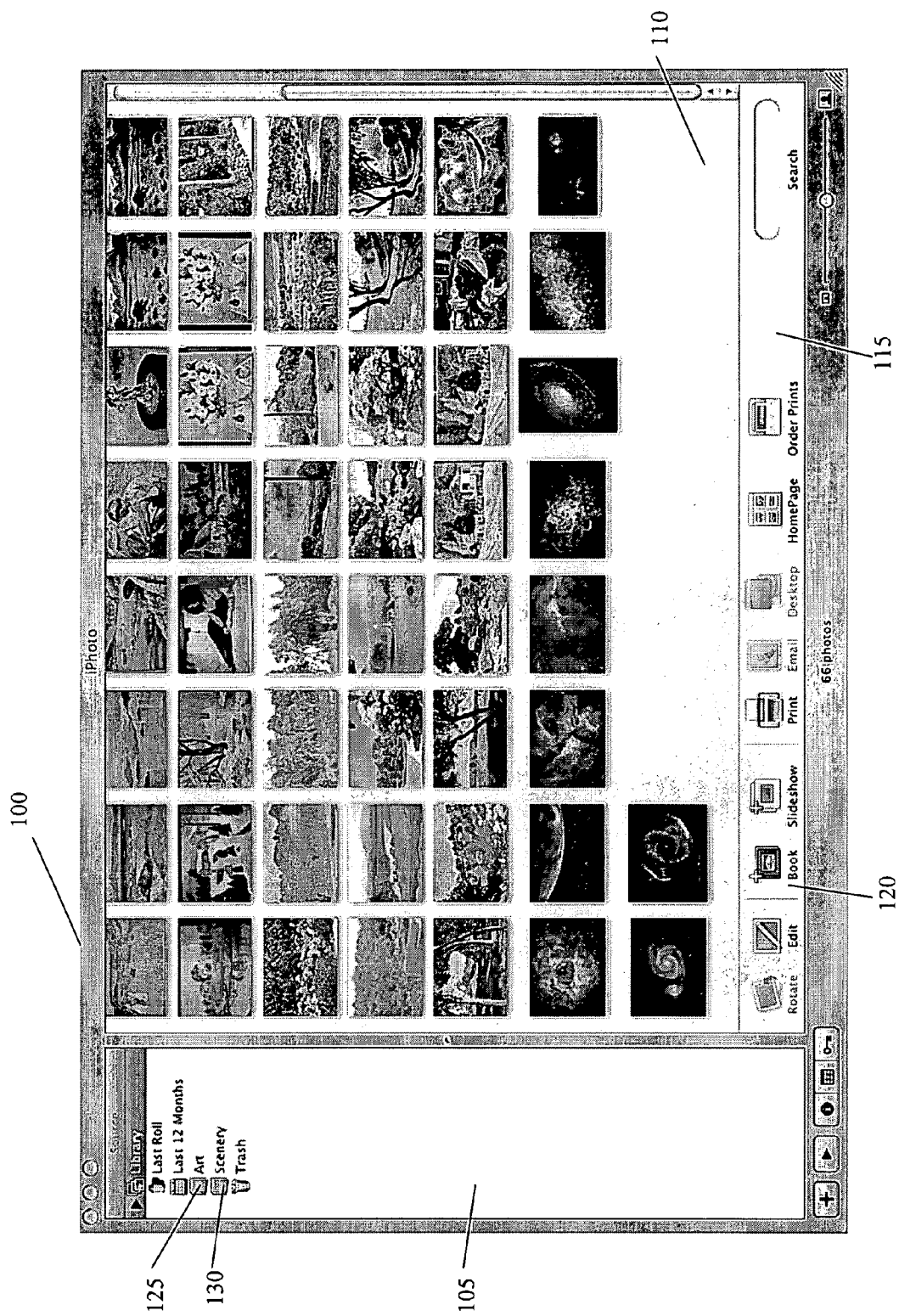
FIG. 1 illustrates a graphical user interface of an application that is for editing and organizing photos.

Some embodiments of the invention are implemented by an application that is for editing and organizing photos. FIG. 1 illustrates a graphical user interface 100 of one such application. As shown in this figure, the GUI 100 includes two display sections, a source display section 105 and an image display section 110. The source display section 105 illustrates icons that represent different collections of photographs, while the image display section 110 illustrates the photographs in a collection that is selected in the source display section 105.

Figure 2:
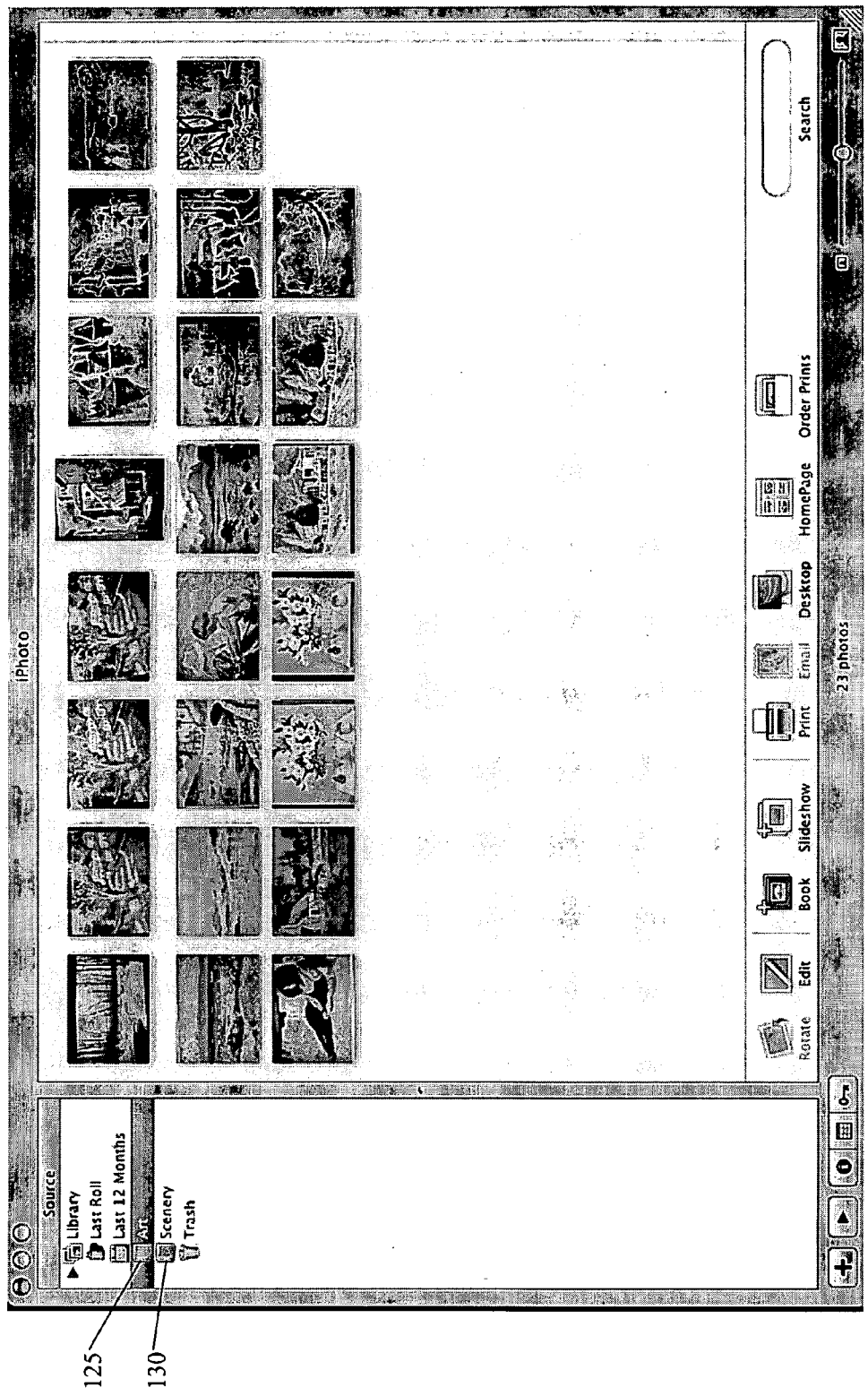
FIG. 2 illustrates an image display section showing photographs that are part of an "Art" album after this album is selected in a source display section.

For instance, in FIG. 1, the source display section 105 shows five collections, which are a "Library," "Last Roll," "Last 12 Months," "Art," and "Scenery" collections/albums. When a user selects any one of these collections, the photographs in these collections are displayed in the image display section 110. For example, in FIG. 1, the photographs that are illustrated in the image display section 110 are the photographs in the Library, which, in some embodiments, contains all photographs imported into the application. Alternatively, FIG. 2 illustrates the image display section 110 showing the photographs that are part of the Art album 125 after this album is selected in the source display section 105. Similarly, in the image display section 110, FIG. 3 illustrates the photographs from the Scenery album 130 after the selection of this album in the source display section 105.

II. Selecting a Photo Book Theme

Figure 3:
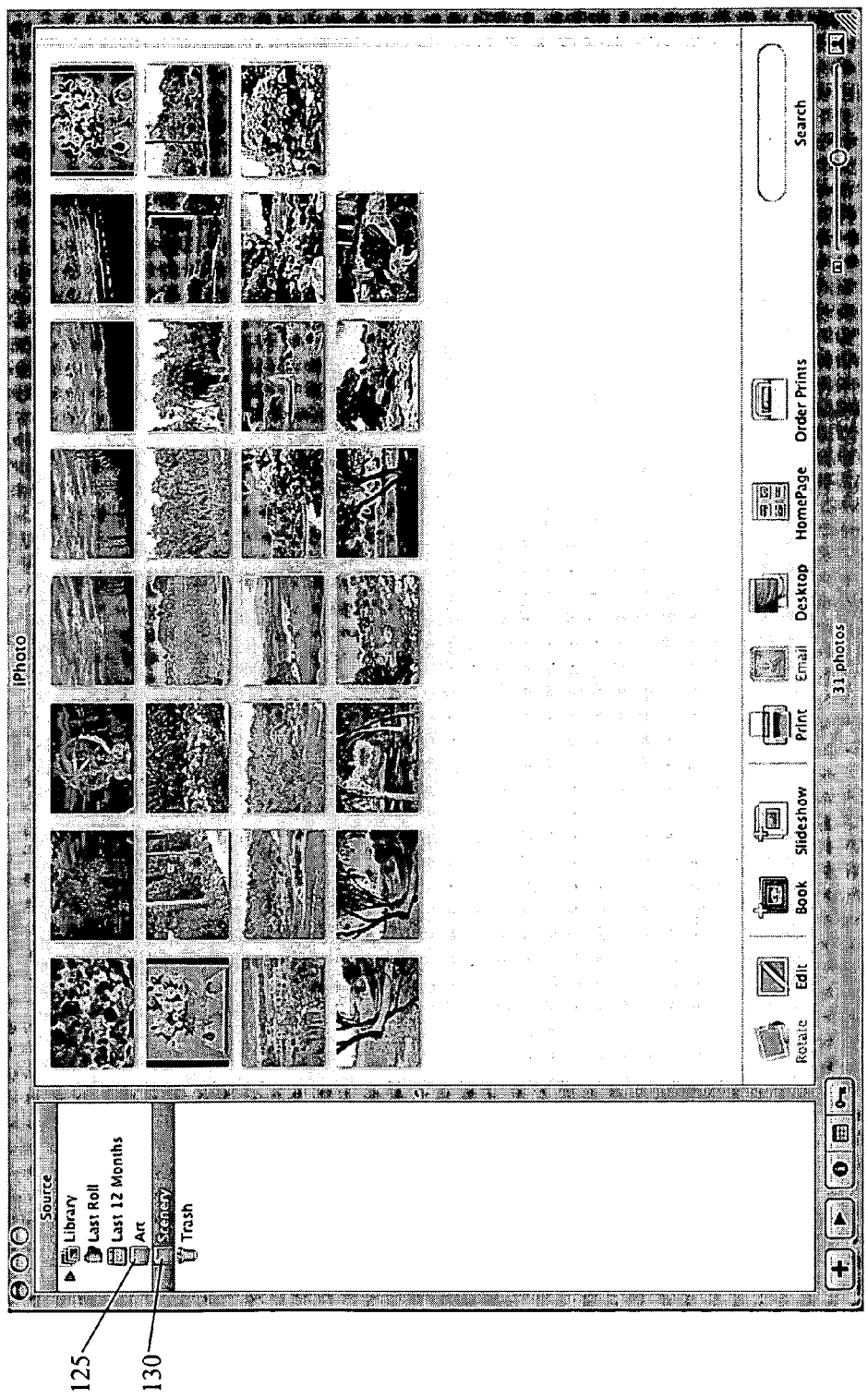
FIG. 3 illustrates photographs from a "Scenery" album after the selection of this album in the source display section.

The photo-organizing application illustrated in FIGS. 1-3 allows a user to arrange and publish his or her photos in one of several different photo books with different sizes and themes. Specifically, as shown in these figures, the GUI 100 of this application includes a book icon 120 in an image-command section 115 of the GUI 100.

Figure 4:
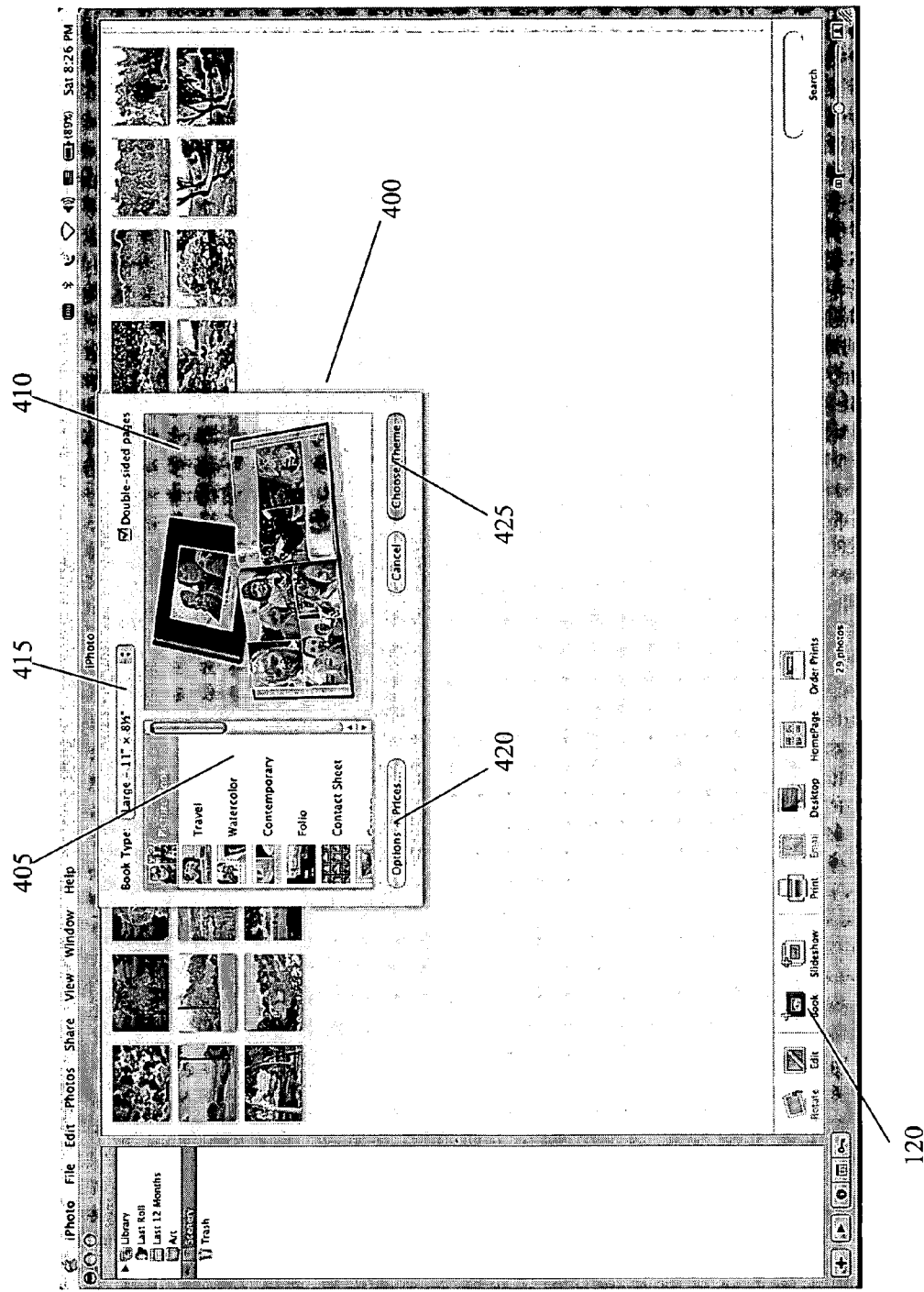
FIG. 4 illustrates a window from which the user can select a photo book of some embodiments of the invention.
Figure 5:
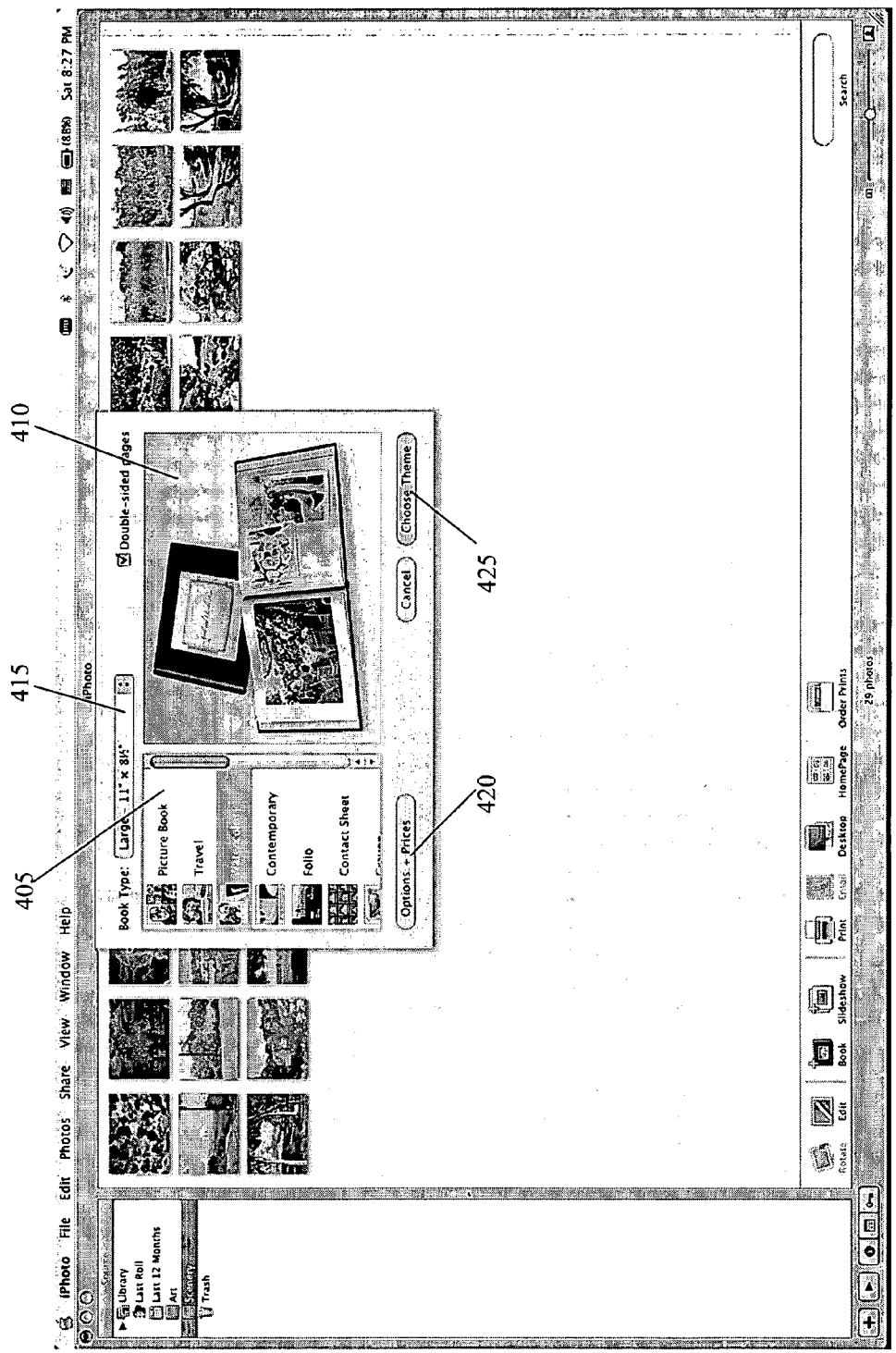
FIG. 5 illustrates a preview section providing a preview of a "Watercolor" photo book when this photo book is selected a list section.

When a user selects (e.g., through a click operation) the book icon 120, the application presents a window from which the user can select a photo book. FIG. 4 illustrates such a window 400 of some embodiments of the invention. As shown in FIG. 4, the window 400 includes two sections, a list section 405 and a preview section 410. The list section 405 presents all the available photo book themes in a scrollable list format, while the preview section 410 provides a preview of the photo book theme that is highlighted in the list section 405. For instance, in FIG. 4, the photo book theme highlighted in list section 405 is the "Picture Book," and a preview of the "Picture Book" is provided in the preview section 410. FIG. 5 illustrates the preview section 410 providing a preview of the "Watercolor" photo book when this photo book is selected in the list section 405.

Figure 6:
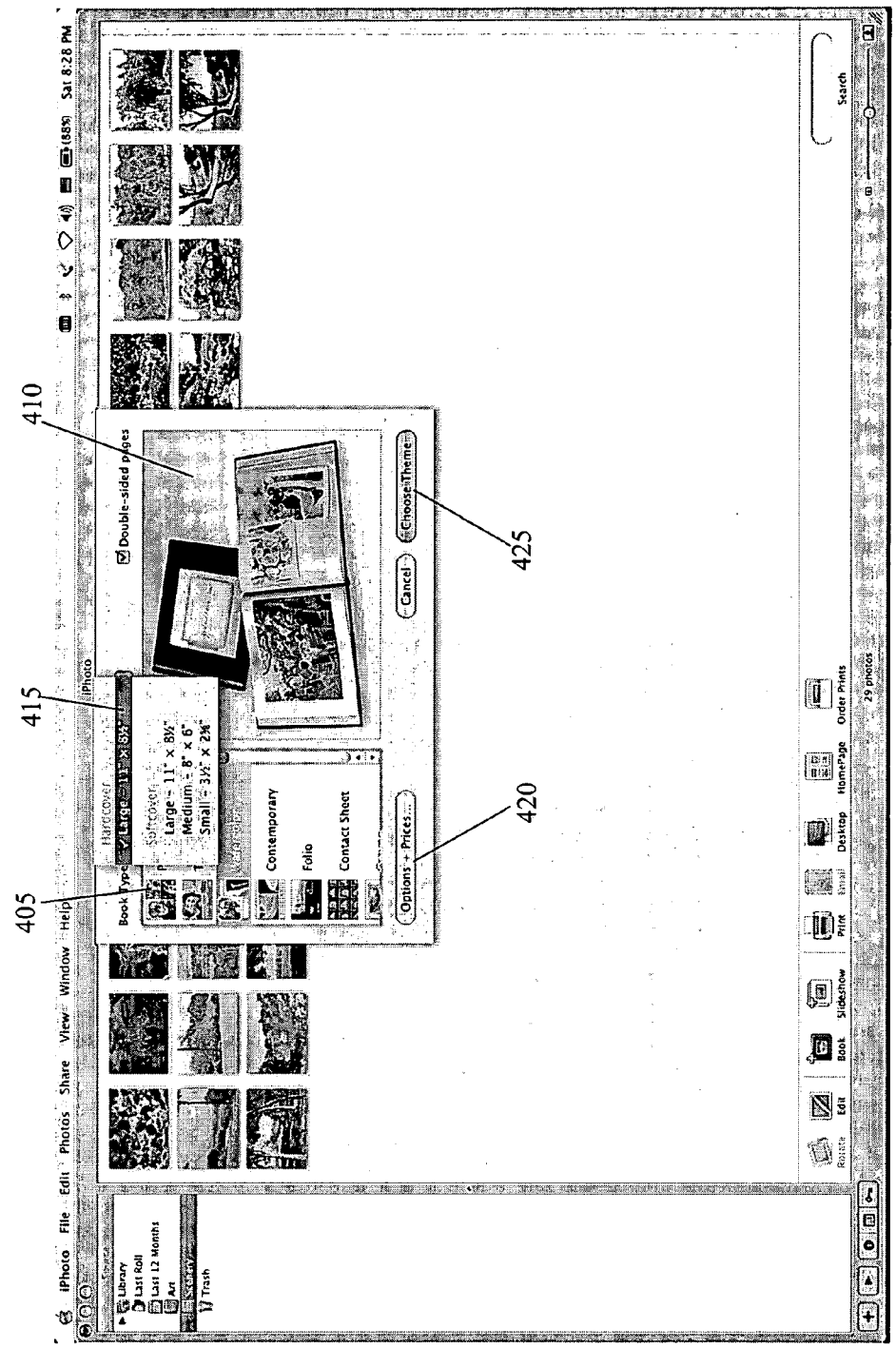
FIG. 6 illustrates that when a user selects a drop-down menu, the menu opens up to provide the user with a list of different sizes and different coverings for the photo book.
Figure 7:
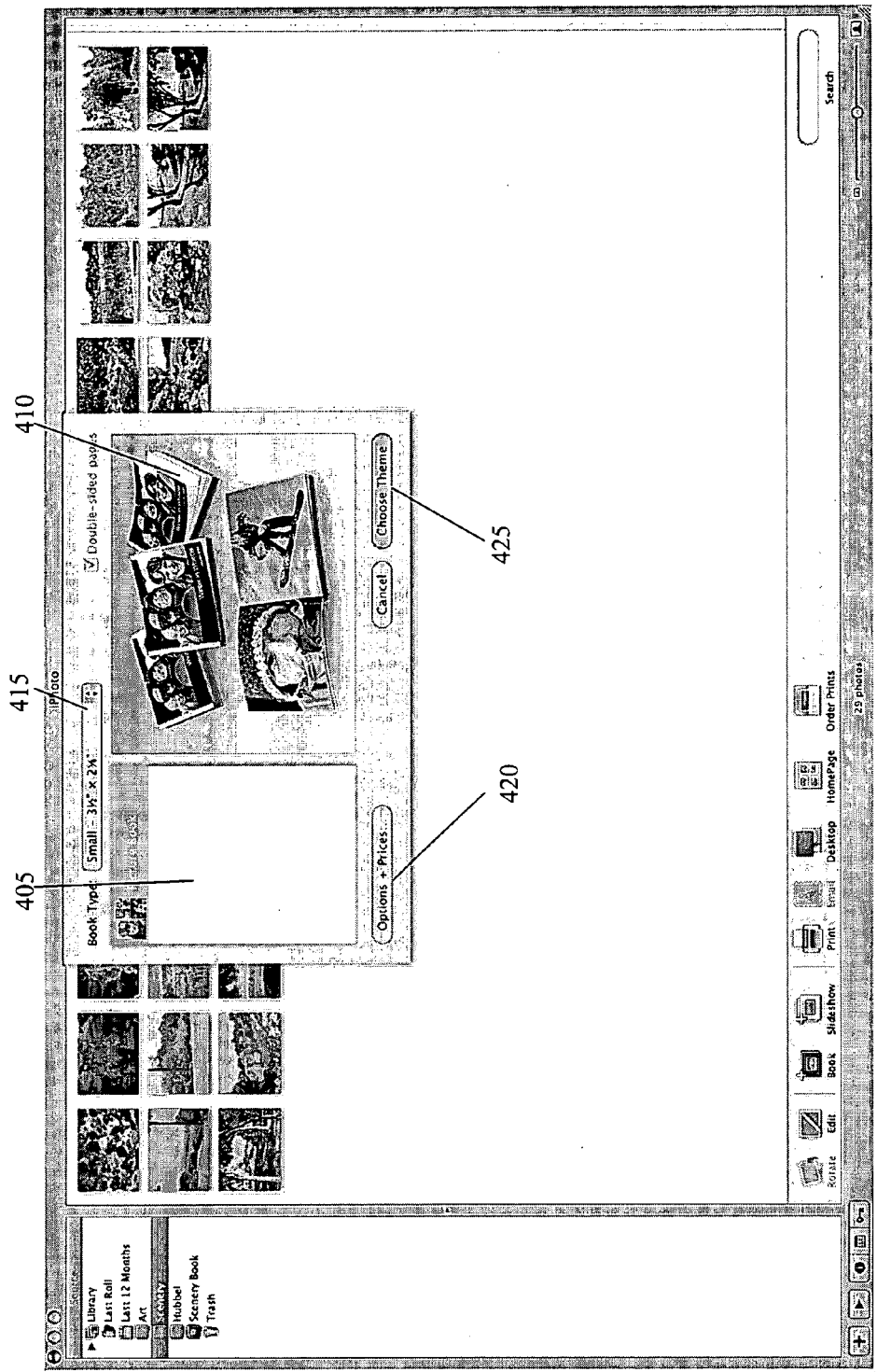
FIG. 7 illustrates that a "Picture Book" is the only photo book available in softcover for a small size photo book.

As shown in FIGS. 4 and 5, the window 400 includes a drop-down menu 415. FIG. 6 illustrates that when a user selects (e.g., clicks on) this drop-down menu 415, this menu 415 opens up to provide the user with a list of different sizes and different coverings (e.g., a hard cover or a soft cover) for the photo books. Not all of the photo books are available in all sizes and with all coverings. For instance, FIG. 7 illustrates that the Picture Book is the only photo book available in the small size as a soft cover.

As shown in FIGS. 4-7, the window 400 includes a selectable button 420 entitled "Options+Prices." When a user selects this button (e.g., clicks on this button), a web browser (such as Safari, Firefox, Internet Explorer, etc.) presents a website that provides the user with prices and options for ordering the photo book that is currently highlighted in the list section 405.

Figure 8:
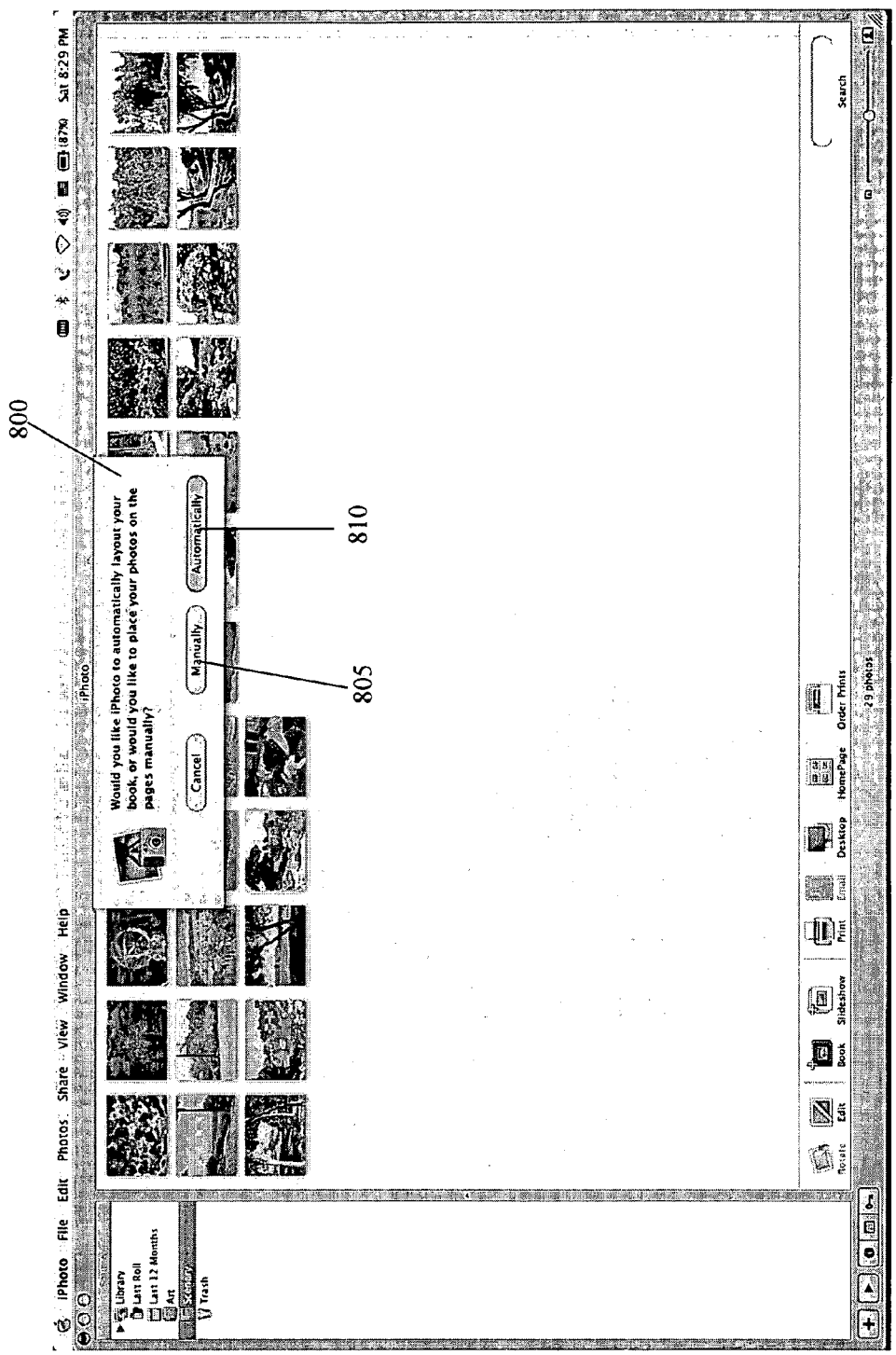
FIG. 8 illustrates that in some embodiments, when the user selects the "Choose Theme" button, the application provides the user with a notice.

The window 400 also includes a selectable button 425 entitled "Choose Theme." This button allows a user to select the photo book theme that is highlighted in the list section 405. In other words, through this button 425, the user can direct the application to present a photo book according to the photo book theme that is highlighted in the list section 405 with the size and covering that is specified in the drop-down menu 415. In some embodiments, when the user selects the "Choose Theme" button, the application provides the user with a notice 800 that is illustrated in FIG. 8. As shown in this figure, the notice 800 allows the user (1) to click on a button 810 labeled "Automatically," which if selected directs the application to automatically insert pictures into the selected photo book, or (2) to click on a button 805 labeled "Manually," which if selected allows the user to insert the pictures manually into the selected photo book.

III. The Presentation of a Photo Book

Figure 9:
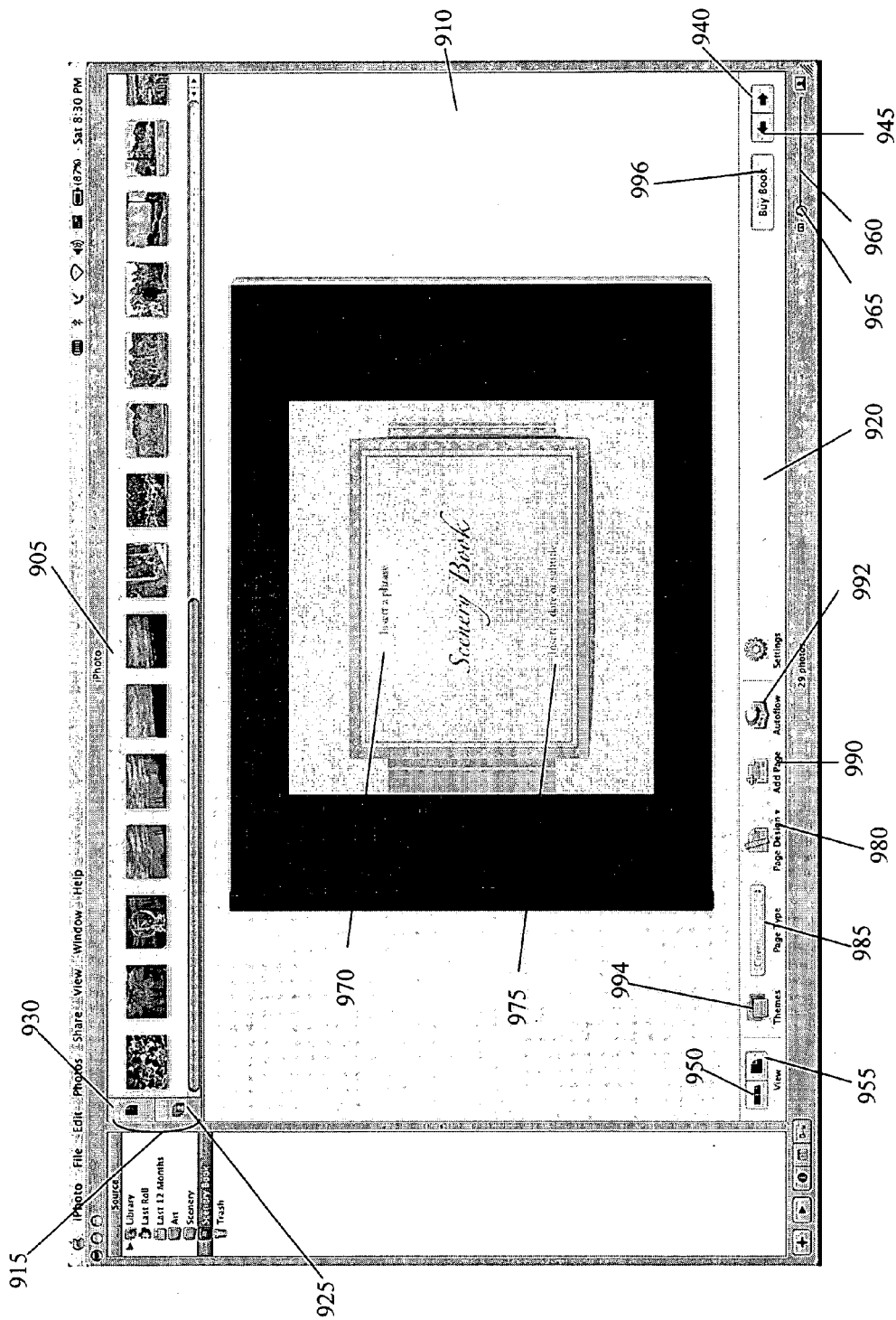
FIG. 9 illustrates that, when the user selects the manual-insertion button in the notice, the application replaces the image-display section and the image-command section in the GUI with a thumbnail-preview display section, a photo-album display section, a thumbnail-control section, and an edit-control section.

Manual insertion of pictures in a selected photo book will be first described below. FIG. 9 illustrates that, when the user selects the manual-insertion button 805 in the notice 800, the application replaces the image-display section 110 and the image-command section 115 in the GUI 100 with a thumbnail-preview display section 905, a photo-album display section 910, a thumbnail-control section 915, and an edit-control section 920.

When the user chooses to manually insert pictures in a photo book, the display section 905 can provide thumbnail views of the pictures that are to be inserted (i.e., that have not yet been inserted) into the photo book, as shown in FIG. 9. Whenever a picture is placed on a page of the photo book, the picture's preview is deleted from the preview window 905. Alternatively, whenever a picture is removed from a page of the photo book, the picture's preview is added to the preview window 905.

Initially, when the user selects to manually insert pictures in the photo book, the pictures that are previewed in the window 905 are all the pictures that are to be inserted in the photobook. These pictures can be the pictures that the user selects in the image display section 110 before selecting the book icon 120. On the other hand, when the user does not select any pictures in the image display section 110, the pictures that are to be inserted in the photo book are all the pictures that were displayed in the image display section 110 right before the user selected the book icon 120. For instance, in the example illustrated in FIGS. 4, 5, 8, and 9, the user has not selected any particular pictures in the image-display section 110, which is displaying the pictures in the Scenery album 130. Hence, in this example, the preview display section 905 presents all the pictures that are in the Scenery album 130.

Figure 10:
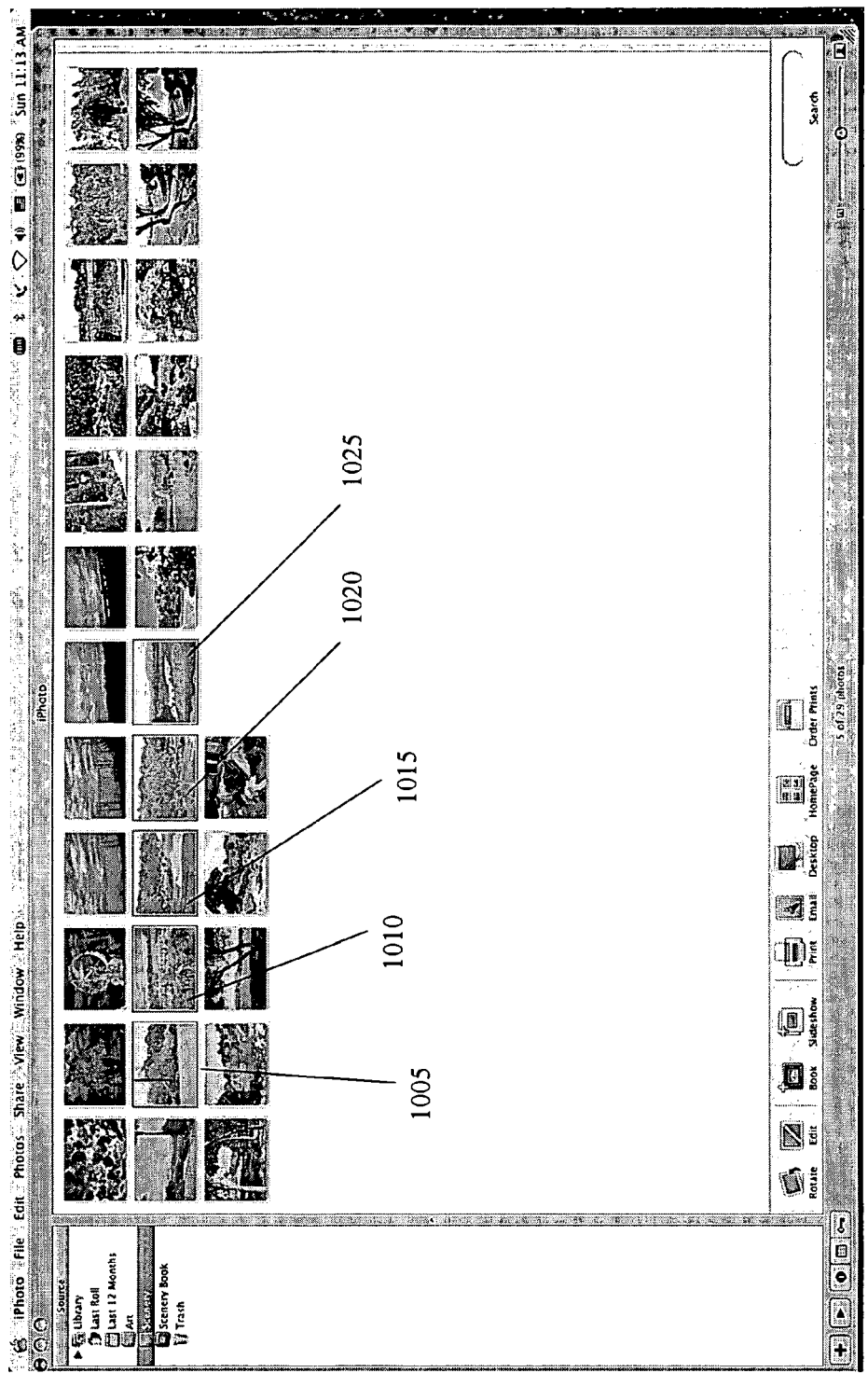
FIG. 10 illustrates the selection of five images.
Figure 11:
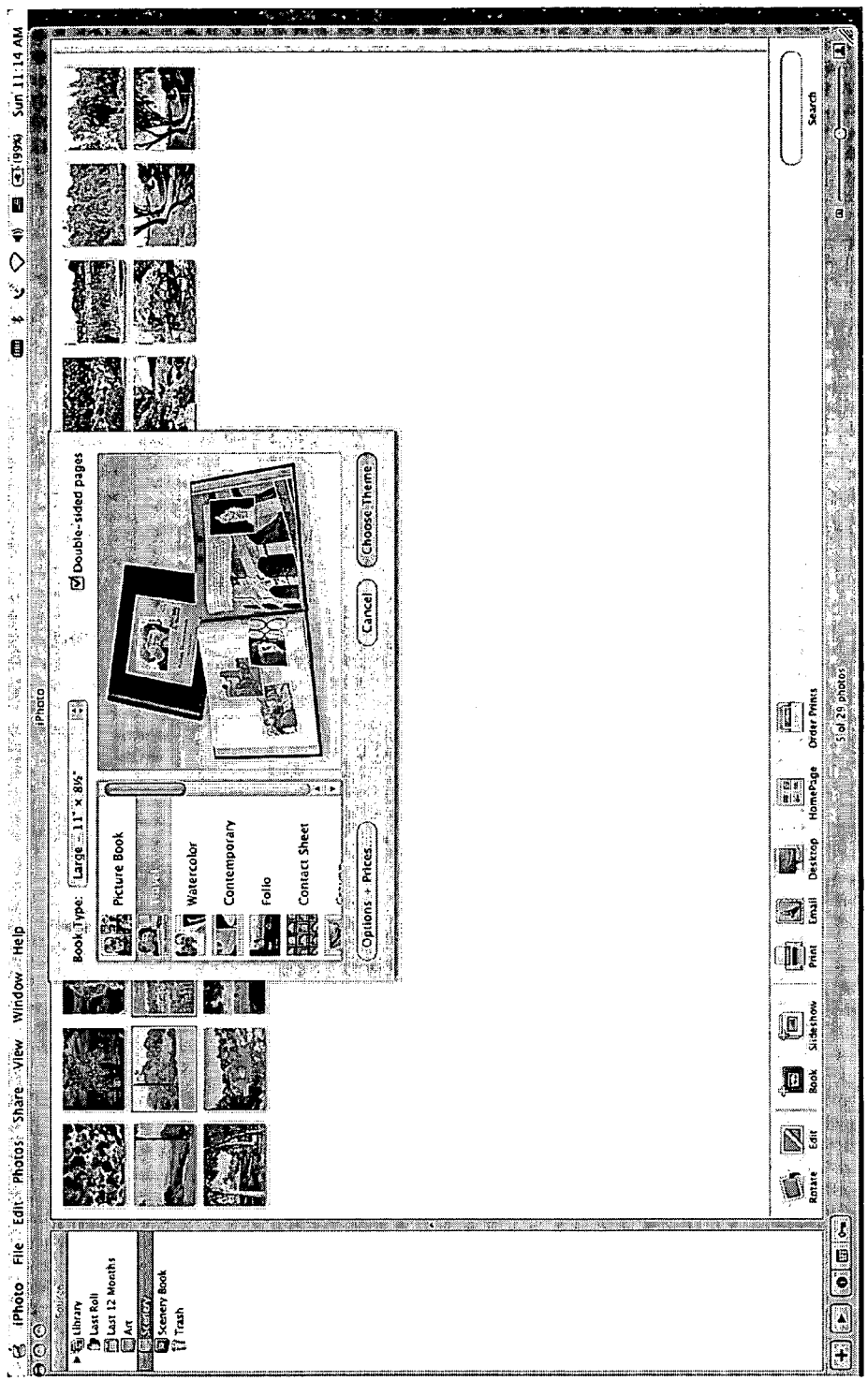
FIG. 11 illustrates the selection of the "Travel" photo book for five selected images.
Figure 12:
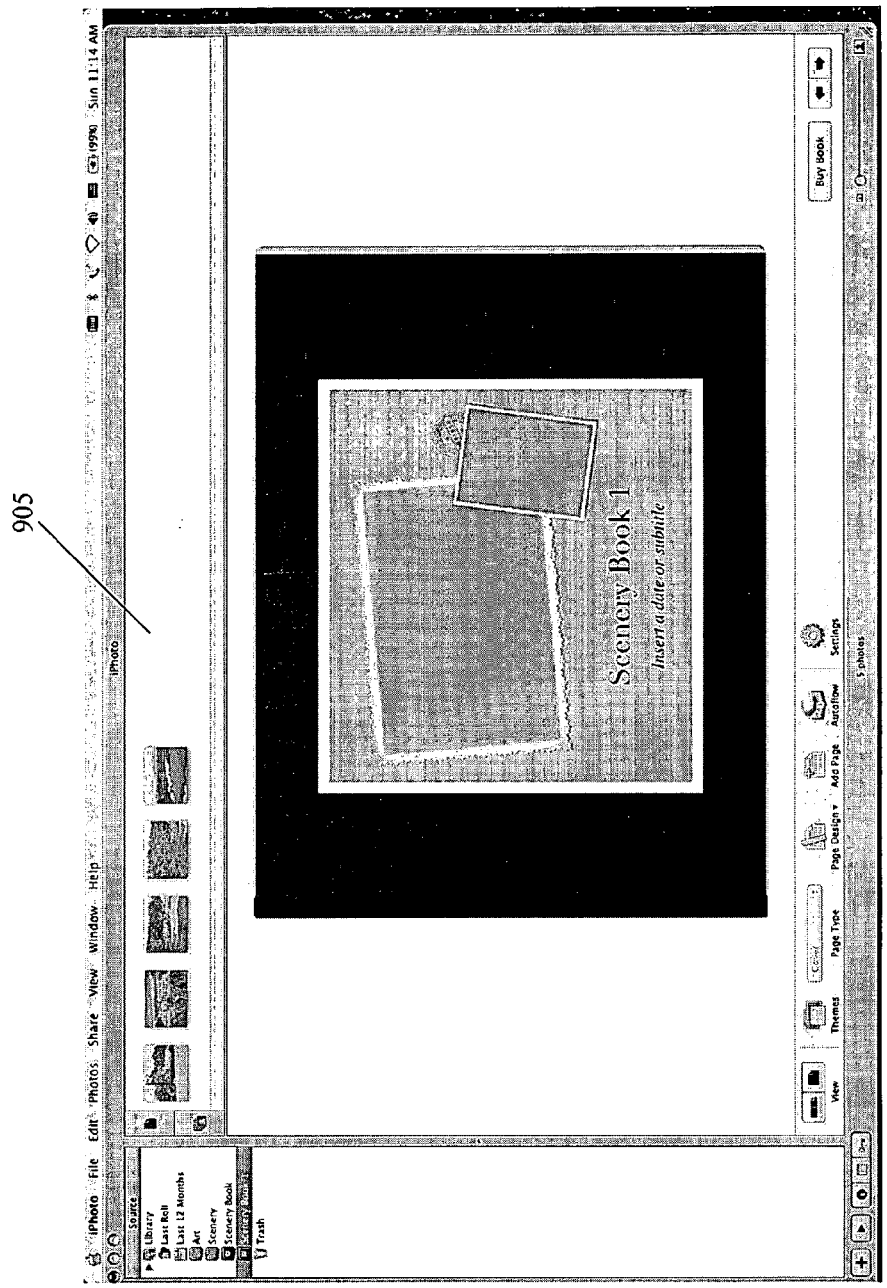
FIG. 12 illustrates the five selected imaged in a thumbnail display section.

FIGS. 10-12 illustrate an alternative example where the user selects images in the image display section 110 before selecting the book icon 120. Specifically, FIG. 10 illustrates the selection of five images 1005-1025 in the image display section 110. FIG. 11 then illustrates the subsequent selection of the Travel photo book for these selected five images 1005-1025. FIG. 12 finally illustrates the five pictures 1005-1025 appearing in the thumbnail display section 905 after the user has selected to manually insert these pictures in the Travel photo book.

Figure 13:
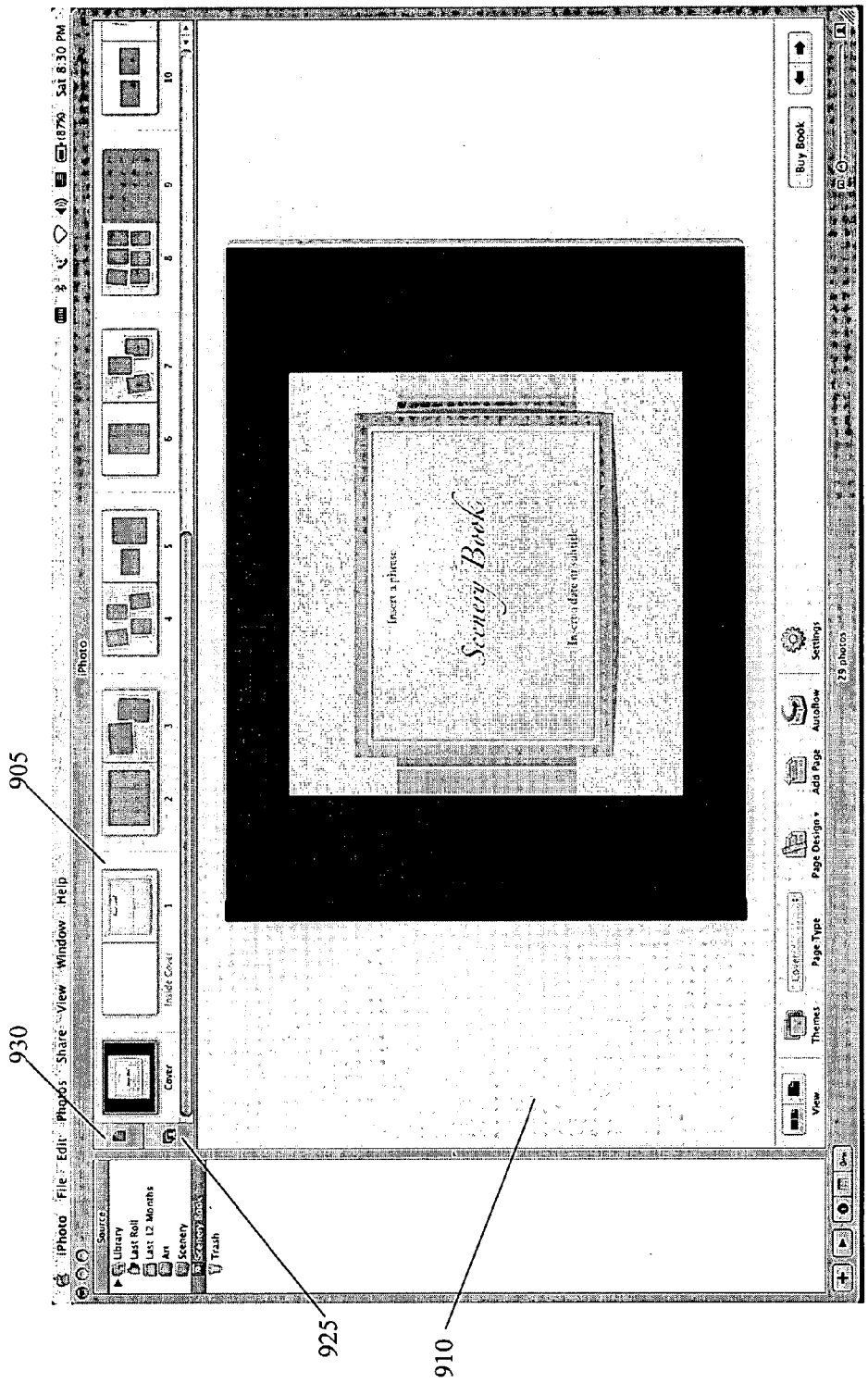
FIG. 13 illustrates that when the user selects the icon, the preview section illustrates a thumbnail view of the pages of the photo book.

The thumbnail-preview section 905 can also provide a thumbnail preview of the pages of the photo book. Specifically, the thumbnail-control section 915 includes two icons 925 and 930. When the user selects the icon 925, the preview section 905 illustrates thumbnail views of the pictures that are to be inserted in the photo book, as shown in FIG. 9. On the other hand, when the user selects the icon 930, the preview section 905 illustrates a thumbnail view of the pages of the photo book, as shown in FIG. 13.

Figure 14:
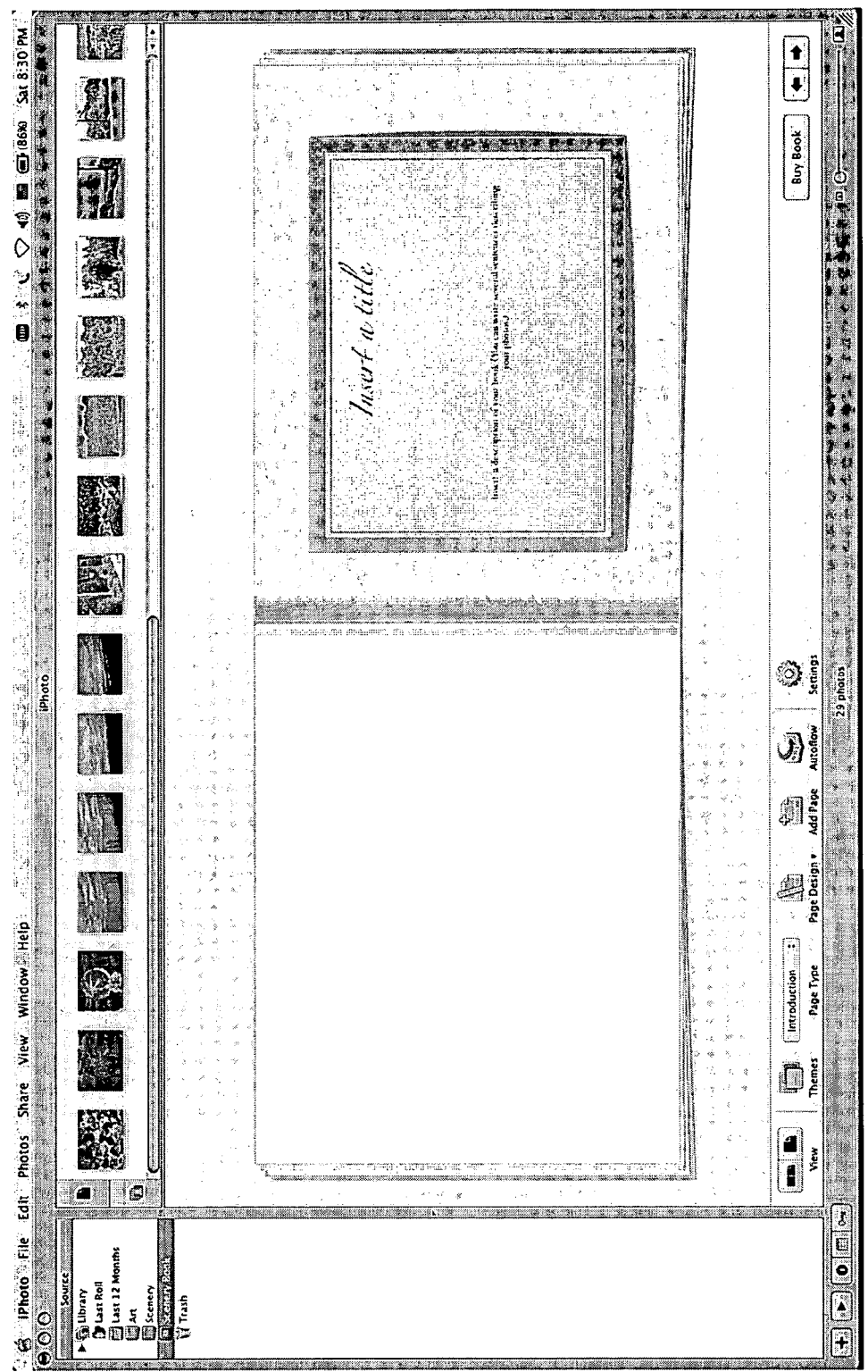
FIG. 14 illustrates that the first page of some photo books might include user-editable text fields for inserting a title or a description of the photo book.

The photo-album display section 910 presents one or two editable pages of the selected photo book. The user can enlarge these pages and/or navigate through them by using the view-adjust icons 950 and 955, scrolling arrows 940 and 945, and size-adjust scroll bar 960, which are illustrated in FIG. 9. Specifically, the user can navigate through the pages of the photo book through the front and back scrolling arrows 940 and 945. For instance, by selecting the front scrolling arrow when viewing the front cover illustrated in FIG. 9, the application turns to the first page of the photo book, which is illustrated in FIG. 14.

Figure 15:
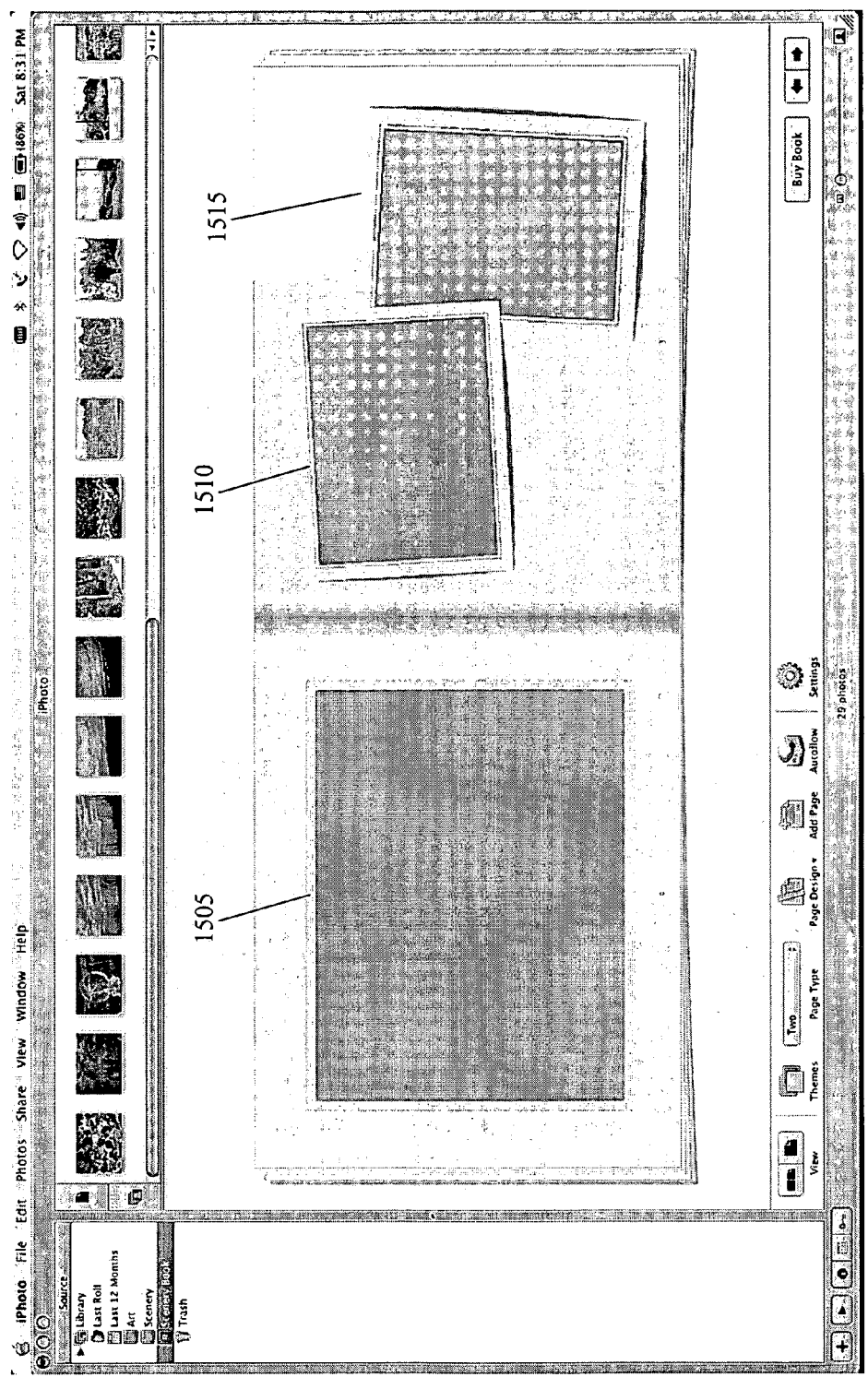
FIG. 15 illustrates the second and third pages of the Scenery photo book that was discussed by reference to FIG. 9
Figure 16:
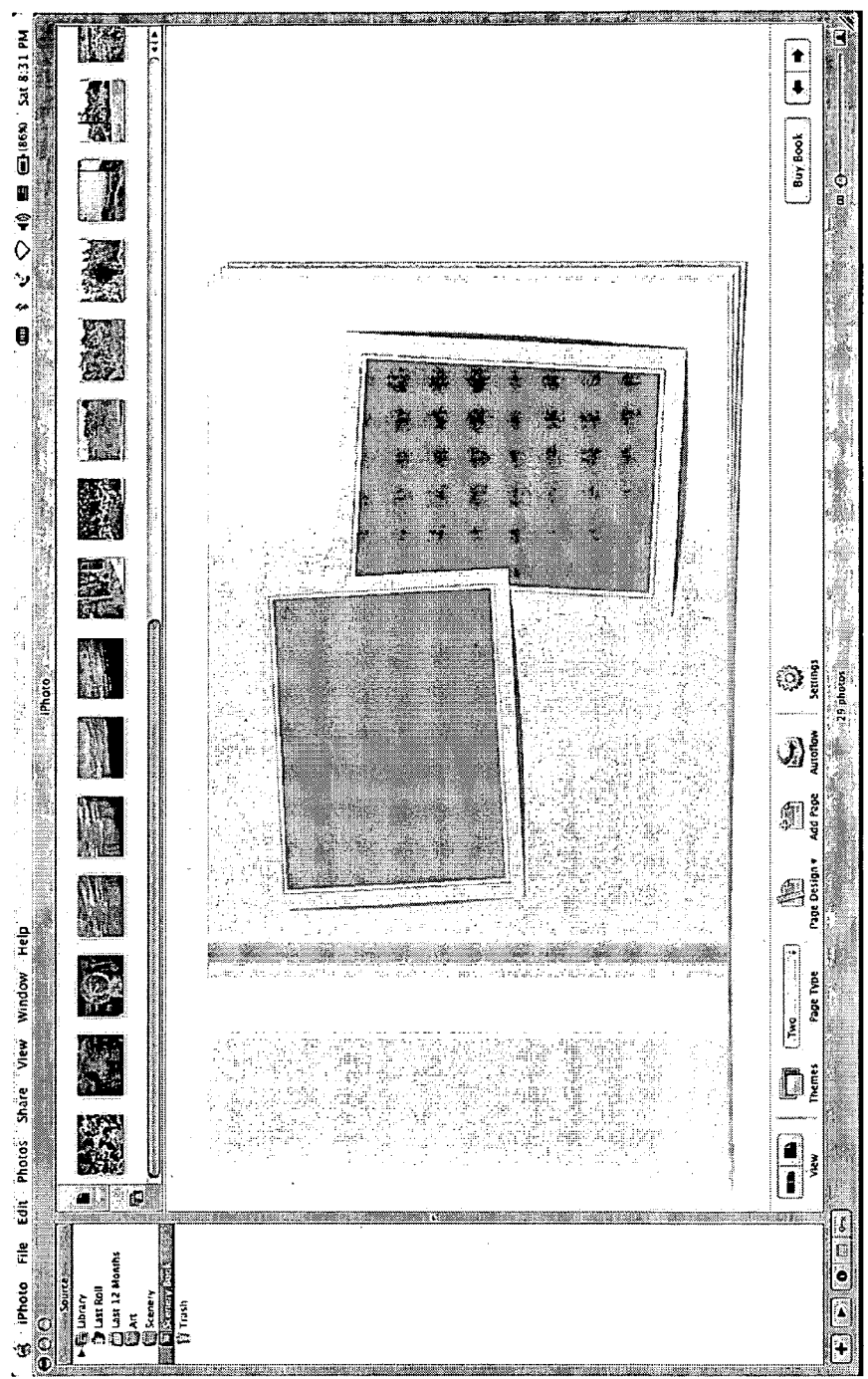
FIG. 16 illustrates the photo-album display section presenting only the third page of the photo book, when the user selects the one-page view icon.

Also, when the two-page view icon 950 is selected, the photo-album display section 910 presents to the user two pages of the photo book. As illustrated in FIG. 15, the two pages include the second and third pages of the photo book. Alternatively, when the one-page view icon 955 is selected, the display section 910 presents to the user one page of the photo book. For instance, FIG. 16 illustrates the photo-album display section 910 presenting only the third page of the photo book, when the user selects the one-page view icon 955.

Figure 17:
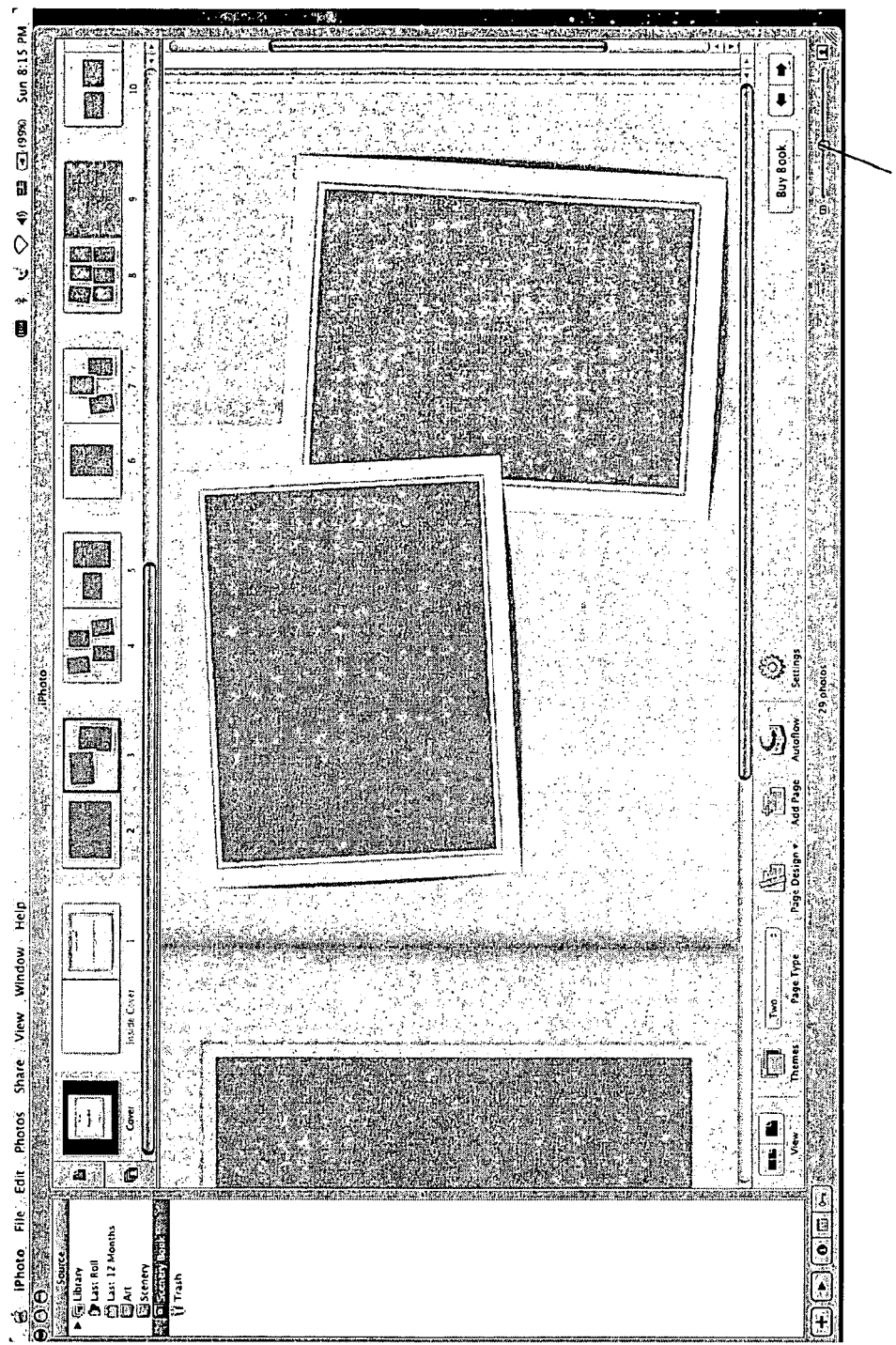
FIG. 17 illustrates moving a slider to enlarge a display of a page presentation.

The user can also adjust the size of the presentation in the photo-album display section 910 by moving a slider 965 across the scroll bar 960. For instance, FIG. 17 illustrates that the moving of the slider 965 to the right enlarges the display of the one page presentation of FIG. 16.

When the user selects manual insertion of photographs in a selected photo book, the application in some embodiments presents the user with the front cover of the photo book. In some of these embodiments, the application automatically labels the front cover with the name of the source (in the source list 105) of the pictures for inserting into the photo book. For instance, FIG. 9 illustrates the front cover of the photo book labeled as the Scenery Book as, in the example illustrated in FIGS. 4, 5, 8, and 9, the photos are all the photos in the Scenery album 130 that is listed in the source list 105.

Some embodiments allow the user to change the title that is automatically applied to the photo book, selecting the title (e.g., by clicking over the title) and modifying it. In addition to the title, the front cover of a photo book can also include one or more user-editable text fields, such as fields 970 and 975 illustrated in FIG. 9. Also, some of the pages within the photo books may include user-editable text fields. For instance, FIG. 14 illustrates that the first page of some photo books might include user-editable text fields for inserting a title or a description of the photo book.

IV. Photo Book Pages

Figure 18:
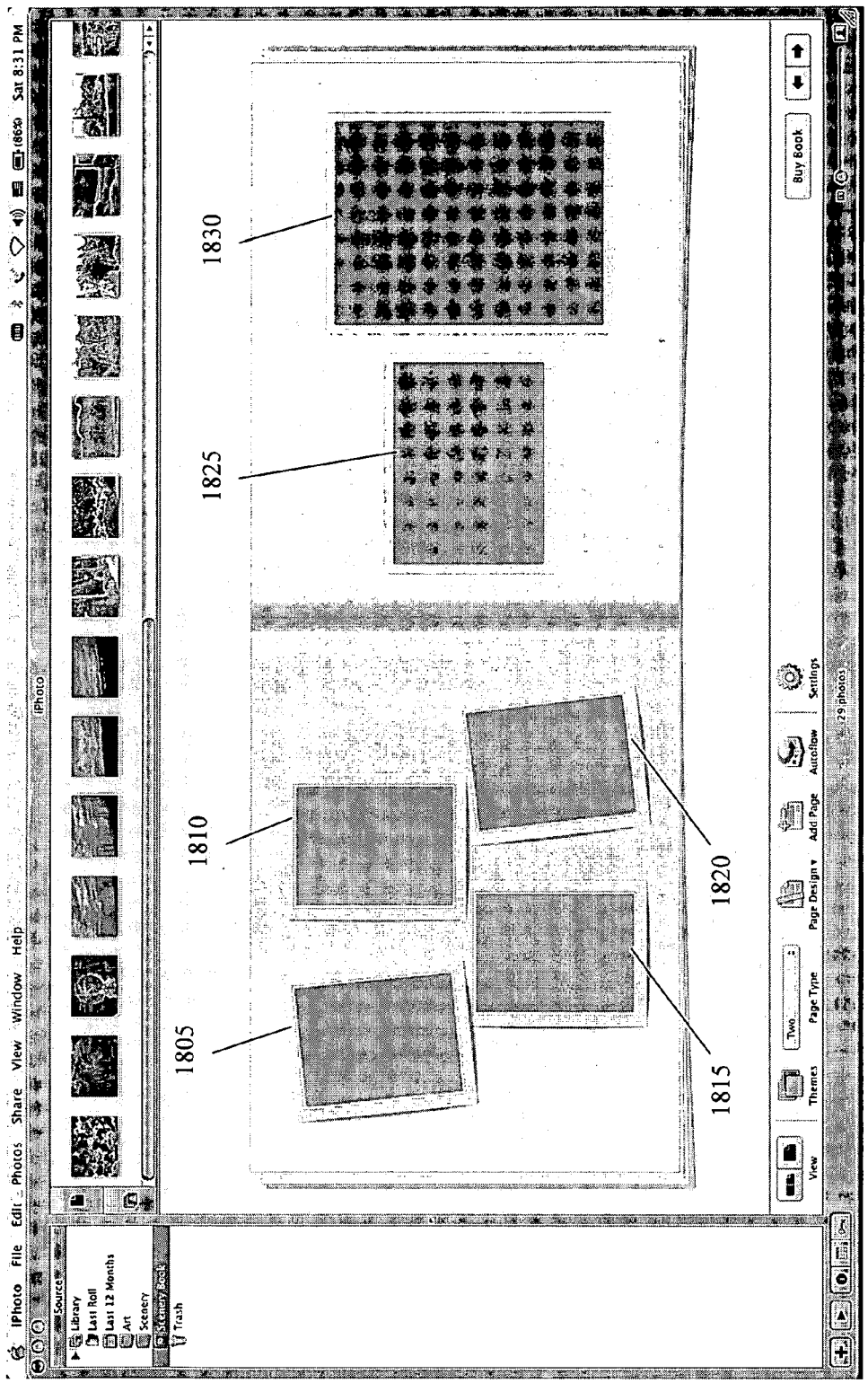
FIG. 18 illustrates a fourth and fifth page of a "Scenery" photo book.

As mentioned above, a photo book typically has several pages that have one or more picture fields each. Each picture field defines an area on the page for displaying a picture. For instance, FIG. 15 illustrates the second and third pages of the Scenery photo book that was discussed by reference to FIG. 9. As shown in FIG. 15, the second page includes one picture field 1505, while the third page includes two picture fields 1510 and 1515. FIG. 18 illustrates the fourth and fifth pages of the Scenery photo book of FIG. 9. As shown in FIG. 18, the fourth page includes four picture fields 1805-1820, while the fifth page includes two picture fields 1825 and 1830.

Figure 19:
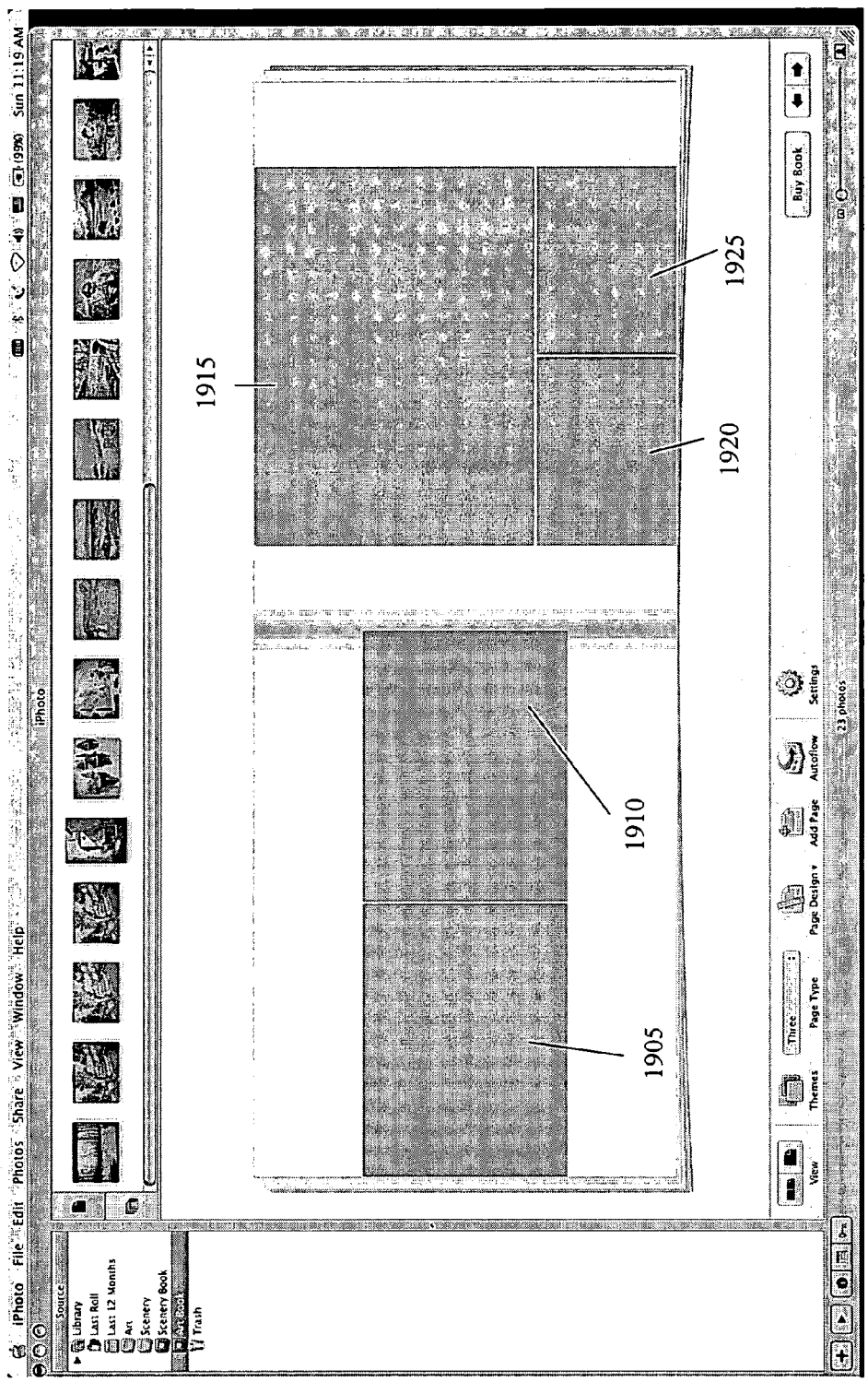
FIG. 19 illustrates two picture fields that do not have any frames around them.
Figure 20:
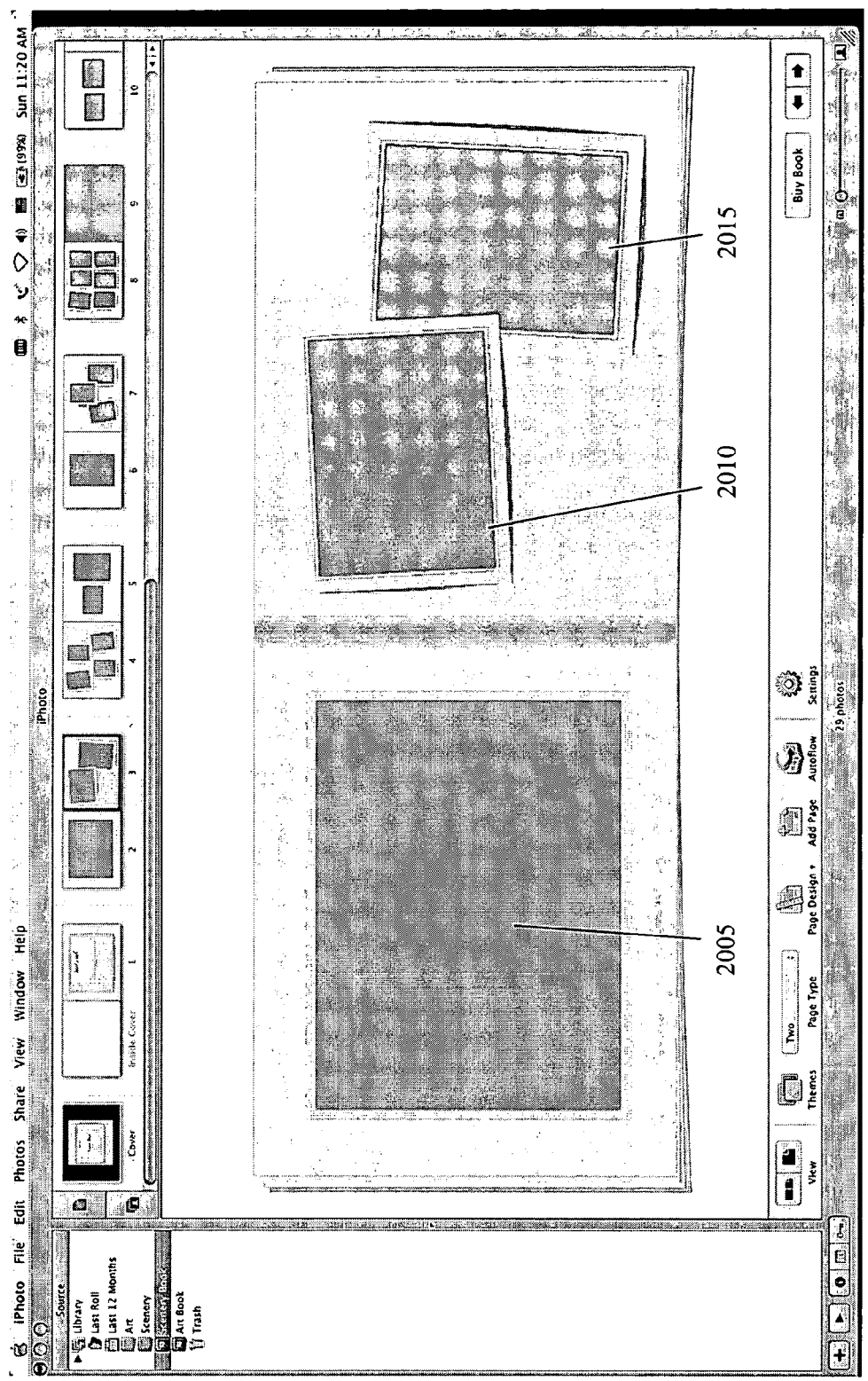
FIG. 20 illustrates three picture fields with different types of frames around them.
Figure 21:
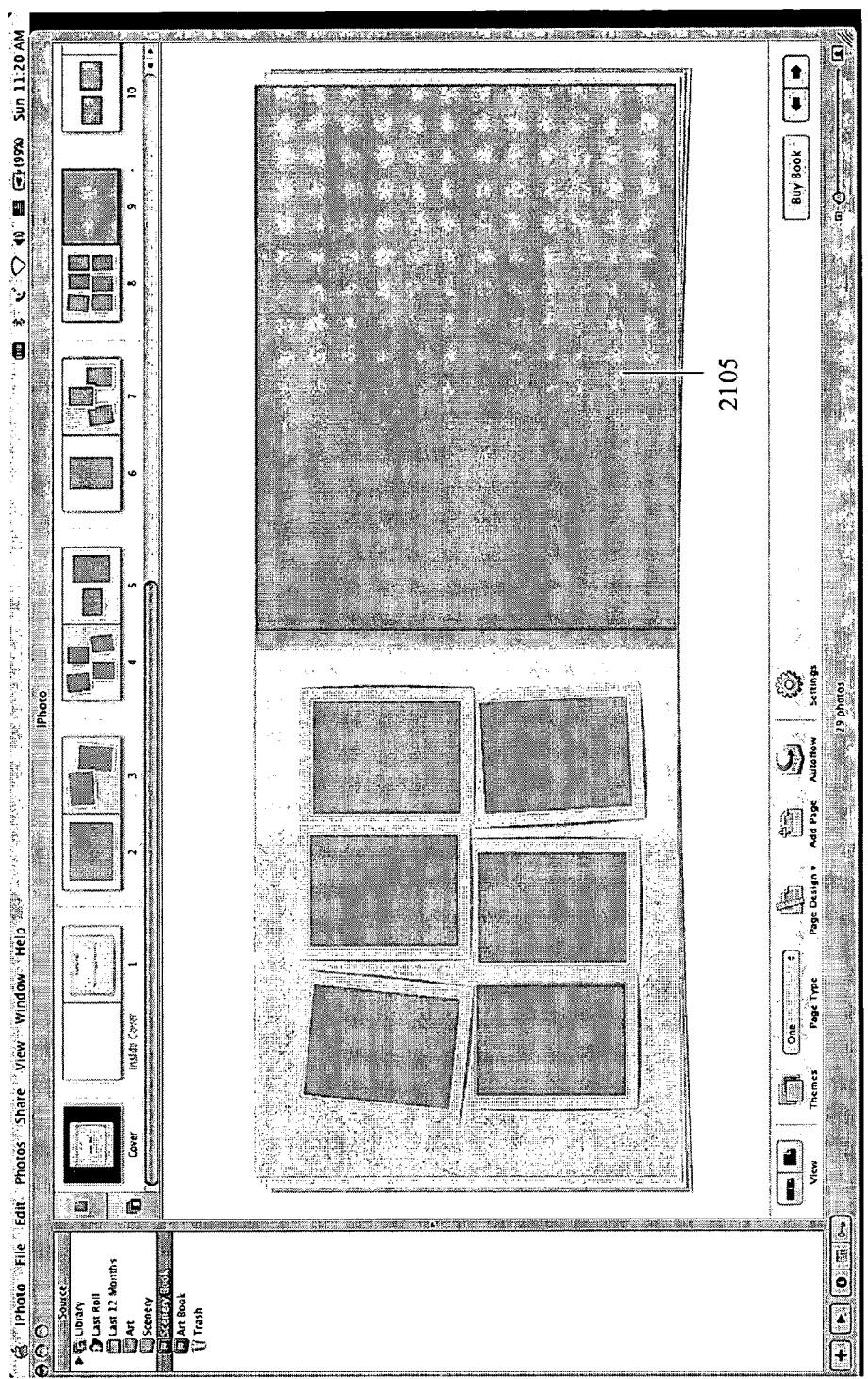
FIG. 21 illustrates that some picture fields can extend to the boundary of the page, in some embodiments.
Figure 22:
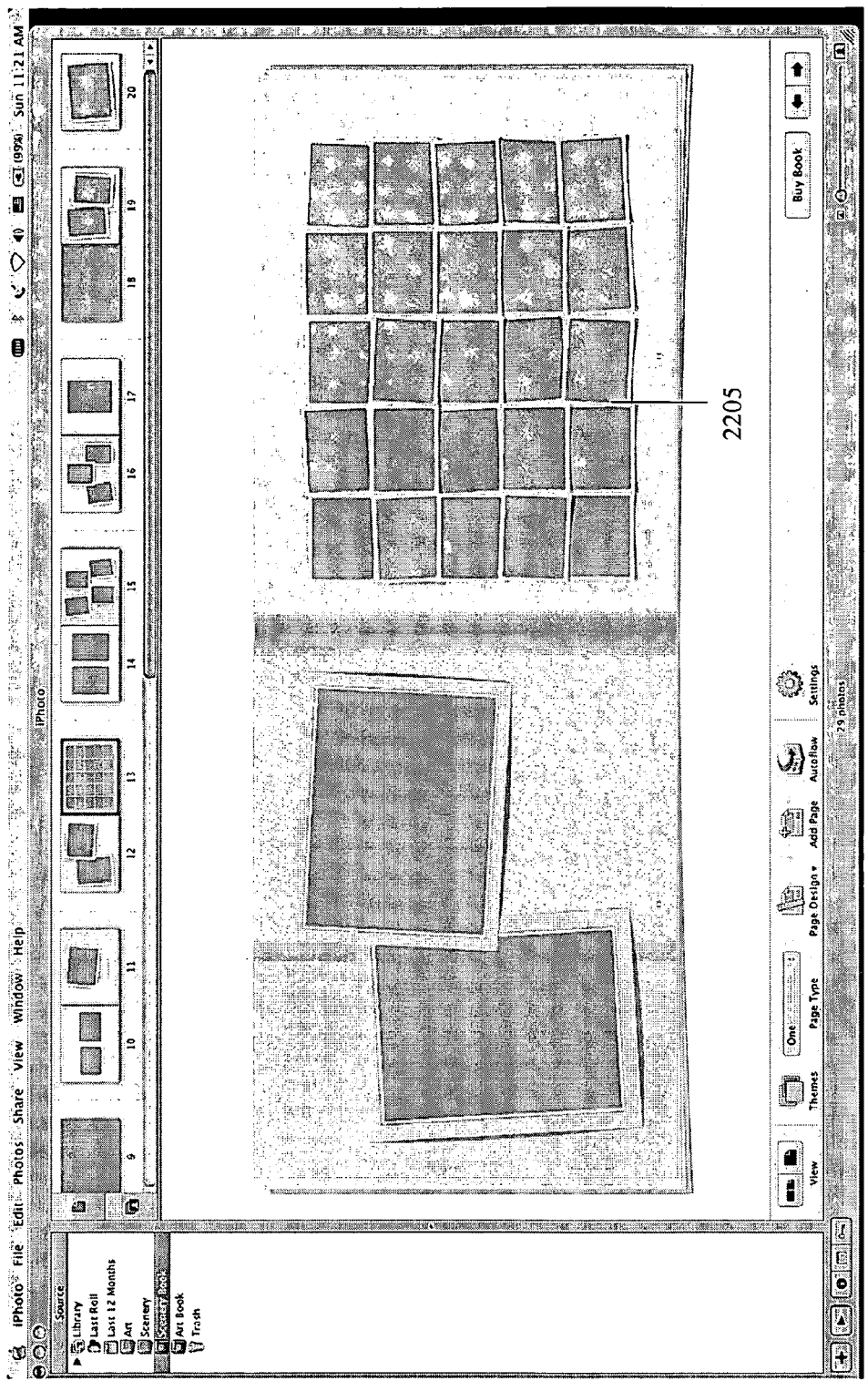
FIG. 22 illustrates a picture field that has a collage design, which is created through stripes that are placed over certain parts of the picture field instead of over the frames around the boundary.

The design of each picture field can be different in different photo books or even in the same photo book. For instance, the picture fields illustrated in FIGS. 15 and 18 have frames around them. Other picture fields might have different frames around them, or might not have any frames around them. For instance, FIG. 19 illustrates five picture fields 1905-1925 that do not have any frames around them, while FIG. 20 illustrates picture fields 2005, 2010, and 2015 with different types of frames around them. In addition, some picture fields can extend to the boundary of the page, such as picture field 2105 illustrated in FIG. 21. Also, instead of or in conjunction with frames around their boundary, some picture fields might have designs on them. FIG. 22 illustrates one such picture field that has a collage design 2205, which is created through stripes that are placed over certain parts of the picture field.

As shown in FIGS. 15 and 18, each page of a photo book can have a different number of picture fields in some embodiments. Also, in these embodiments, different pages in the photo book can have different page designs (e.g., the arrangements of the picture fields, the coloring of the page, etc.).

Initially, when the user selects a photo book, the application presents the photo book based on the album's default page designs, colors, and picture fields of the selected photo book theme. The default page designs, colors, and picture fields of the photo book's theme are specified by graphic designers to maximize the expected appeal of a photo book. For instance, the designer of a photo book might avoid using the same number of picture fields in the same arrangement on successive pages of the photo book, especially successive pages that can be viewed concurrently.

V. Editing and Adding Photobook Pages

Some embodiments allow the user to modify different default thematic attributes of the pages of a photo book. For instance, FIGS. 23-25 illustrate that some embodiments allow the user to change the number of picture fields by using the page-type command icon 985 in the edit-control section 920 illustrated in FIG. 9.

Figure 23:
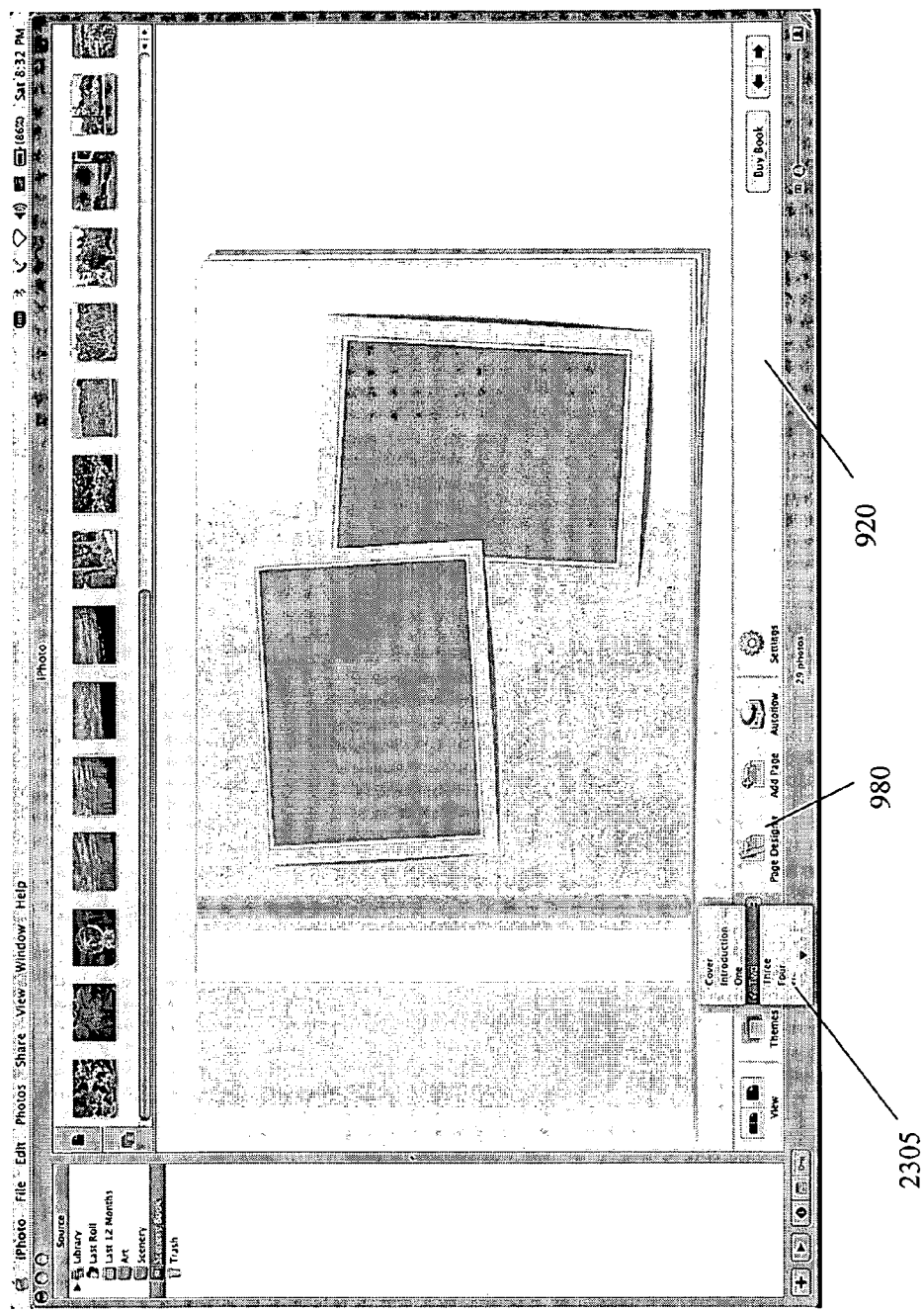
FIG. 23 illustrates a window that opens after the selection of a page-type button.

Specifically, FIG. 23 illustrates that a window 2305 opens when the user selects the page-type button 985. This window 2305 presents the number of picture fields that can be specified for the currently selected photo book page, which is a page that the user has selected (e.g., by clicking on the page or by viewing just that page after selecting the single view icon 955) or that the application has selected as the current page in a two-page view of the photo book. In the example illustrated in FIG. 23, the current page is the third page of the photo book. As shown in FIG. 23, the window 2305 highlights the current number of picture fields on the currently selected page, when the window 2305 first opens. In this example, the window 2305 highlights "Two" as the number of picture fields currently on the selected page 3 of the photo book.

Figure 24:
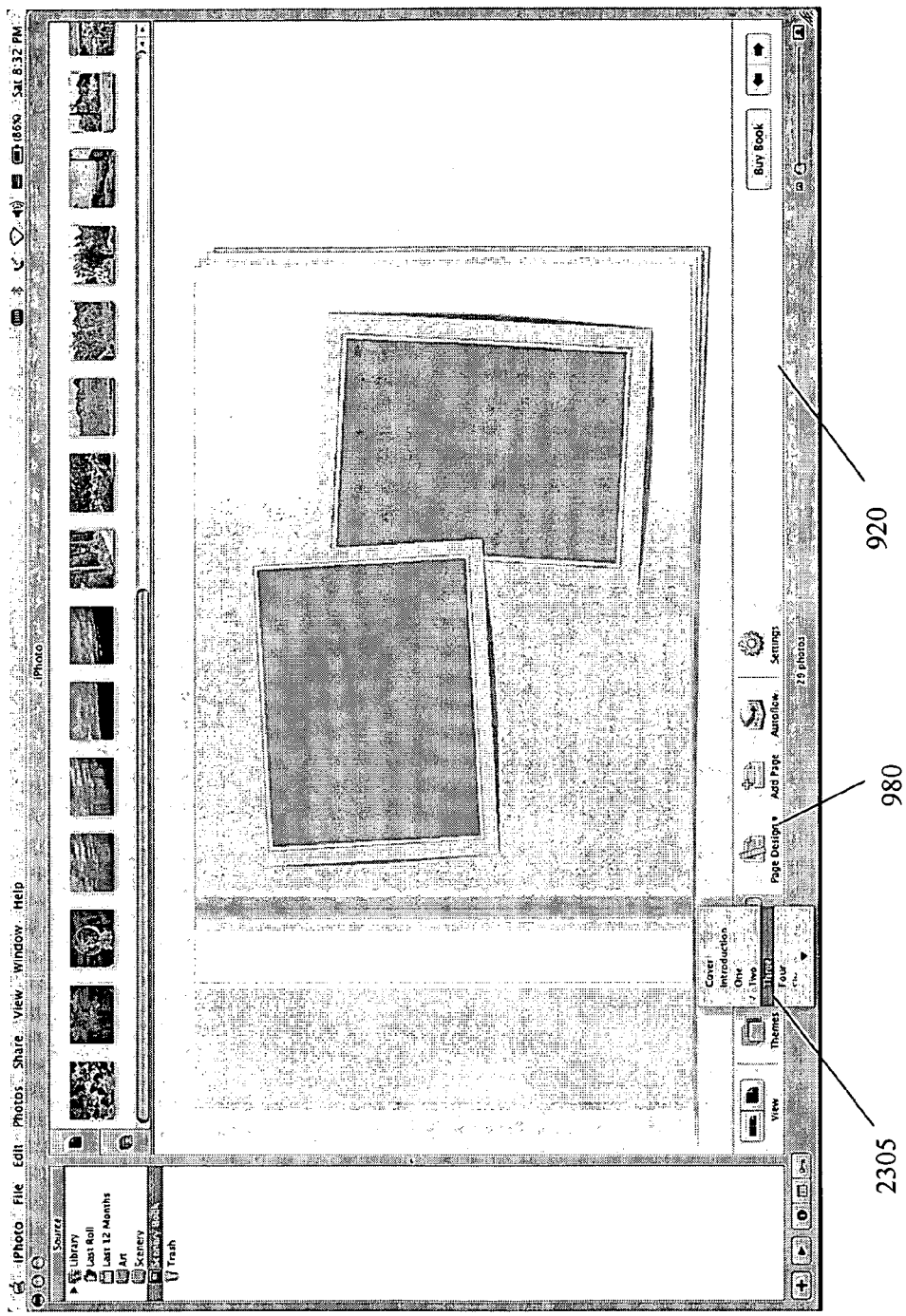
FIG. 24 illustrates window that specifies different number of picture fields for a currently selected page.
Figure 25:
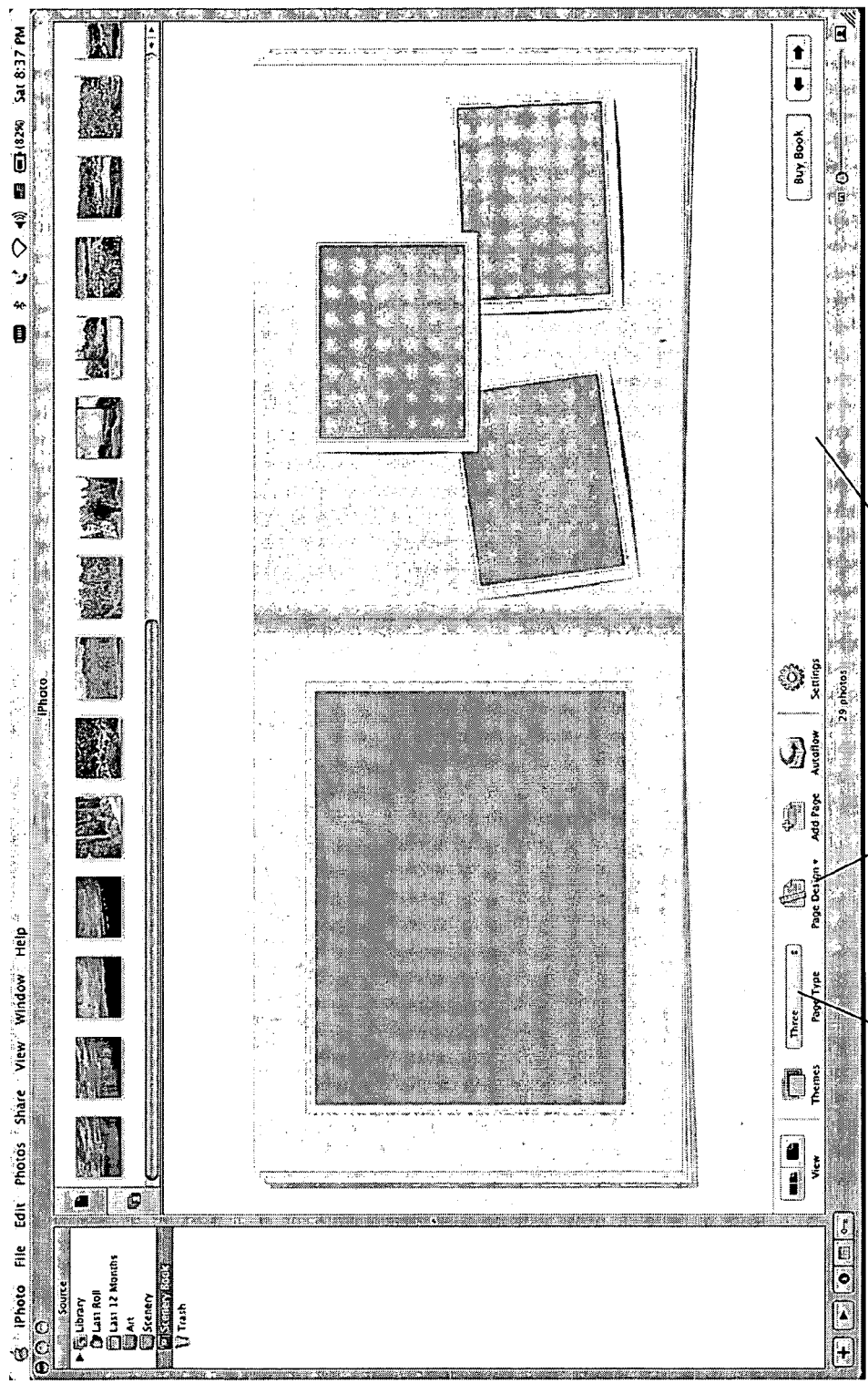
FIG. 25 illustrates that once the user makes a selection, the number of picture fields presented on the selected page of the photo book changes from two to three.

FIG. 24 illustrates that the user can specify a different number of picture fields for the currently selected page by selecting a different number in the window 2305. In this example, the user has specified the number "Three" as the new desired number of picture fields for the selected page 3 of the photo book. Once the user makes a selection, the number of picture fields presented on the selected page 3 of the photo book changes from two to three, as illustrated in FIG. 25. FIG. 25 also illustrates that the current number of picture fields (i.e., "Three" in this example) on a selected page is also identified on the page-type button 985, when the window 2305 closes.

Once the user selects a different number of picture fields for a page, the application presents a layout of the new picture fields that the application's designer has previously specified as an optimal layout for such a number of fields on the currently selected page. This specification is based in some embodiments on just the currently selected page, while it is based in other embodiments on the number of picture fields that are currently presented on the adjacent page that can concurrently be viewed with the currently selected page. For instance, in FIG. 23, the layout of the three picture fields on the selected page 3 is the layout that was specified a priori by a designer of the application to be an ideal layout when the three picture fields on page 3 are viewed in conjunction with the one picture field of page 2, which was illustrated in FIG. 15.

Figure 26:
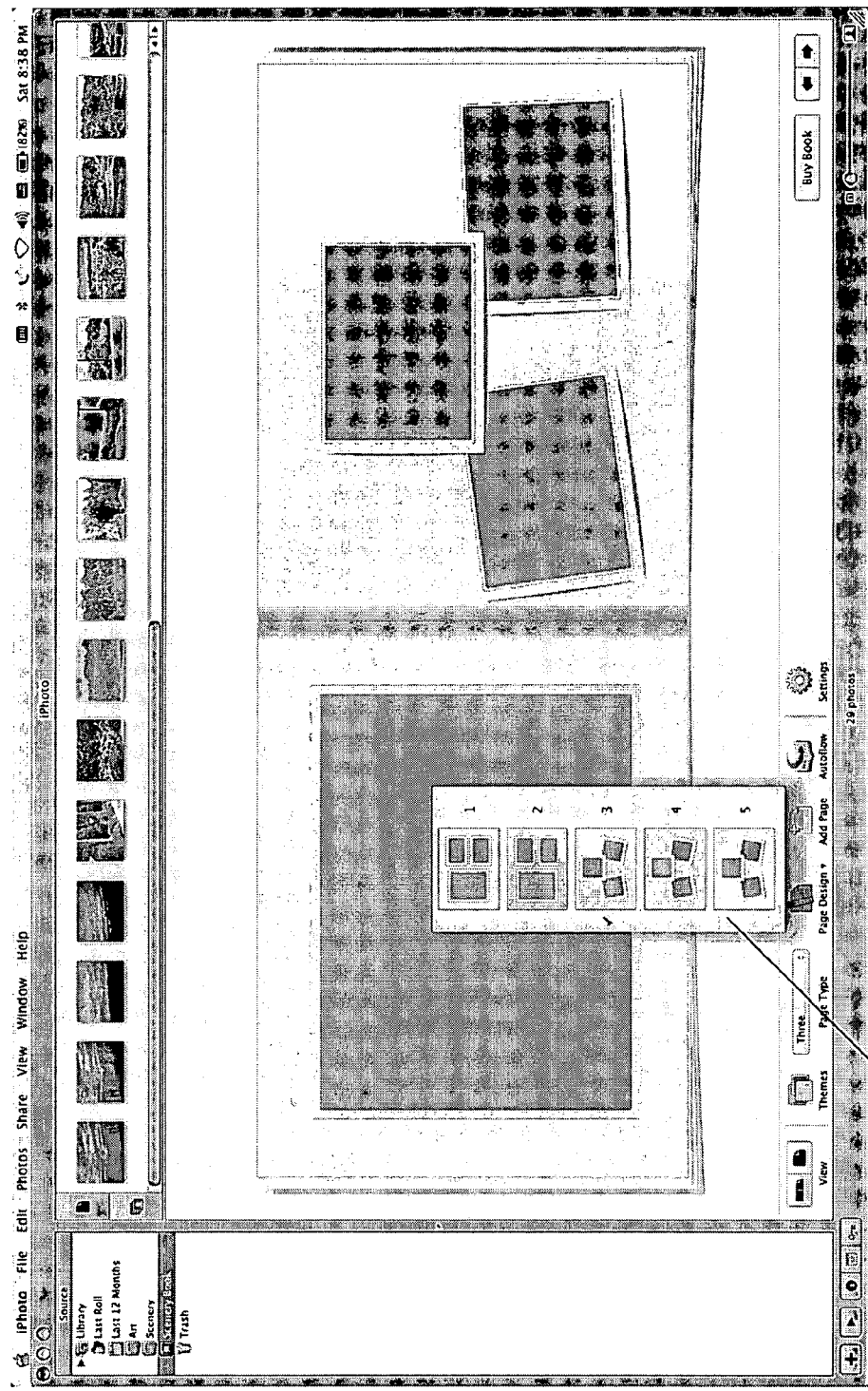
FIG. 26 illustrates that a window opens when the user selects the page-design command icon.
Figure 27:
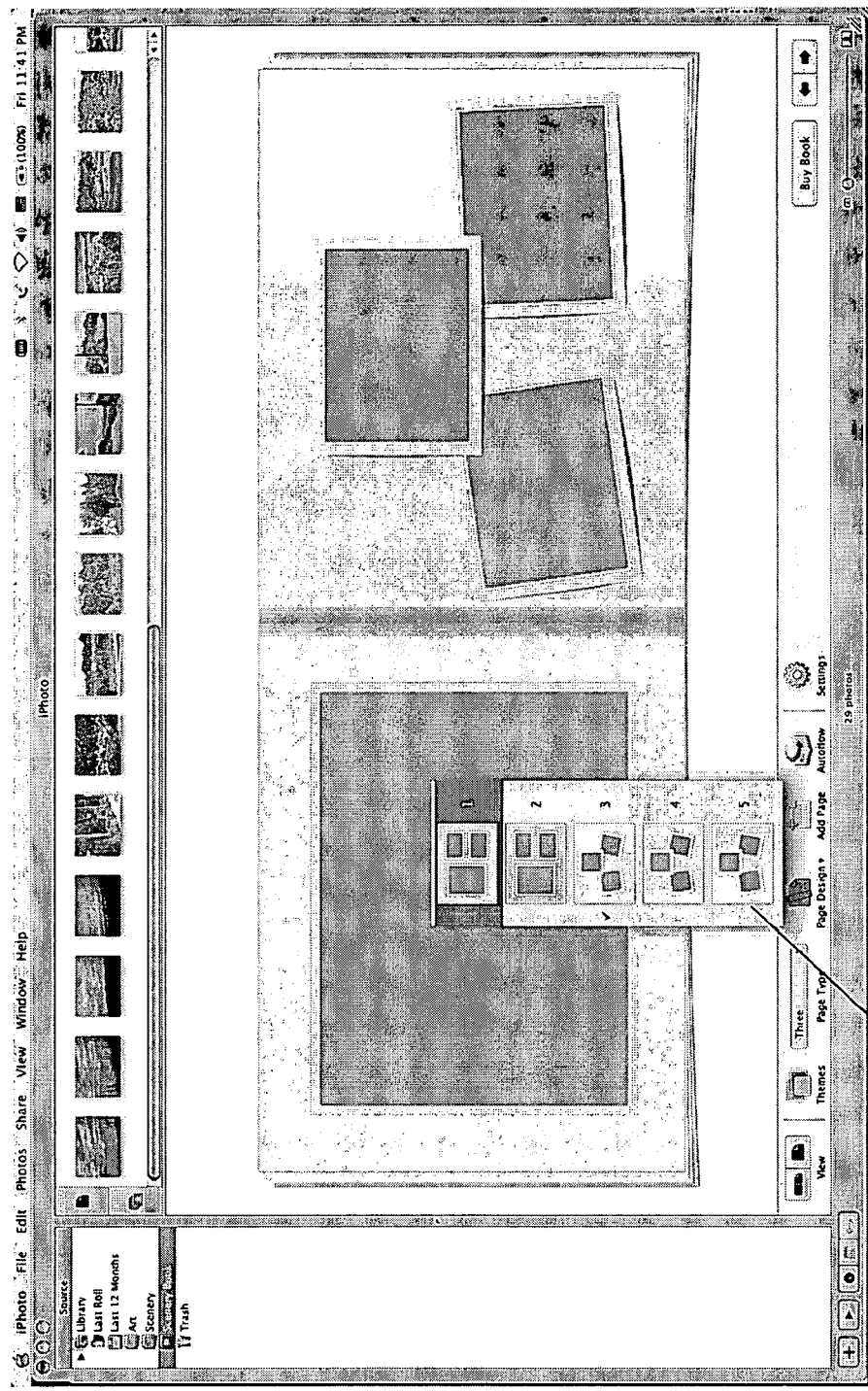
FIG. 27 illustrates that the user can specify a different page design for the currently selected page by selecting a different design in the window.
Figure 28:
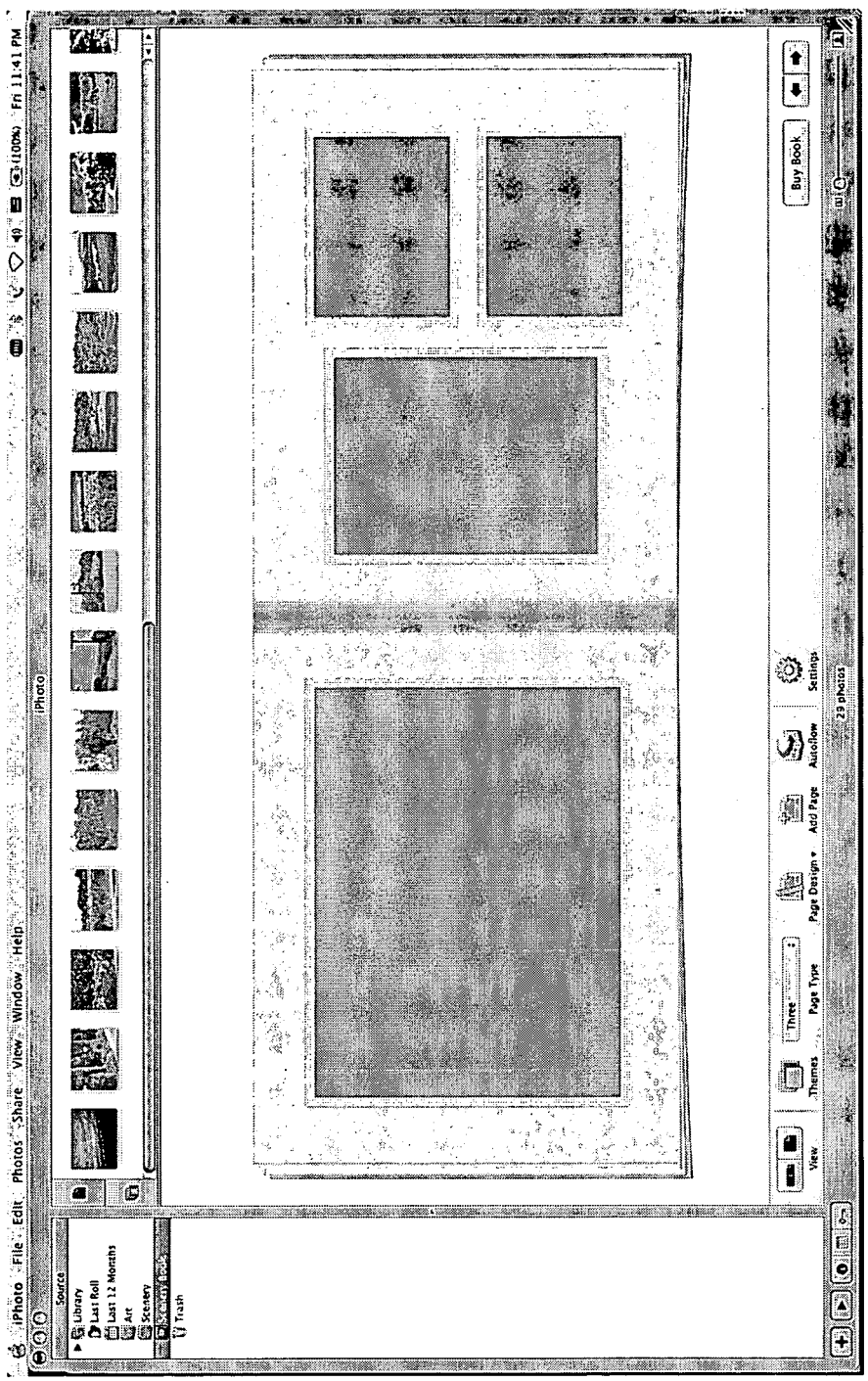
FIG. 28 illustrates a new page design that differs from the page design illustrated in FIGS. 26 and 27 in terms of the layout of the three picture fields and in terms of the background color of the page.

FIGS. 26-28 illustrate an example of how some embodiments allow a user to change the layout of the picture fields on a photo book page through a page-design command icon 980 in the edit-control section 920. The page-design command more generally allows the user to change the design of a page, which not only can include the layout of the picture field(s) on this page but can also include other thematic attributes. These attributes can include the background color of the page, the position of text on the page, the appearance of the page, the frame or presentation of a picture field on the page, etc.

FIG. 26 illustrates that a window 2605 opens when the user selects the page-design command icon 2680. This window 2605 presents a thumbnail preview of several different layouts for the current number of picture fields on the currently selected photo book page. Again, the currently selected photo book page is a page that the user has selected (e.g., by clicking on the page or by viewing just that page after selecting the single view icon 955). The application may also select the current page in a two-page view of the photobook. In this example, the selected page is the third page of the photo book after the changing of the number of picture fields from two to three. As shown in FIG. 26, the window 2605 identifies the page design of the currently selected page by placing a check next to one, of the page designs in the window 2605. Also, the page designs that are illustrated in the window 2605 are different based on at least one of their thematic attributes. For instance, the page designs illustrated in window 2605 of FIG. 26 differ in their page layout, page color, or both.

FIG. 27 illustrates that the user can specify a different page design for the currently selected page by selecting a different design in the window 2605. In this example, the user has specified the design that appears at the top of this window 2605. Once the user makes a selection, the design of the selected page 3 of the photo book changes from the design illustrated in FIGS. 26 and 27 to the design illustrated in FIG. 28. The new page design in FIG. 28 differs from the page design illustrated in FIGS. 26 and 27 in terms of the layout of the three picture fields and in terms of the background color of the page.

Figure 29:
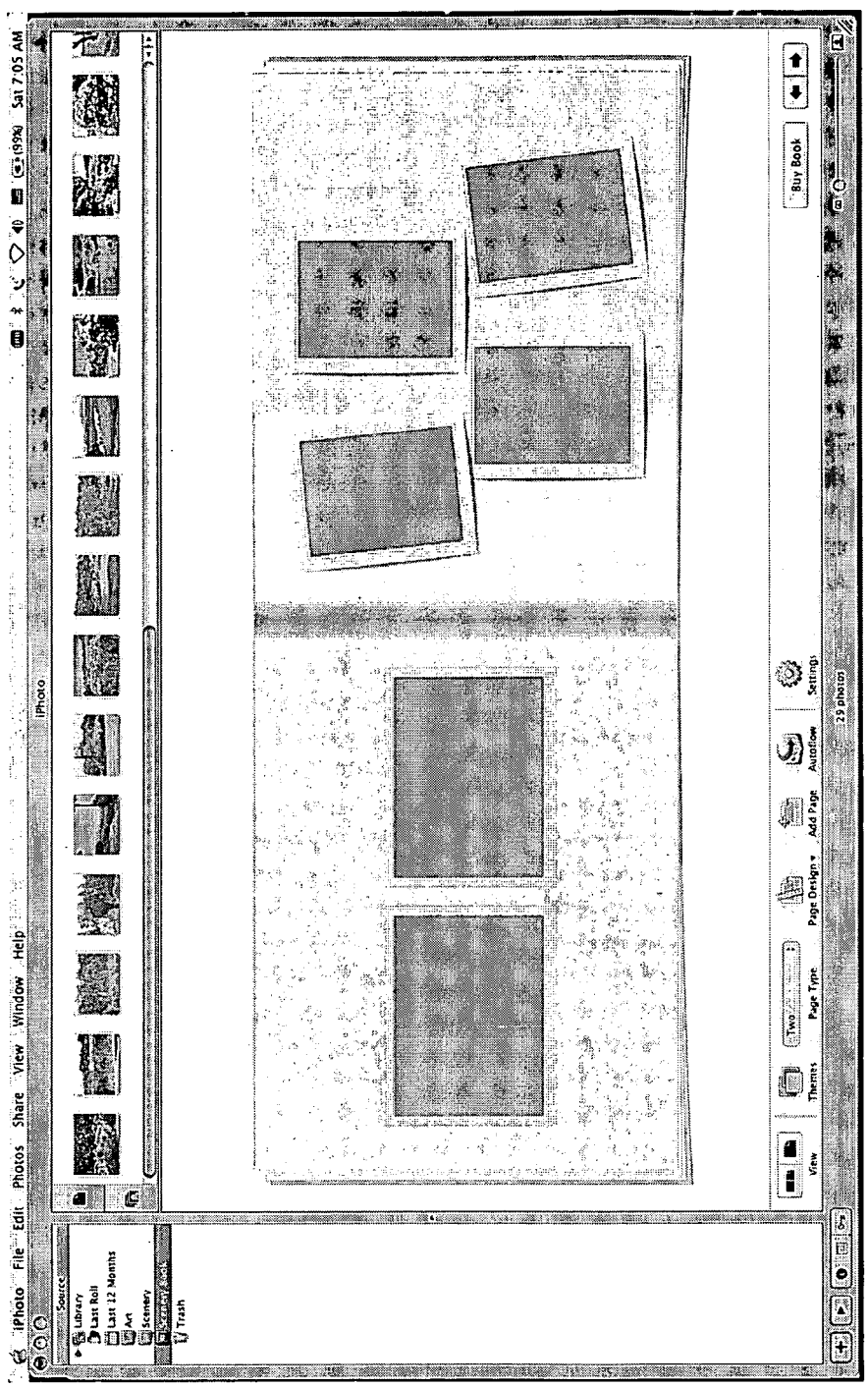
FIG. 29 illustrates that if the user clicks on the Add Page icon while viewing the page 3 of the Scenery photo book, the original pages 4 and 5 become pages 5 and 6 of the photo book and a new page 4 is added to the photo book.
Figure 30:
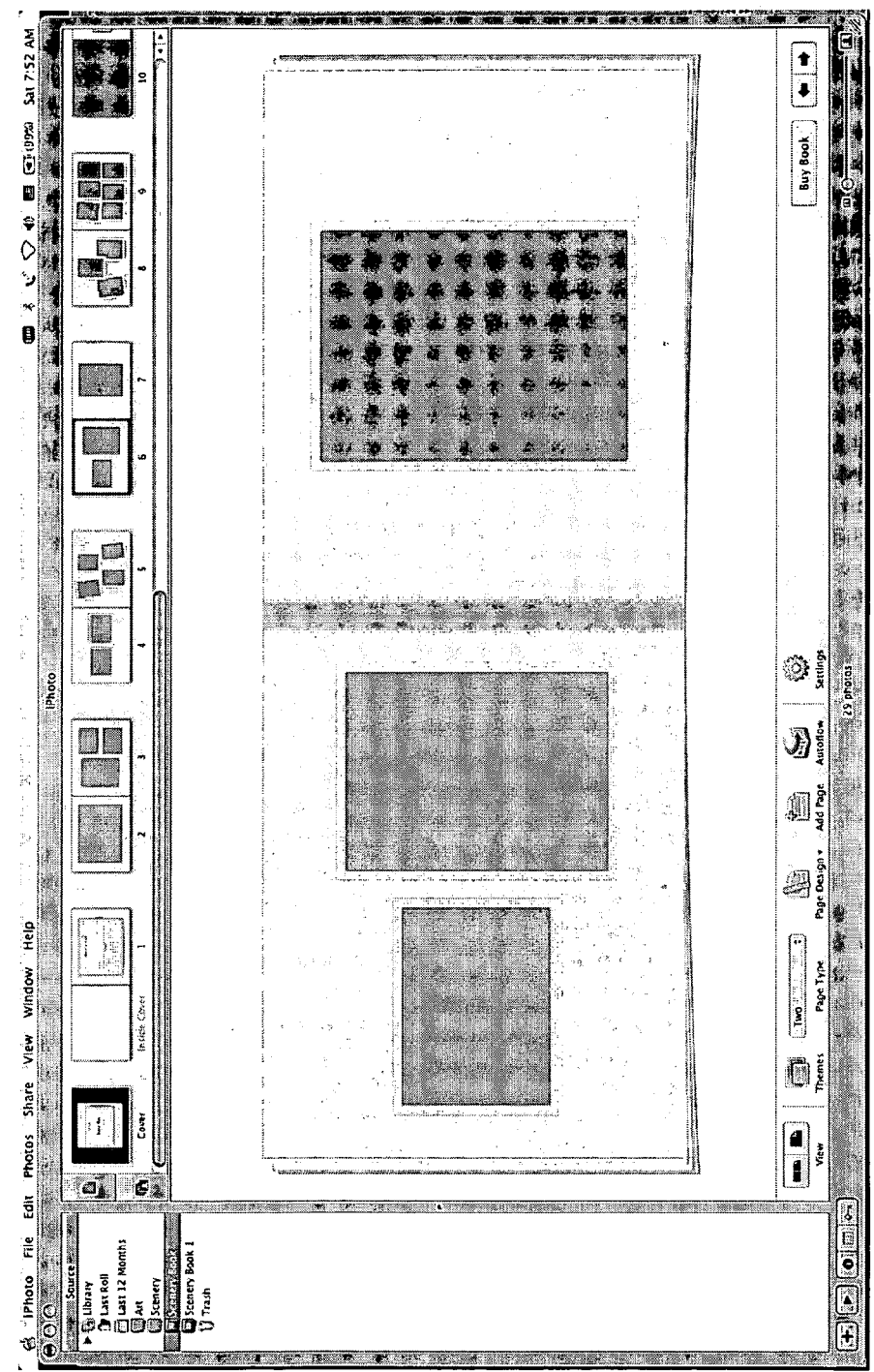
FIG. 30 also illustrates that if the user clicks on the Add Page icon while viewing the page 3 of the Scenery photo book, the original pages 4 and 5 become pages 5 and 6 of the photo book and a new page 4 is added to the photo book.

A user can also add pages to a photo book through the "Add Page" icon 990 in the edit-control section 920 illustrated in FIG. 9. When the user selects this icon, the application adds a page to the photo book following the current page that the user is viewing in the photo book. For instance, as mentioned above, FIG. 18 illustrates the original pages 4 and 5 in the Scenery photo book example of FIGS. 13-16. Now, if the user clicks on the Add Page icon 990 while viewing the page 3 of the Scenery photo book, the original pages 4 and 5 become pages 5 and 6 of the photo book and a new page 4 is added to the photo book, as illustrated in FIGS. 29 and 30.

Figure 31:
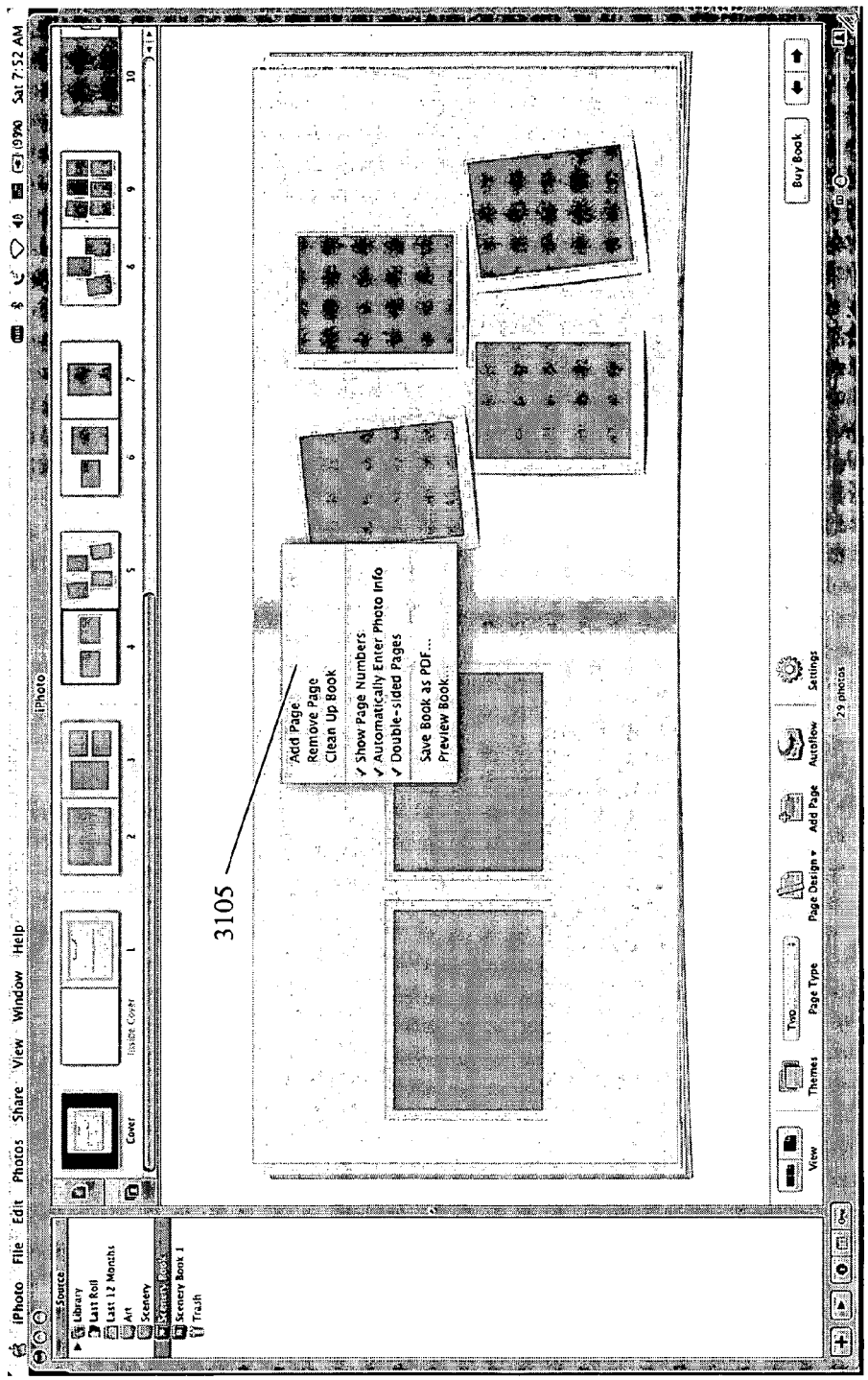
FIG. 31 illustrates that some embodiments also allow a user to add or remove a page from a photo book through a command window that the user can open on top of the photo book page.

Some embodiments also allow a user to add or remove a page to or from a photo book through the menu options presented on top of the application (e.g., through the drop-down Edit menu option, which includes Add Page and Remove Page commands). As shown in FIG. 31, some embodiments also allow a user to add or remove a page to or from a photo book through a command window 3105 that the user can open on top of the photo book page (e.g., by performing a control-click or right-hand click operation while the cursor is over a portion of a photo book page that is not covered by a picture field). FIG. 31 also illustrates this command window 3105 to include a Clean Up book option. This Clean Up book option will be further described below in Sections VIII and X.

VI. Adding and Removing Pictures and Picture Fields to the Photo Book Pages

Figure 32:
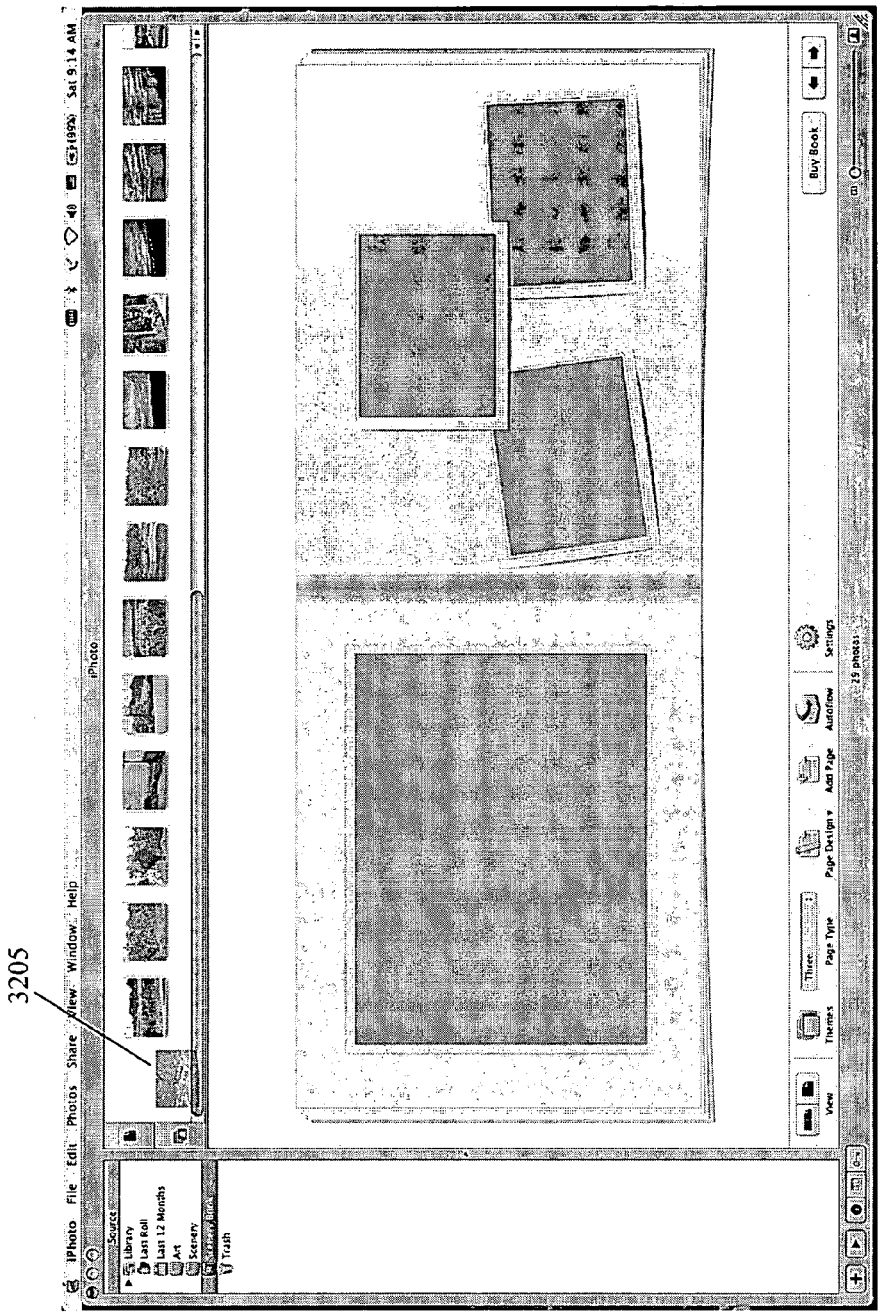
FIG. 32 illustrates the start of the dragging of a selected picture thumbnail in the preview section.
Figure 33:
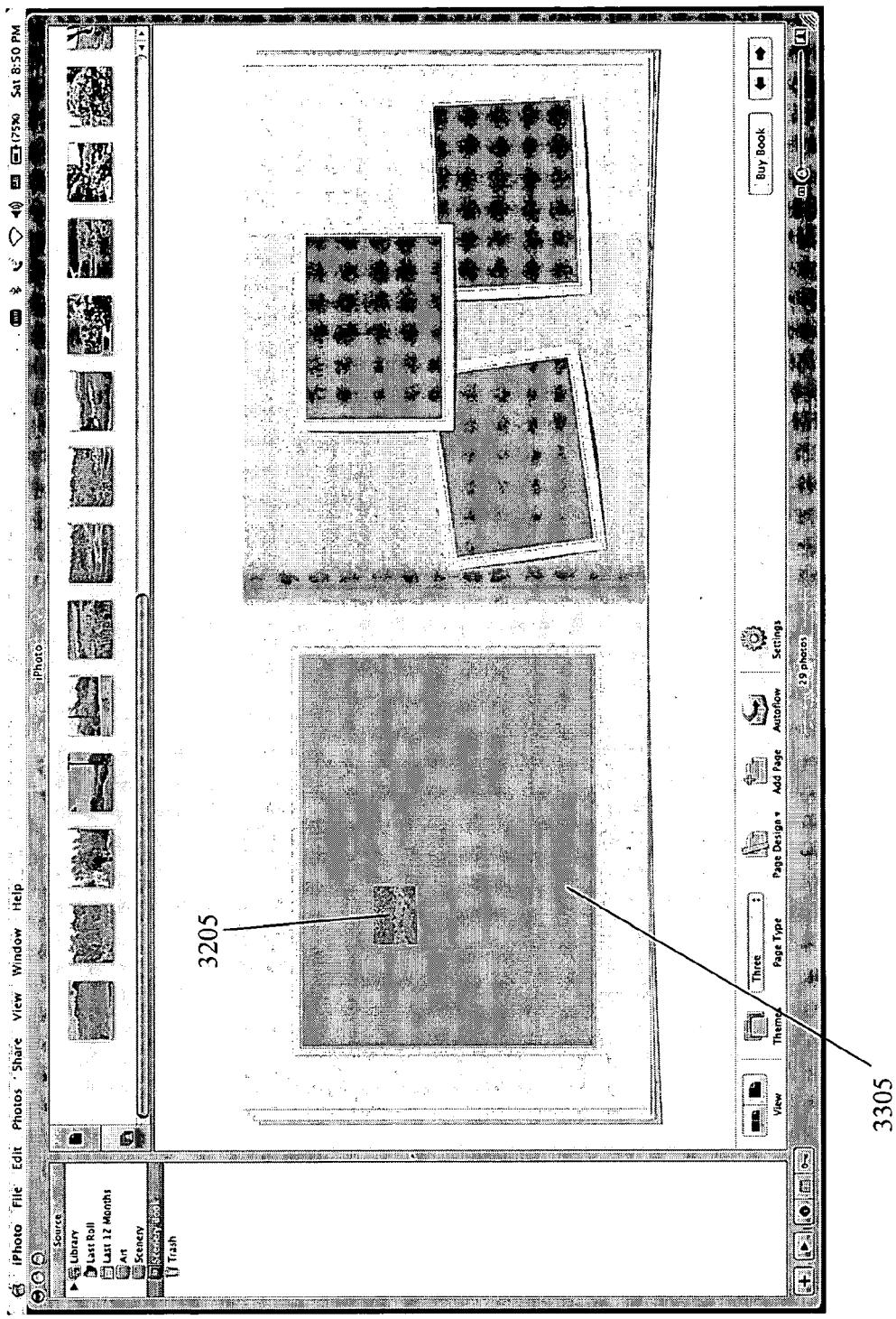
FIG. 33 illustrates the dragging of the selected picture thumbnail on top of a picture field on page 2 of the Scenery photo book.
Figure 34:
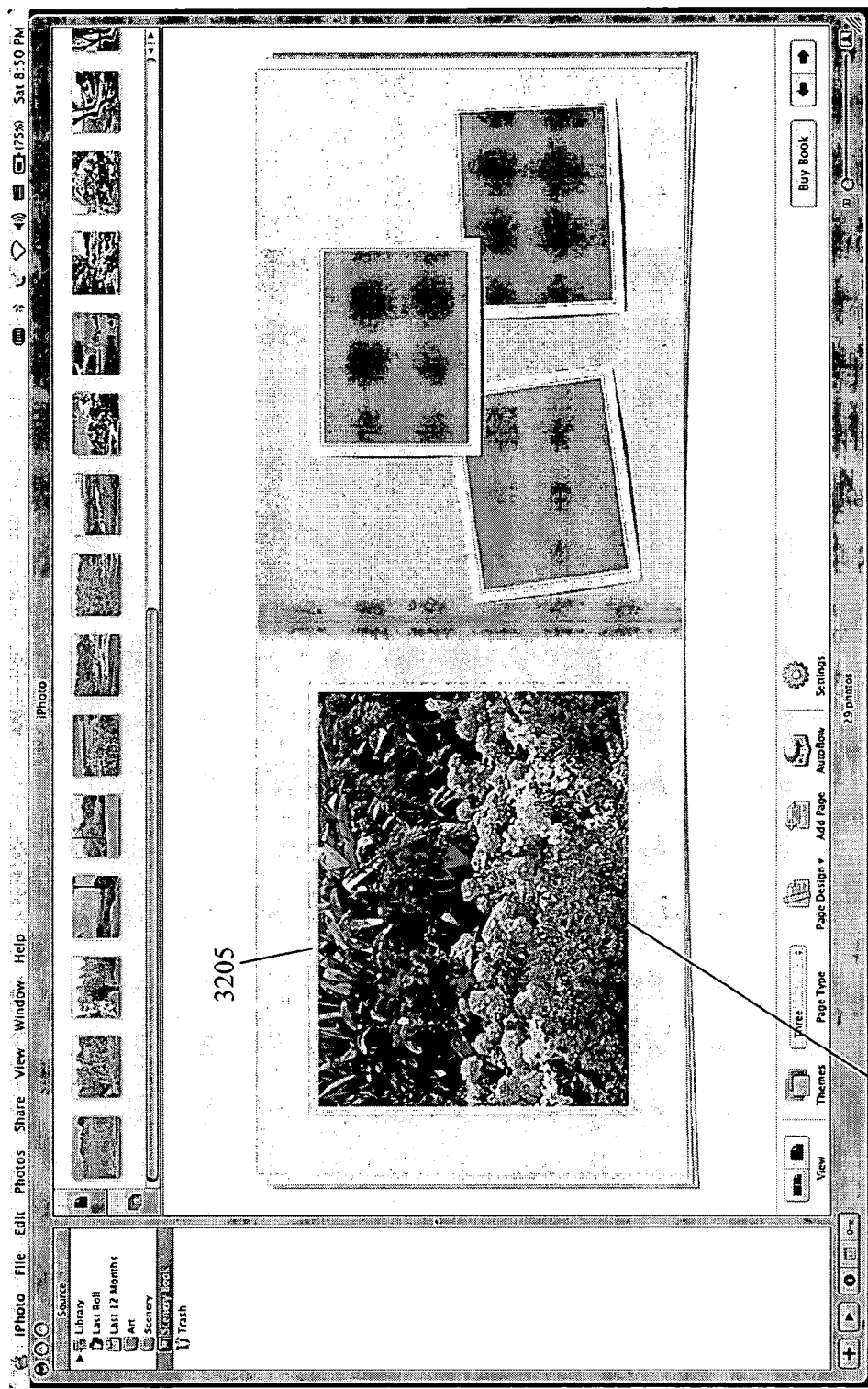
FIG. 34 illustrates the presentation of the picture associated with the thumbnail in the picture field.

Some embodiments allow a user to add and remove pictures and picture fields to and from the photo book by dragging pictures from the thumbnail preview display section 905. One way of adding a picture to the photo book is to drag the picture's thumbnail from the display section 905 to an empty picture field in the photo book. An example of such an operation is illustrated in FIGS. 32-34. FIG. 32 illustrates the start of the dragging of a selected picture thumbnail 3205 in the preview section 905. FIG. 33 illustrates the dragging of this picture thumbnail 3205 on top of picture field 3305 on page 2 of the Scenery photo book, which was discussed in the example in the prior sections. FIG. 34 illustrates the presentation of the picture associated with the thumbnail 3205 in the picture field 3305.

Figure 35:
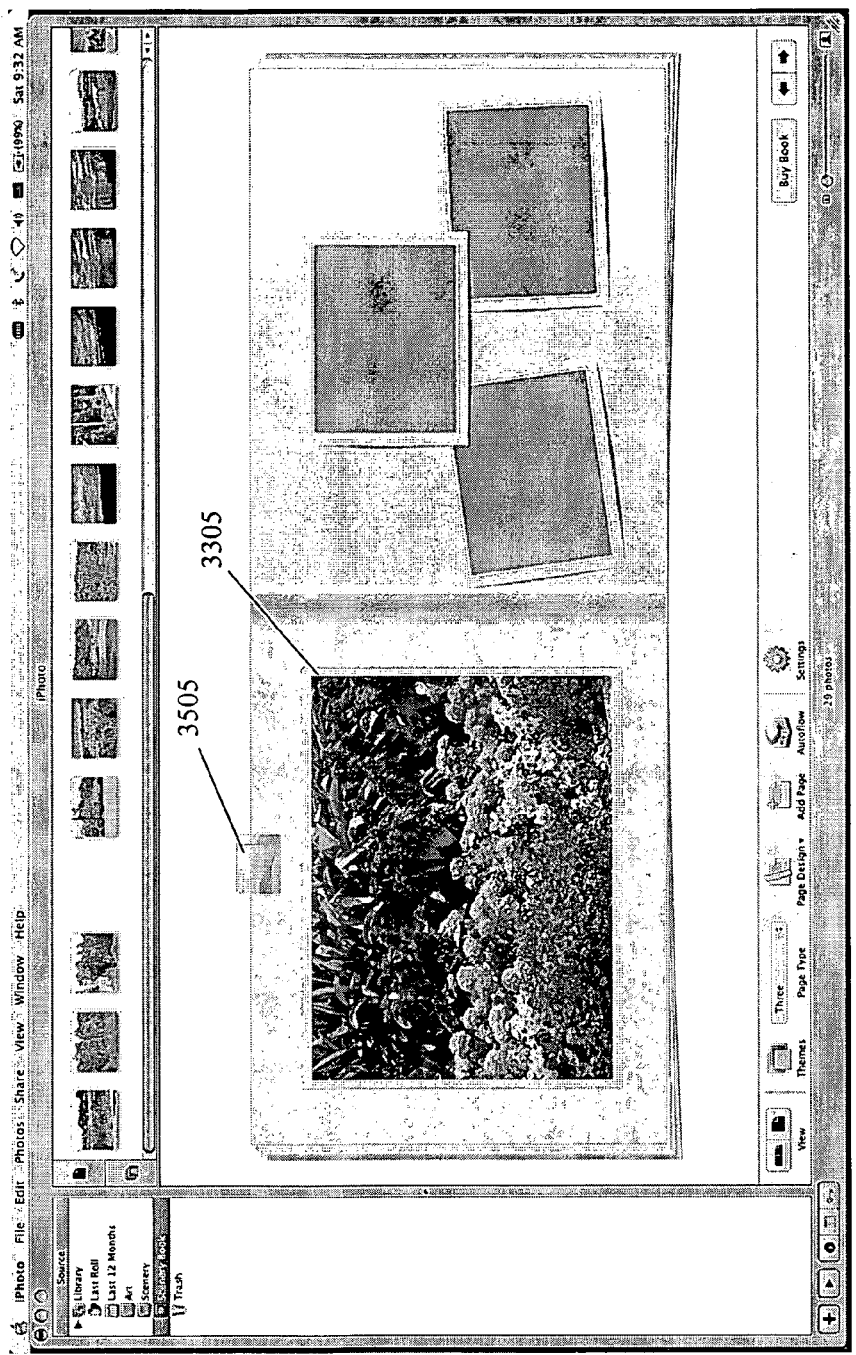
FIG. 35 illustrates the dragging of a picture thumbnail to a location on the top of page 2 of the Scenery photo book above the picture field.
Figure 36:
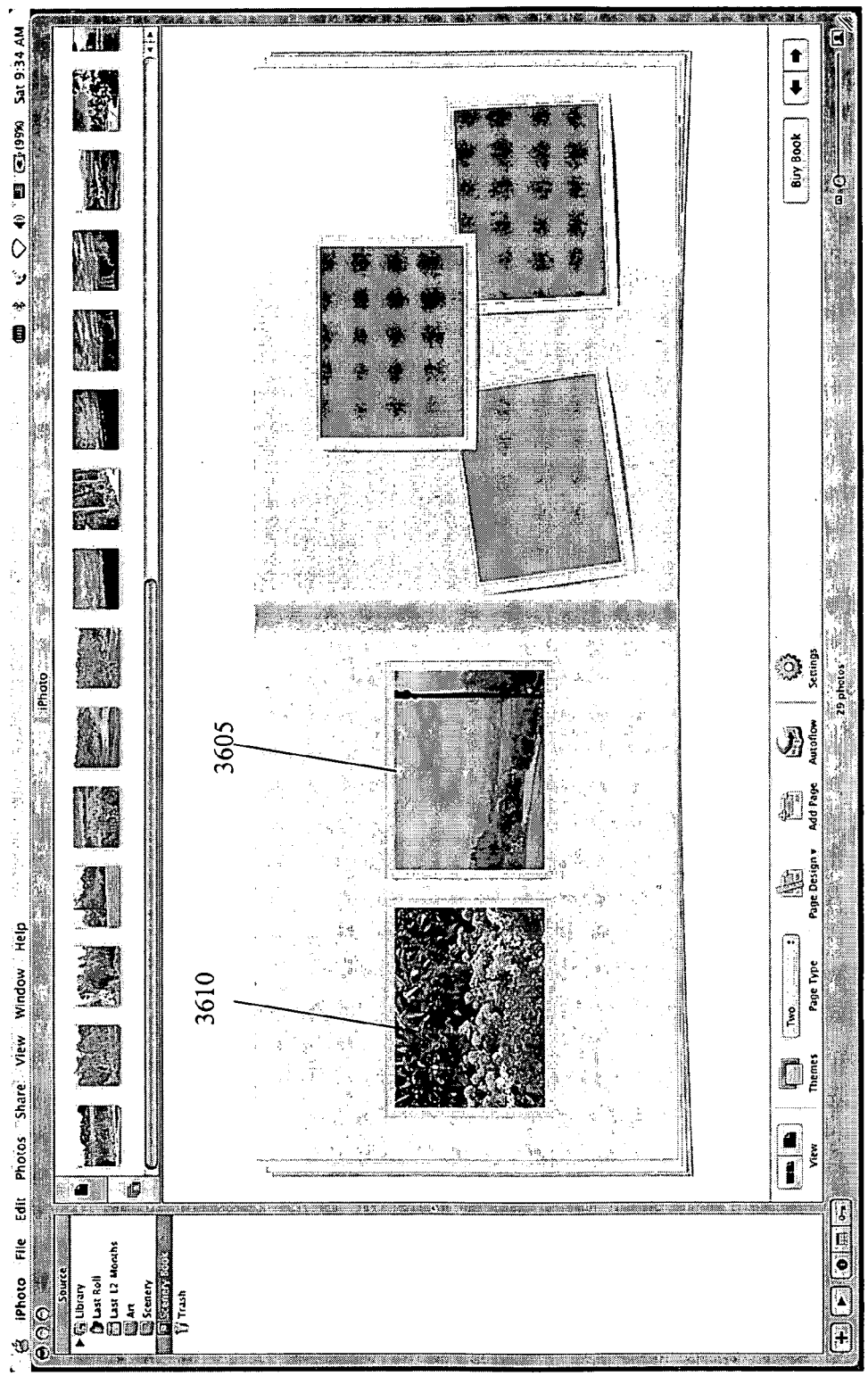
FIG. 36 illustrates that when the picture thumbnail is dropped at this location the application adds a new picture field to the page and display the picture associated with the thumbnail in the added picture field.

FIGS. 35 and 36 illustrate that another way to add a picture to the photo book is to drag the picture's thumbnail from the display section 905 to a location on a page of the photo book that is not occupied by a picture field. Specifically, FIG. 35 illustrates the dragging of a picture thumbnail 3505 to a location on the top of page 2 of the Scenery photo book above the picture field 3305. FIG. 36 then illustrates that when the picture thumbnail 3505 is dropped at this location (e.g., the cursor controller button is released while the cursor is at this location), the application adds a new picture field 3605 to the page and displays the picture associated with the thumbnail in the added picture field 3605.

In FIG. 36, the application also changes the previously defined picture field 3305 to a new picture field 3610. The application picks the attributes of the new picture field (e.g., the picture field's orientation, layout and type) and modifies previously defined picture field(s) to maximize the expected aesthetic appeal of the page. To maximize the aesthetic appeal, the application in some embodiments considers a variety of factors, such as the layout of any page that can be viewed concurrently with the current page, the orientation of the pictures on the current page, the theme of the photo book, the layout of other pages in the photo book, etc. For instance, FIG. 36 illustrates that the application picks the side-by-side layout for the page 2 of the photo book as this layout nicely matches the three picture field layout on page 3 of the photo book.

Figure 37:
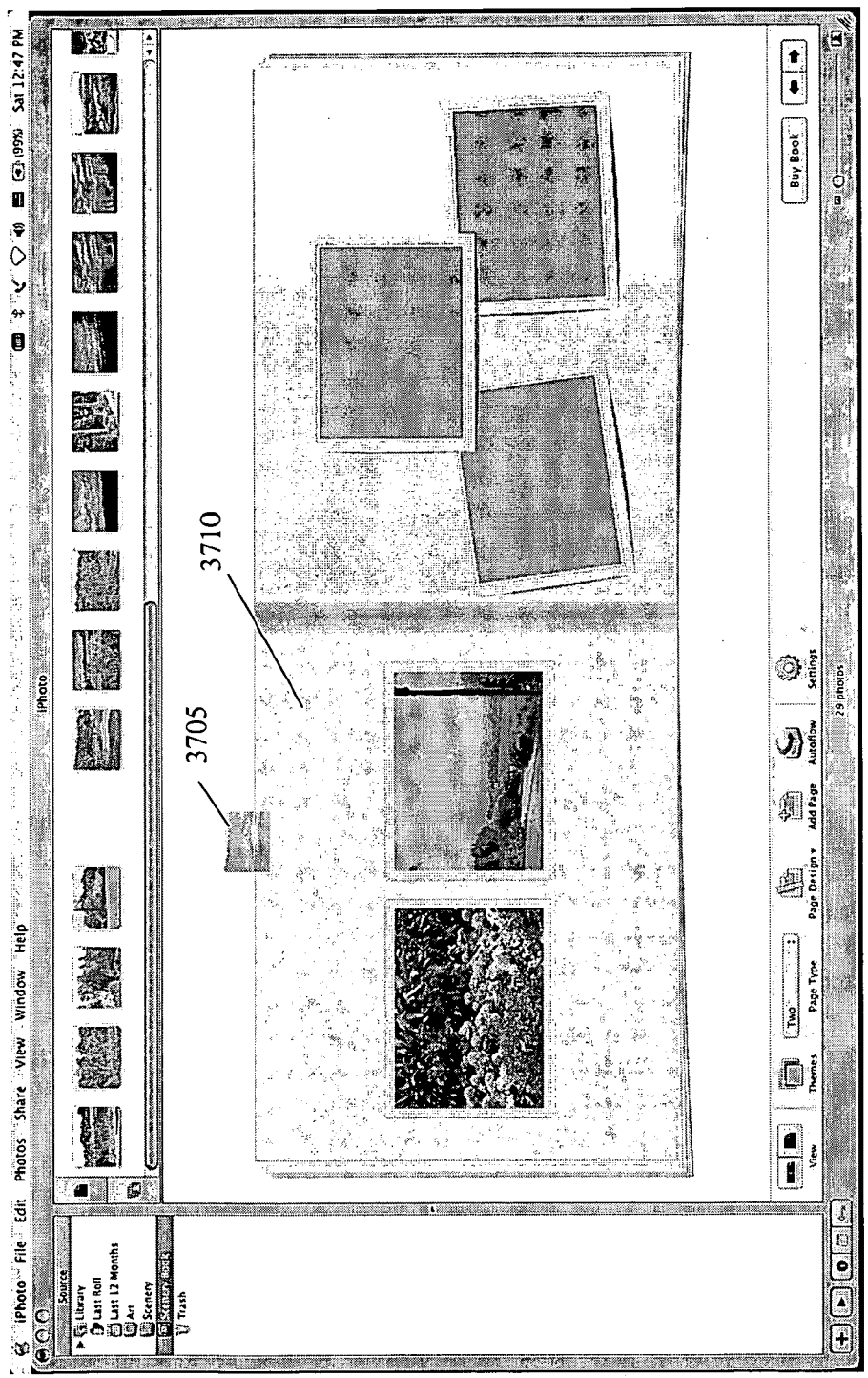
FIG. 37 illustrates the dragging of another picture thumbnail to a non-picture-field location on page 2 of the photo book.
Figure 38:
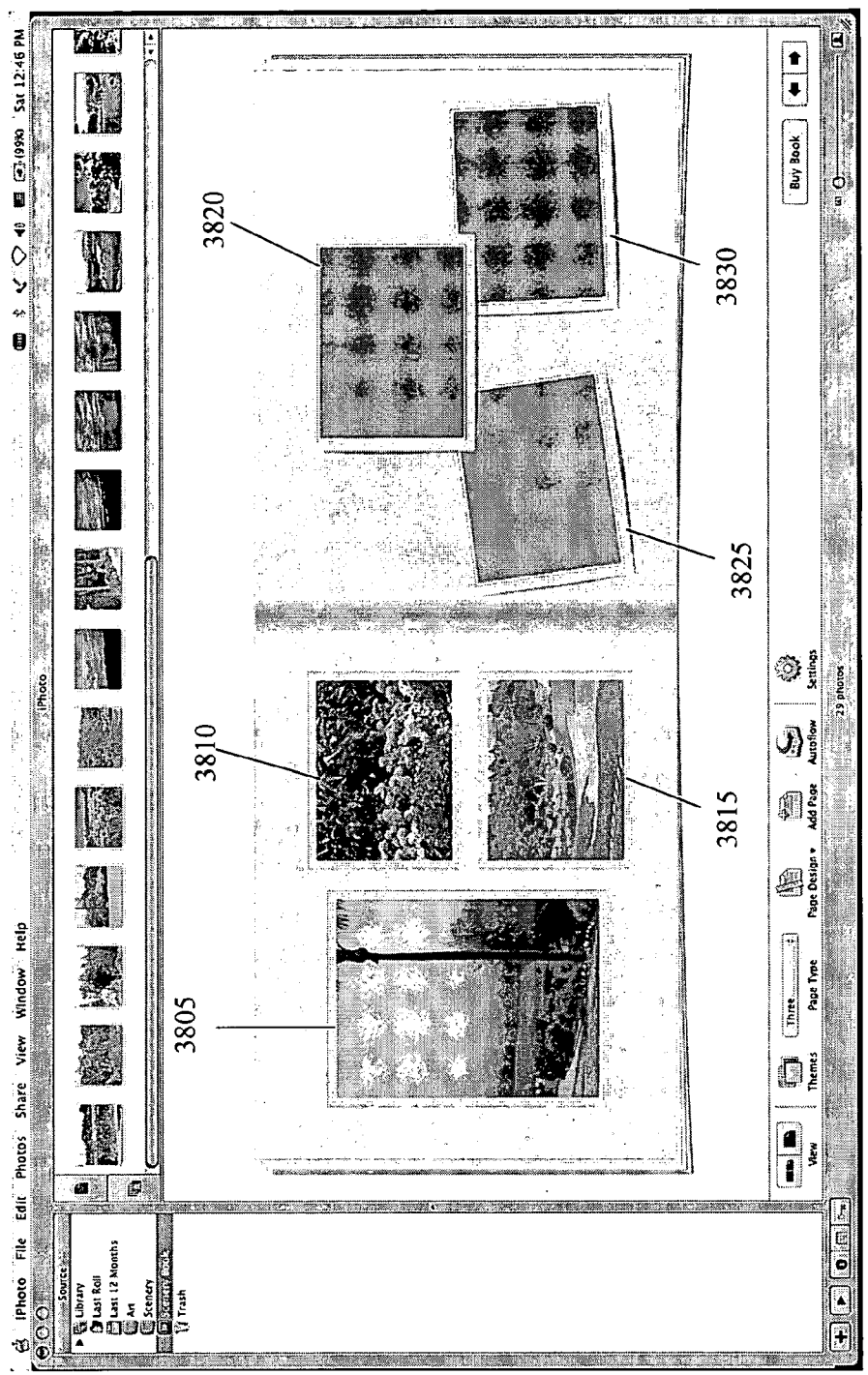
FIG. 38 illustrates that the dragging illustrated in FIG. 37 results in page 2 having three picture fields.

FIGS. 37-38 provide another example that illustrates these aesthetic considerations. Specifically, FIG. 37 illustrates the dragging of another picture thumbnail 3705 to a non-picture-field location 3710 on page 2 of the photo book. As shown in FIG. 38, this dragging results in page 2 having three picture fields 3805-3815. As shown in this figure, the application selects the layout of these three fields 3805-3815 to be different than the layout of the three picture fields 3820-3830 on the adjacent page 3 of the photo book, as differing layouts on two pages that can be concurrently viewed is more aesthetically pleasing than two identical layouts on two such pages.

Figure 39:
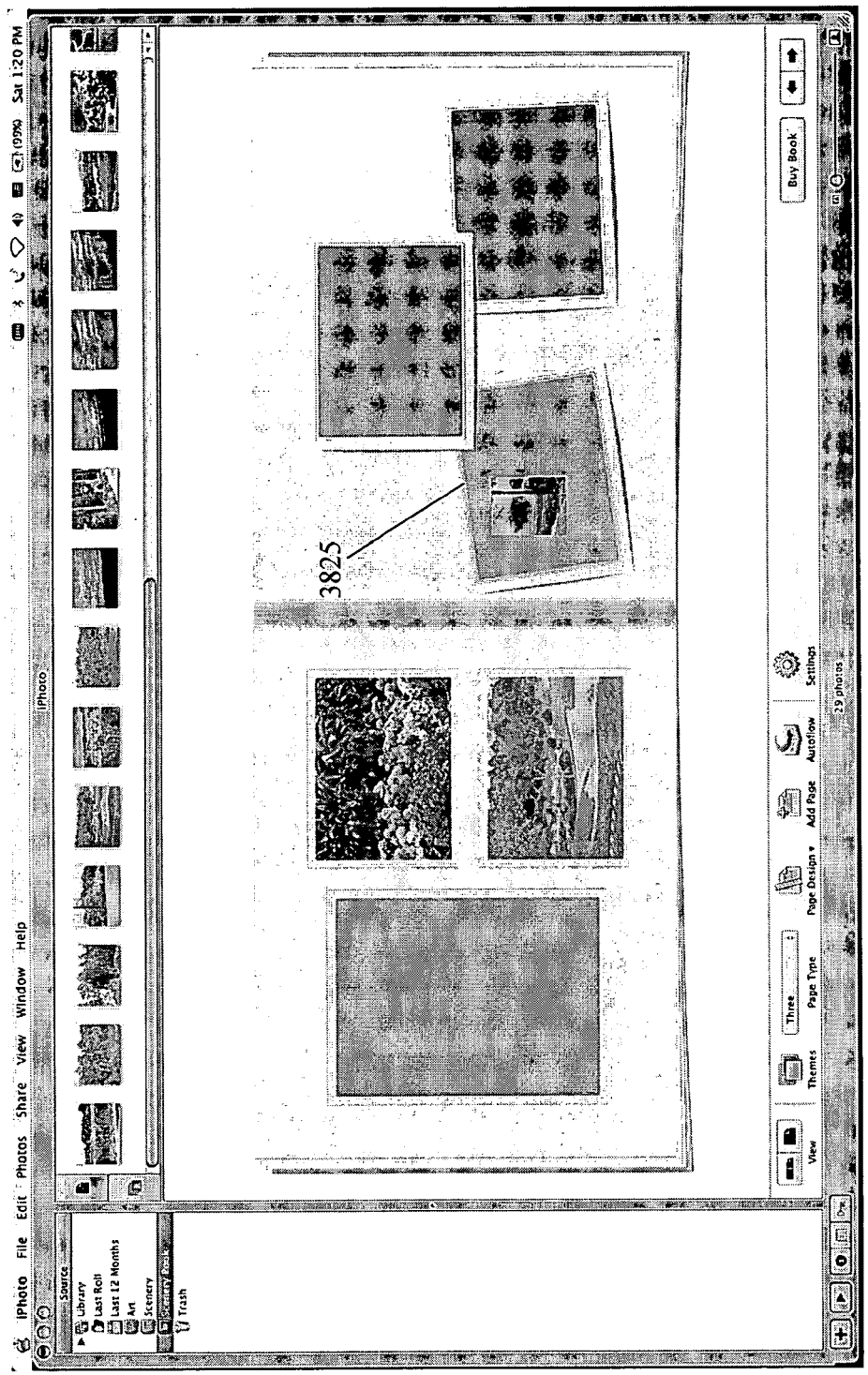
FIG. 39 illustrates the dragging of a landscape picture in a field on page 2 to the landscape picture field on page 3 of the photo book.
Figure 40:
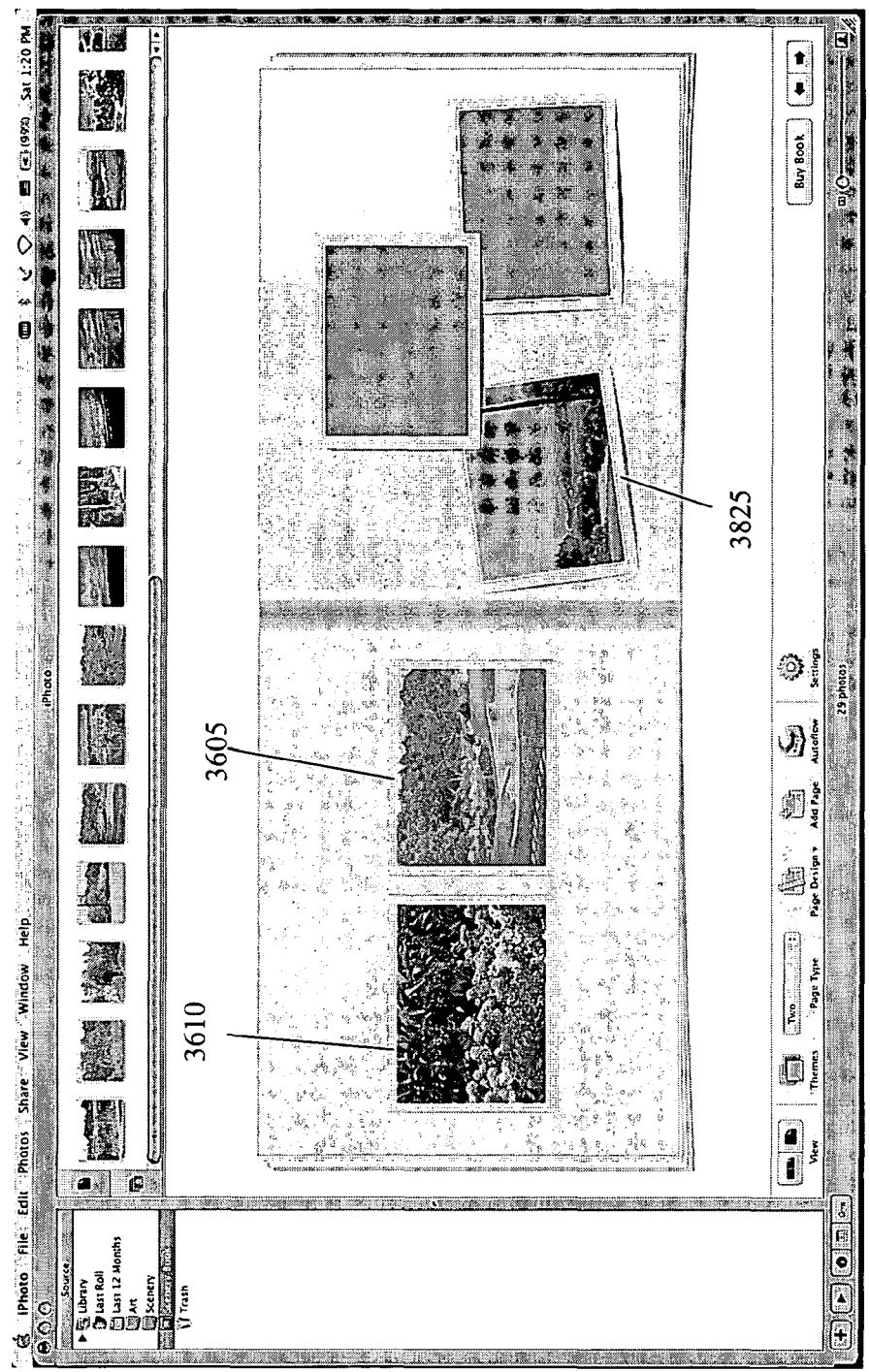
FIG. 40 illustrates the resulting appearance of the pictures and picture fields on pages 2 and 3.

In addition, given that all three pictures on page 2 have a landscape orientation and that one of the picture fields 3805 has a portrait orientation, the application ends up displaying only a portion of the landscape picture that it presents in picture field 3805, as shown in FIG. 38. If the user does not like the limited view of the picture in the field 3805, the user can always adjust the picture through pan, zoom, and fit-to-frame operations, which will be further described below. The user can also drag the landscape picture to a landscape picture field on the page or an adjacent page. For instance, FIG. 39 illustrates the dragging of the landscape picture in the field 3805 to the landscape picture field 3825 on page 3 of the photo book. FIG. 40 then illustrates the resulting appearance of the pictures and picture fields on pages 2 and 3.

As shown in FIG. 40, the dragging of the picture to the field 3825 not only took away the picture from page 2 but also eliminated the picture field 3805 from this page and caused the picture fields 3810 and 3815 to be replaced by picture fields 3605 and 3610.

Figure 41:
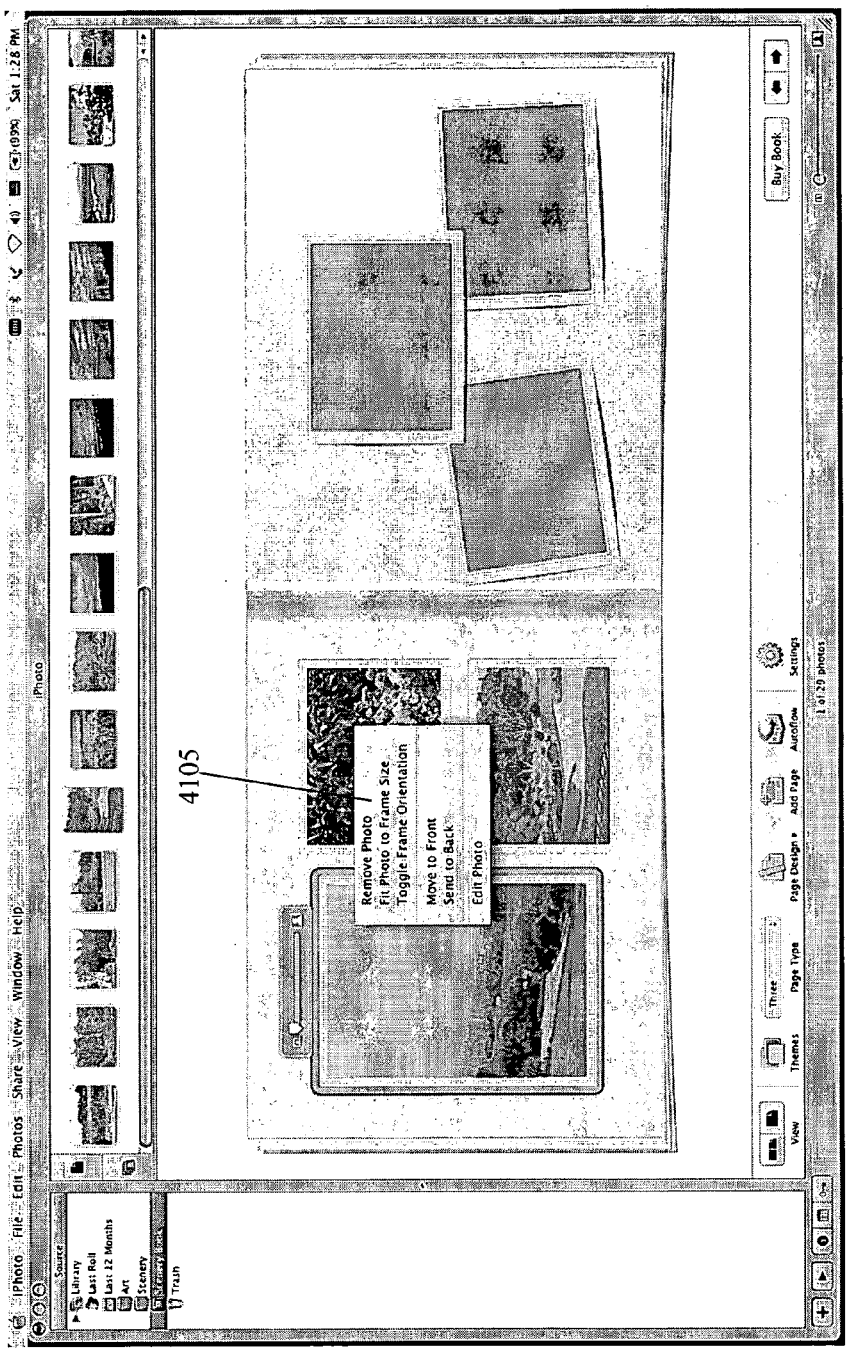
FIG. 41 illustrates a window for removing a picture from its picture field in the photo book.
Figure 42:
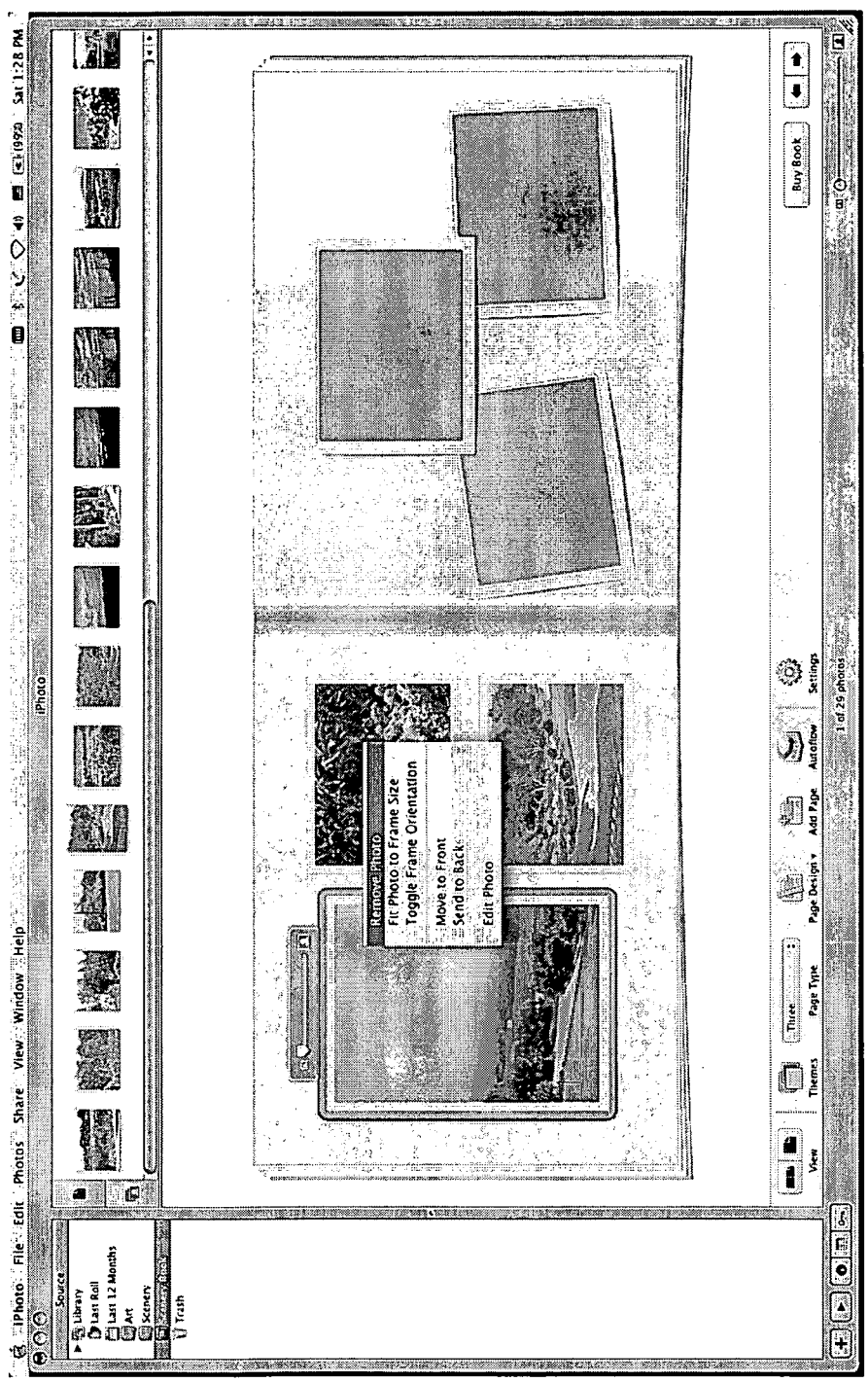
FIG. 42 illustrates the selection of the Remove Photo command in a window.
Figure 43:
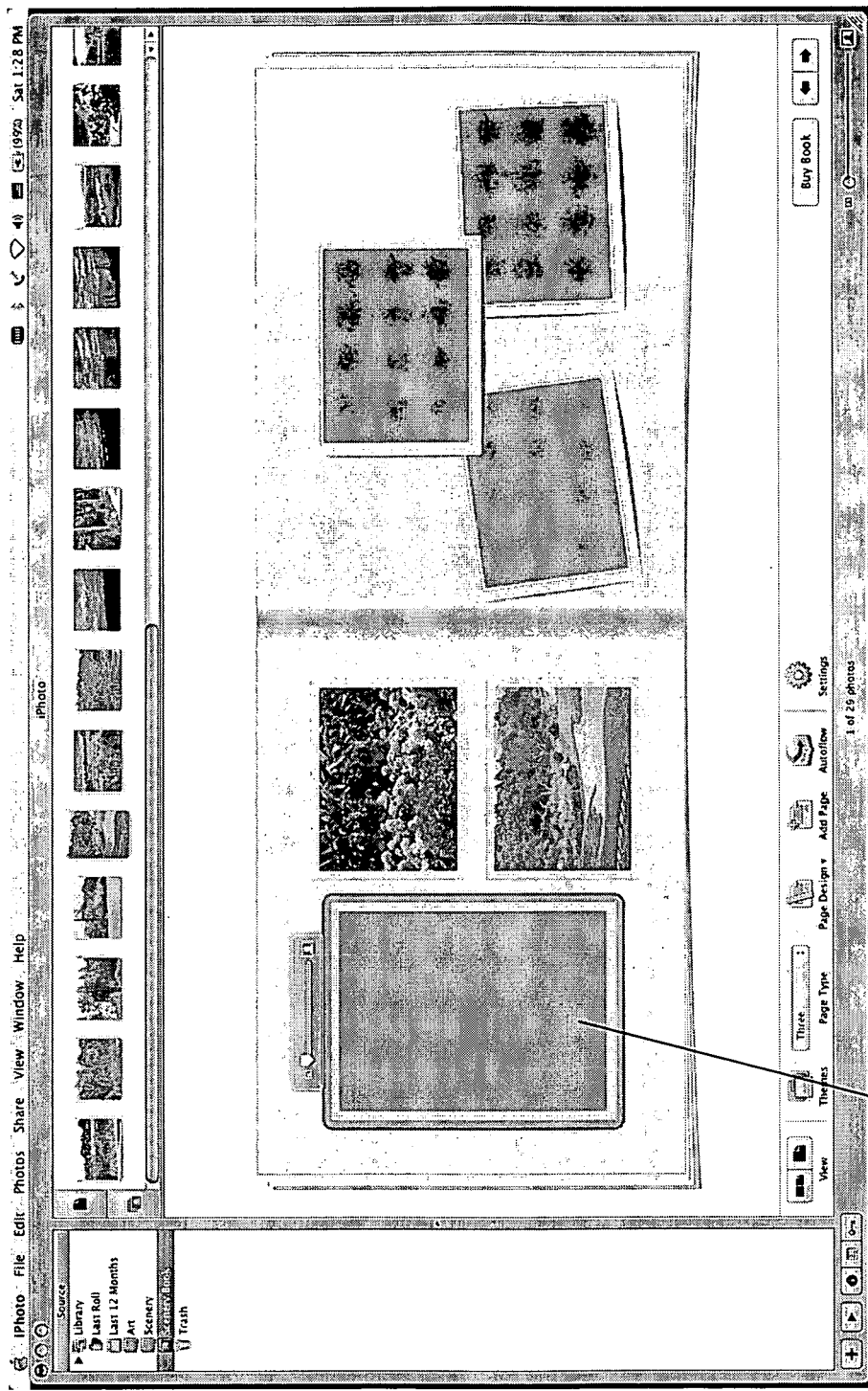
FIG. 43 illustrates page 2 of the photo book after the removal of the picture from the picture field.

Some embodiments also allow a user to remove a picture from a picture field without removing the picture field from the photo book. For instance, some embodiments allow the user to remove a picture through the menu options presented on top of the application (e.g., through the drop-down Edit menu option, which might include a Remove Picture command). Also, FIGS. 41-43 illustrate that some embodiments allow a user to remove a picture without removing its picture field through a command window 4105 that the user can open on top of the picture (e.g., by performing a control-click or right-hand click operation while the cursor is over the picture field). FIG. 42 illustrates the selection of the Remove Photo command in this window, while FIG. 43 illustrates page 2 of the photo book after the removal of the picture from the picture field 3805.

Figure 44:
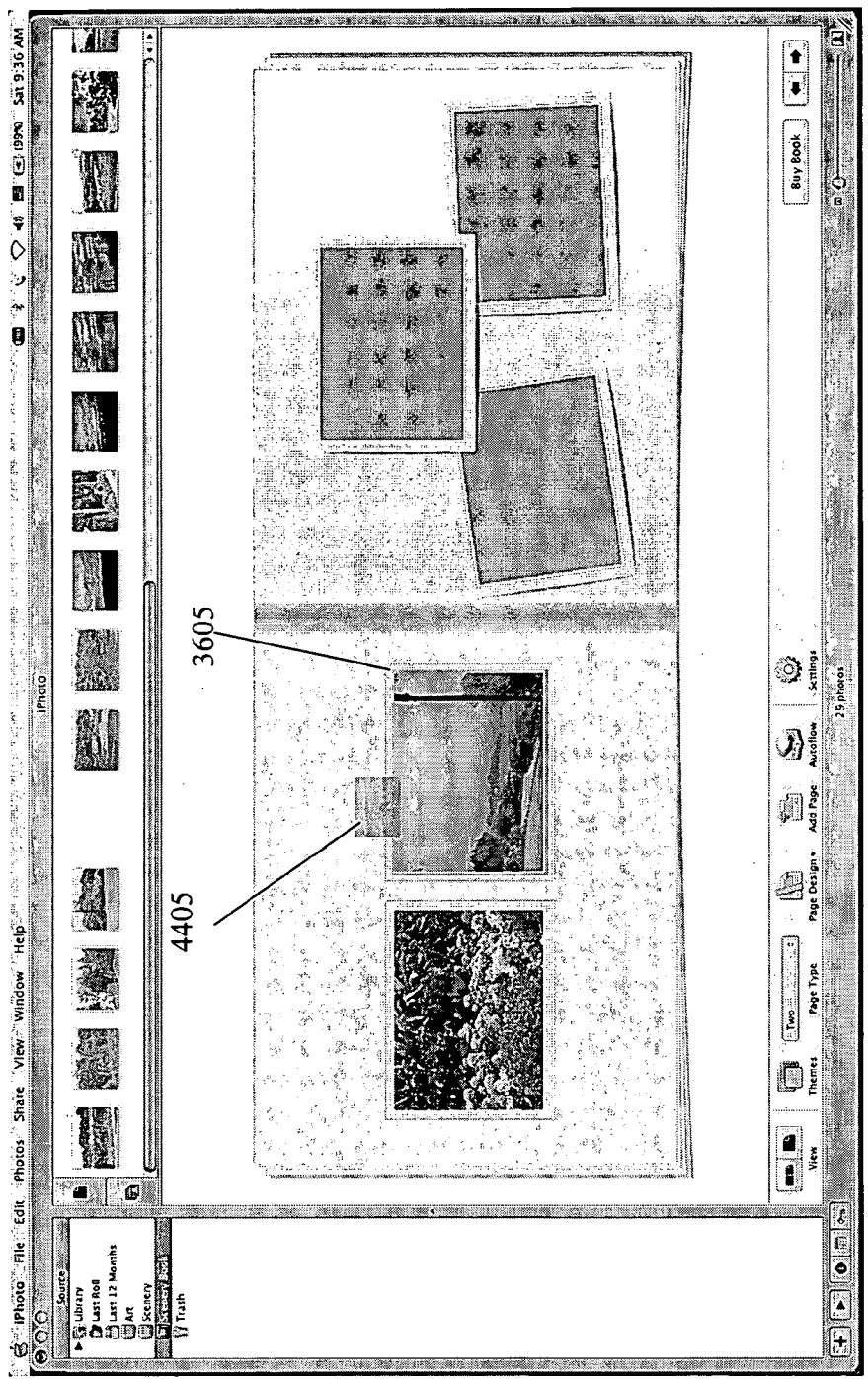
FIG. 44 illustrates removing a picture by dragging and dropping a picture from the thumbnail.
Figure 45:
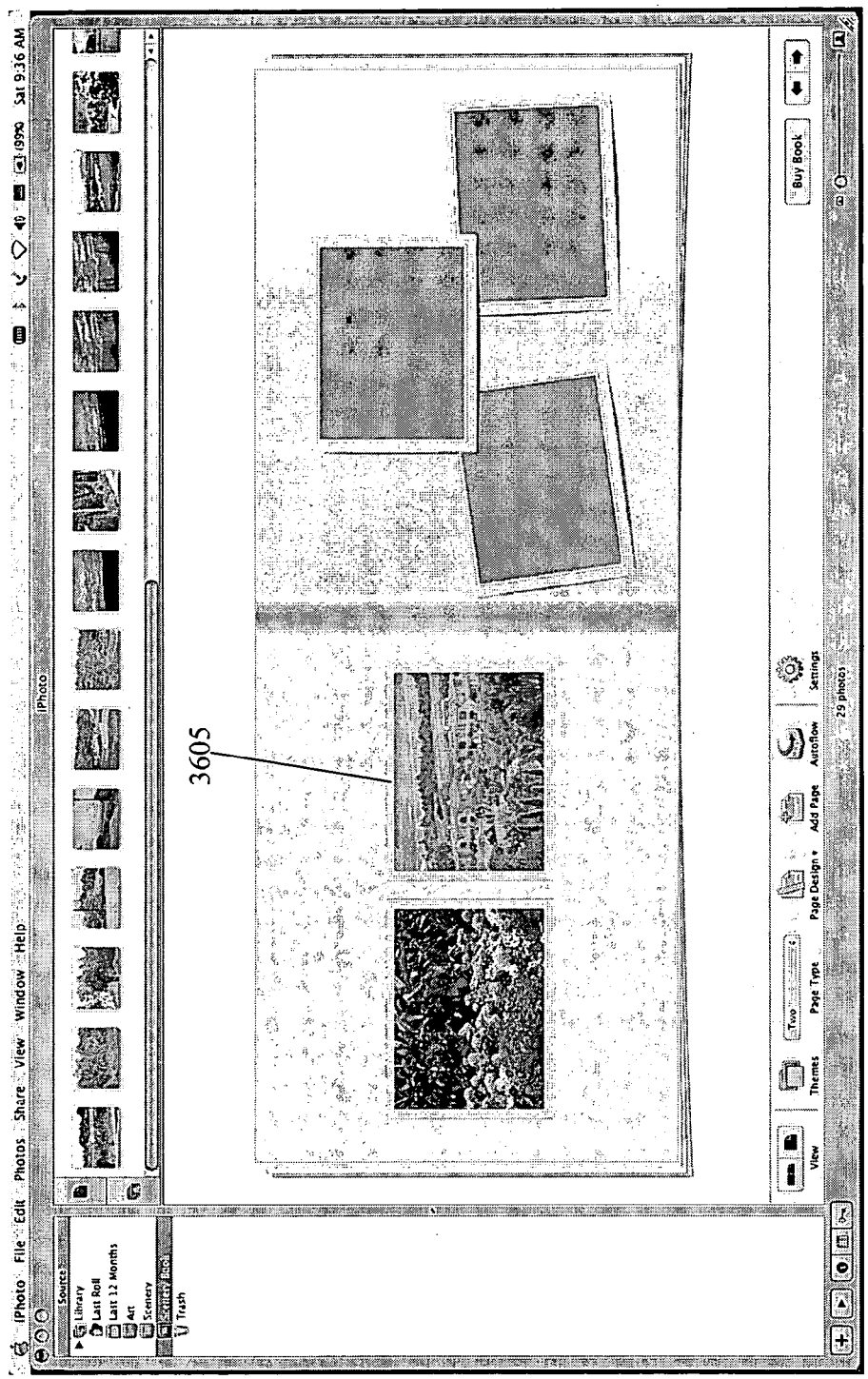
FIG. 45 illustrates that the drag-and-drop operation results in the picture of the dragged thumbnail replacing the picture that was previously in the picture field.

Yet another way of removing a picture without removing a picture field is to drag and drop a thumbnail 4405 of a new picture over the picture field 3605, as illustrated in FIG. 44. FIG. 45 illustrates that this drag-and-drop operation results in the picture of the dragged thumbnail 4405 replacing the picture that was previously in the picture field 3605.

Figure 46:
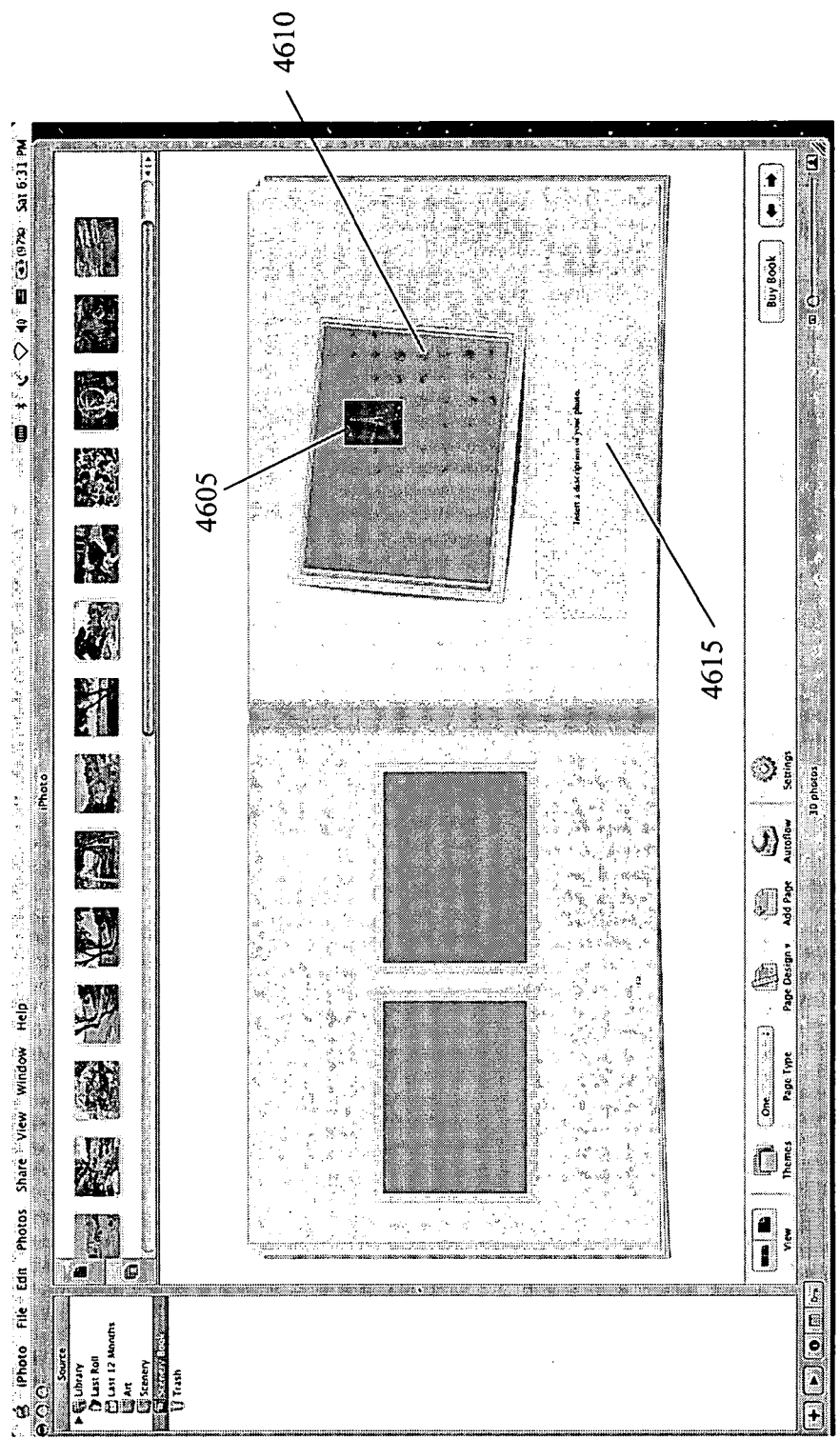
FIG. 46 illustrates an example of dropping the thumbnail of a portrait picture onto a landscape picture field that has a text field below it.
Figure 47:
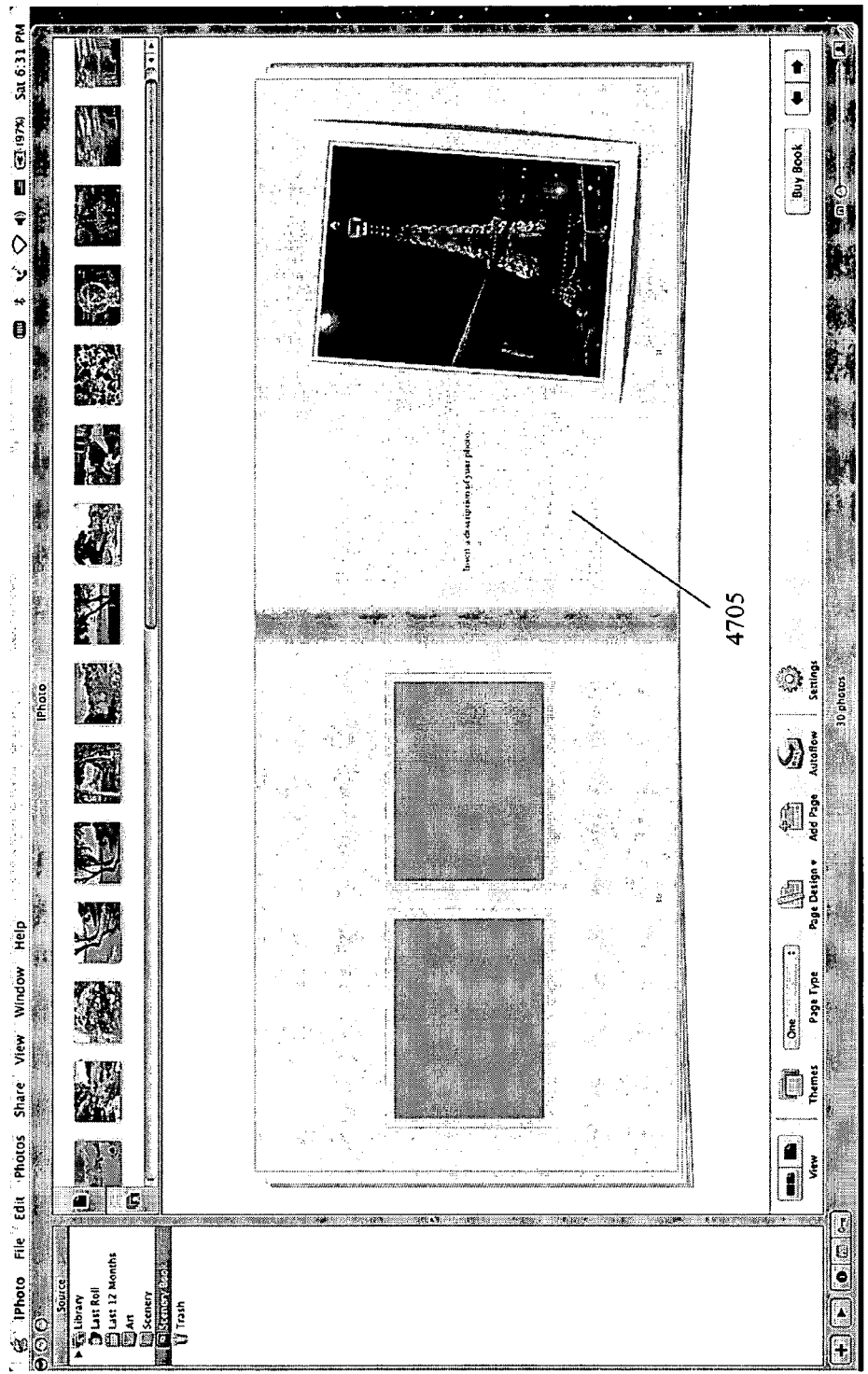
FIG. 47 illustrates that the result is a new picture field that has a portrait orientation with a text field to its left.

When a user inserts a picture having a first orientation in a picture field having a second orientation, some embodiments perform one or more operations in order to maintain the expected aesthetic appeal of the page. For instance, FIG. 46 illustrates an example of dropping the thumbnail 4605 of a portrait picture onto a landscape picture field 4610 that has a text field 4615 below it. FIG. 47 then displays that this results in a new picture field 4705 that has a portrait orientation with a text field 4710 to its left.

Figure 48:
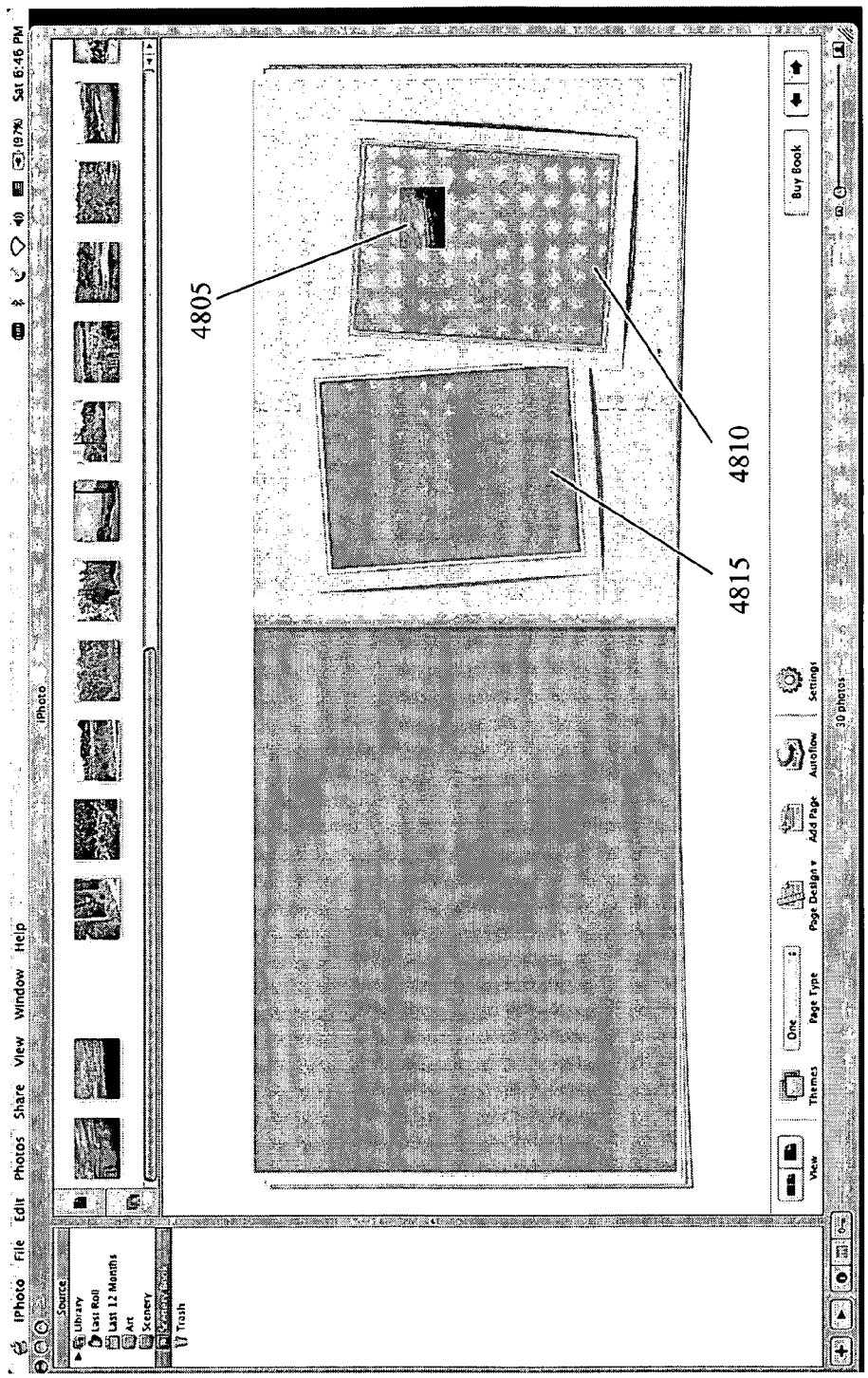
FIG. 48 illustrates an example of dropping the thumbnail of a landscape picture onto a portrait picture field that has another portrait picture field to its left.
Figure 49:
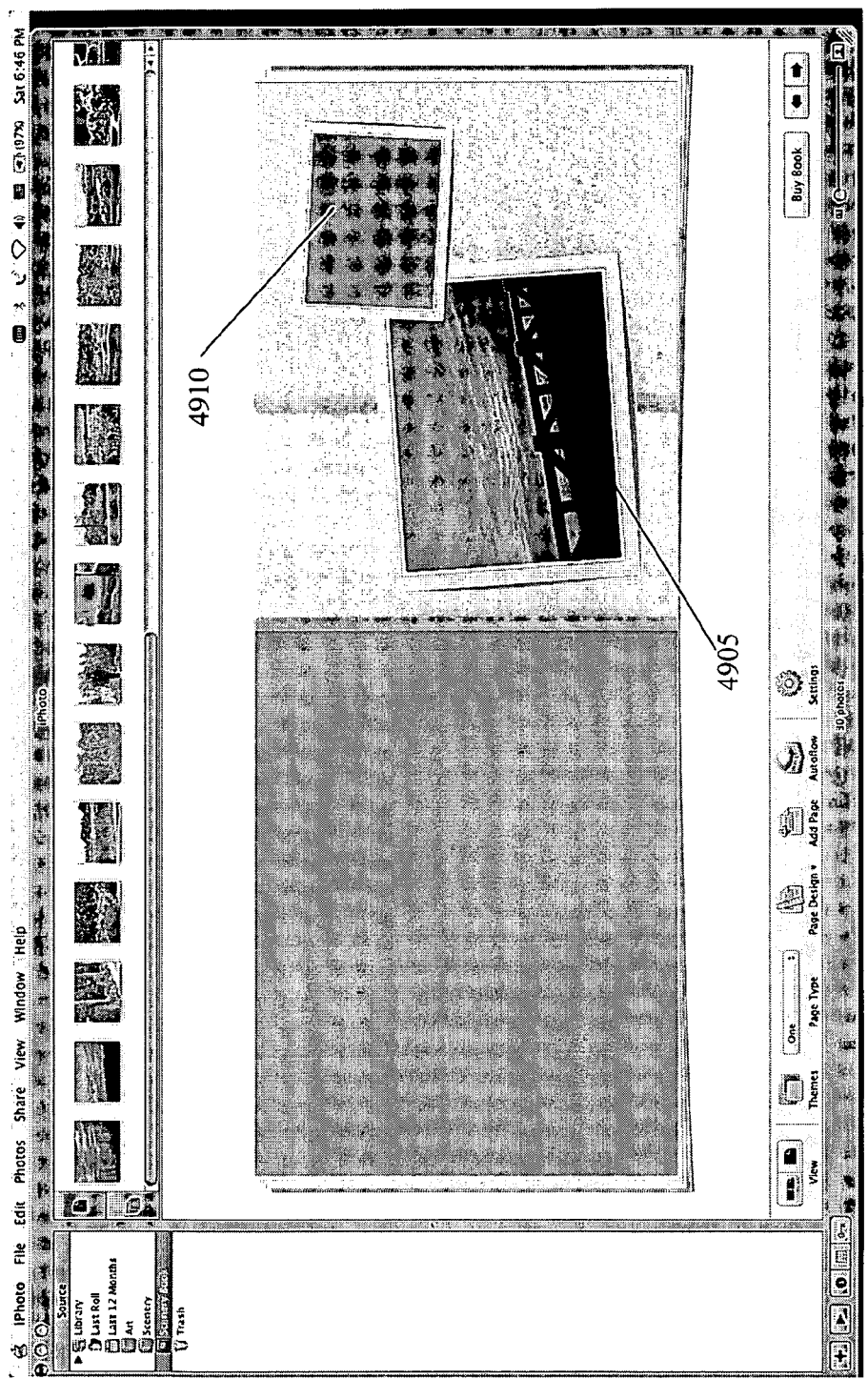
FIG. 49 illustrates the result of a new picture field that has a landscape orientation and that has a smaller landscape picture field on its top right corner.

FIG. 48 illustrates an example of dropping the thumbnail 4805 of a landscape picture onto a portrait picture field 4810 that has another portrait picture field 4815 to its left. FIG. 49 then displays that this results in a new picture field 4905 that has a landscape orientation and that has a smaller landscape picture field 4910 on its top right corner.

Figure 50:
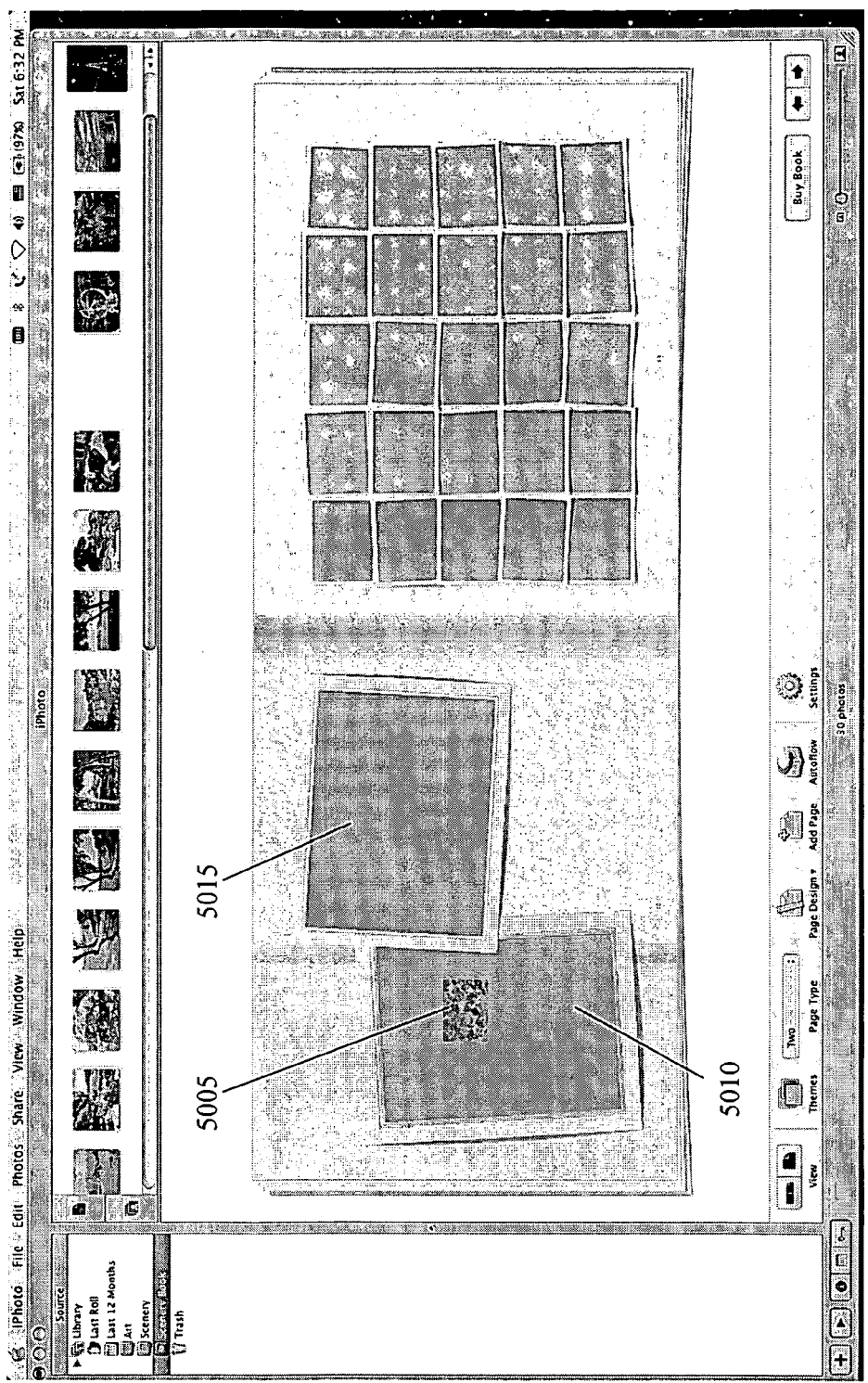
FIG. 50 illustrates an example of dropping the thumbnail of a landscape picture onto a portrait picture field that has another landscape picture field to its right side.
Figure 51:
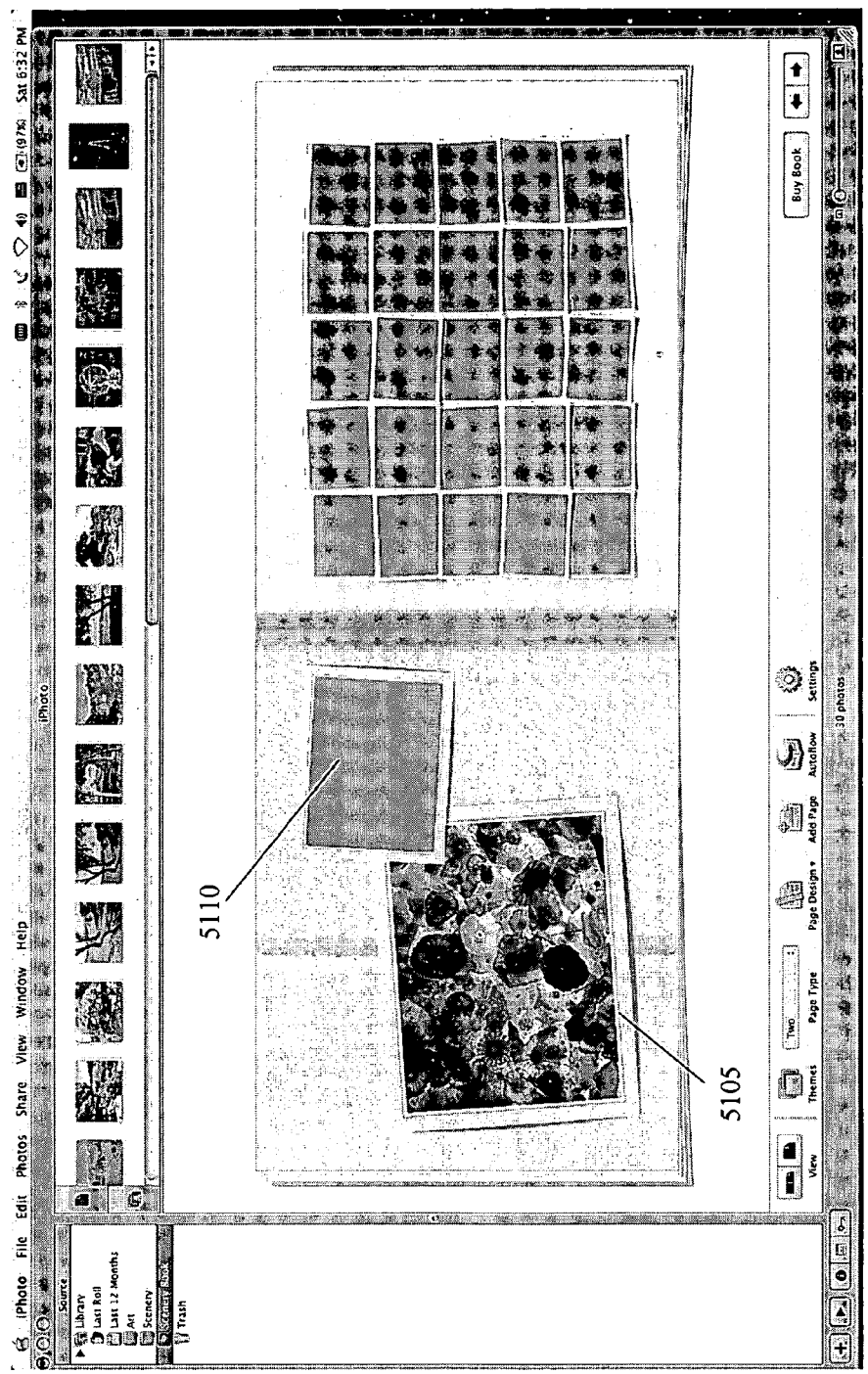
FIG. 51 then displays the result of a new picture field that has a landscape orientation and that has a smaller landscape picture field on its top right corner.

FIG. 50 illustrates an example of dropping the thumbnail 5005 of a landscape picture onto a portrait picture field 5010 that has another landscape picture field 5015 to its right side. FIG. 51 then displays that this results in a new picture field 5105 that has a landscape orientation and that has a smaller landscape picture field 5110 on its top right corner.

In the examples mentioned above, the application tries to maintain the expect aesthetic appeal of the page when a user inserts a picture with one orientation in a picture field with a different orientation by (1) switching to a new picture field with a different orientation that matches the orientation of the picture, (2) switching the position of text field(s) on the page, (3) changing size or orientation of other picture fields on the same page. In other cases, the application might perform other operations, such as (1) showing only a portion of the added picture in the picture field, (2) shrinking the new picture to fit the picture field, (3) placing a colored background in the picture field to smooth the coloring in areas in the picture field that are not covered by the new picture, etc.

VII. Editing Pictures and Picture Fields

Figure 52:
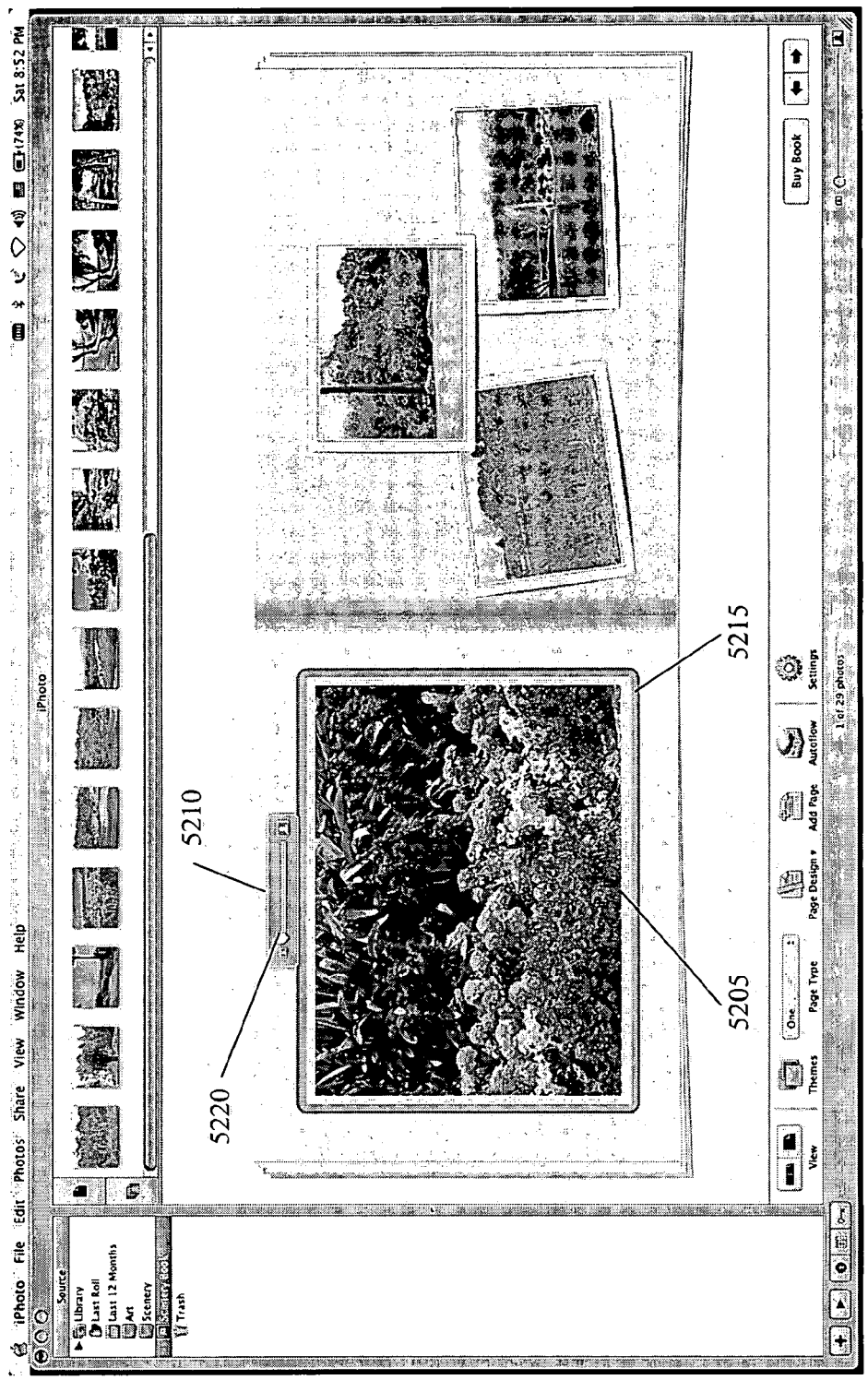
FIG. 52 illustrates that the user first has to select the picture in order to cause a zoom control bar to appear above the picture.
Figure 53:
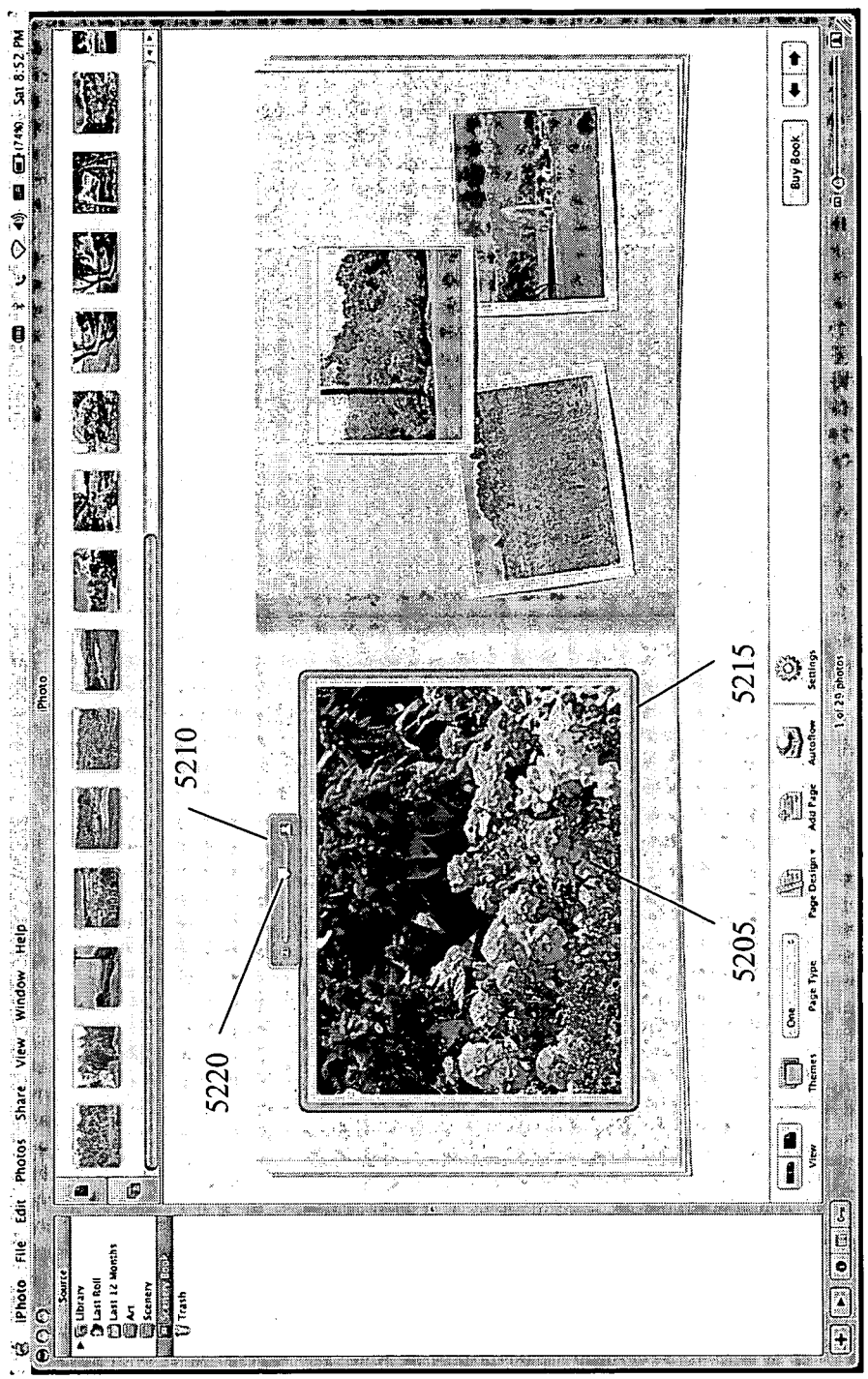
FIG. 53 illustrates the enlarged presentation of the picture in the picture field after the user has dragged the slider across the scroll bar.

Some embodiments also allow a user to edit pictures and picture fields. For instance, in some embodiments, a user can enlarge the presentation of a picture in the picture field. FIGS. 52 and 53 illustrate how some embodiments allow the user to enlarge the presentation of a picture. FIG. 52 illustrates that the user first has to select the picture 5205 (e.g., by clicking on the picture) in order to cause a zoom control bar 5210 to appear above the picture. The user can then adjust the size of the presentation of the picture 5205 in the picture field 5215 by moving a slider 5220 across the scroll bar 5210. FIG. 53 illustrates the enlarged presentation of the picture 5205 in the picture field 5215 after the user has dragged the slider 5220 across the scroll bar 5210.

Figure 54:
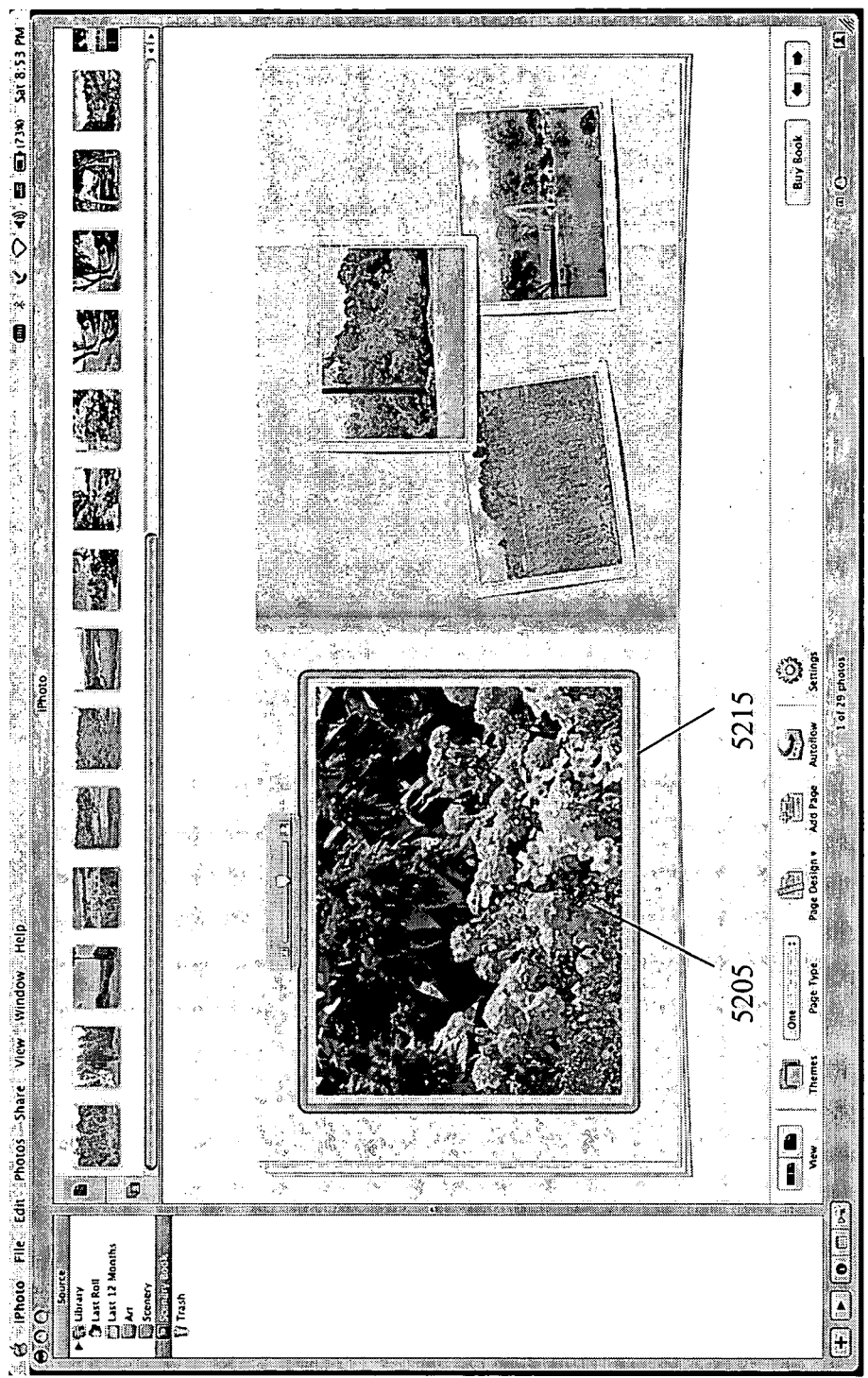
FIG. 54 illustrates moving a picture in a picture field.

When the presentation of the picture is bigger than the picture field, a portion of the picture is not displayed in the picture field. In such a situation, some embodiments allow the user to move the picture in the picture field to show the portion of the picture that the user want to appear in the picture field. The user can move the picture in some embodiments by selecting the picture (e.g., by clicking on it), and then performing a click-and-drag operation on the picture. For instance, in the example illustrated in FIG. 53, the picture 5205 is selected based on the zooming operation that was described above. Hence, to move the picture, the user presses and holds a cursor controller button when the cursor is on top of the picture 5205 and then moves the cursor while still holding the cursor controller button. This operation results in the moving of the picture 5205 in the picture field 5215, as shown in FIG. 54.

Figure 55:
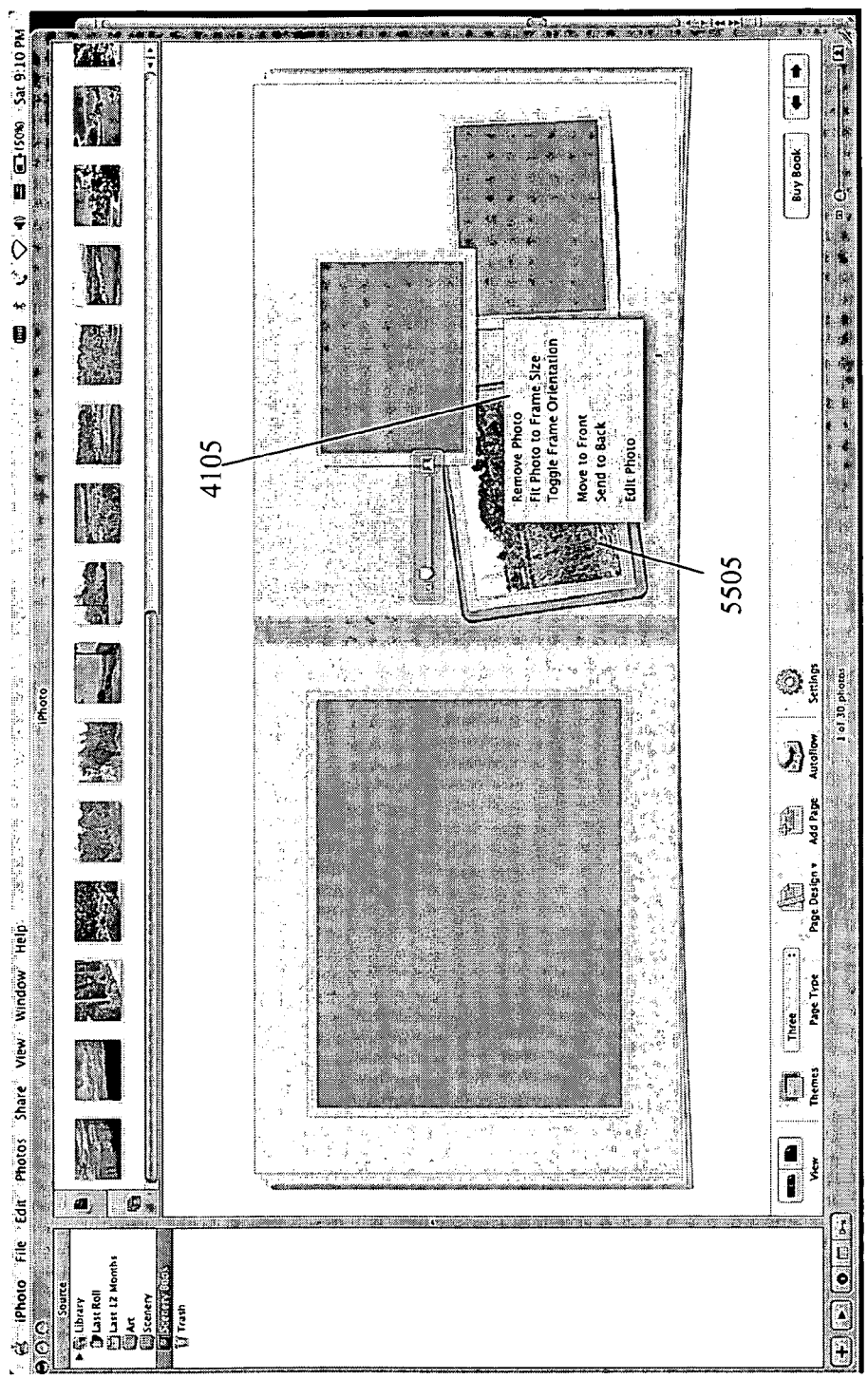
FIG. 55 illustrates the opening of the command window over a picture.
Figure 56:
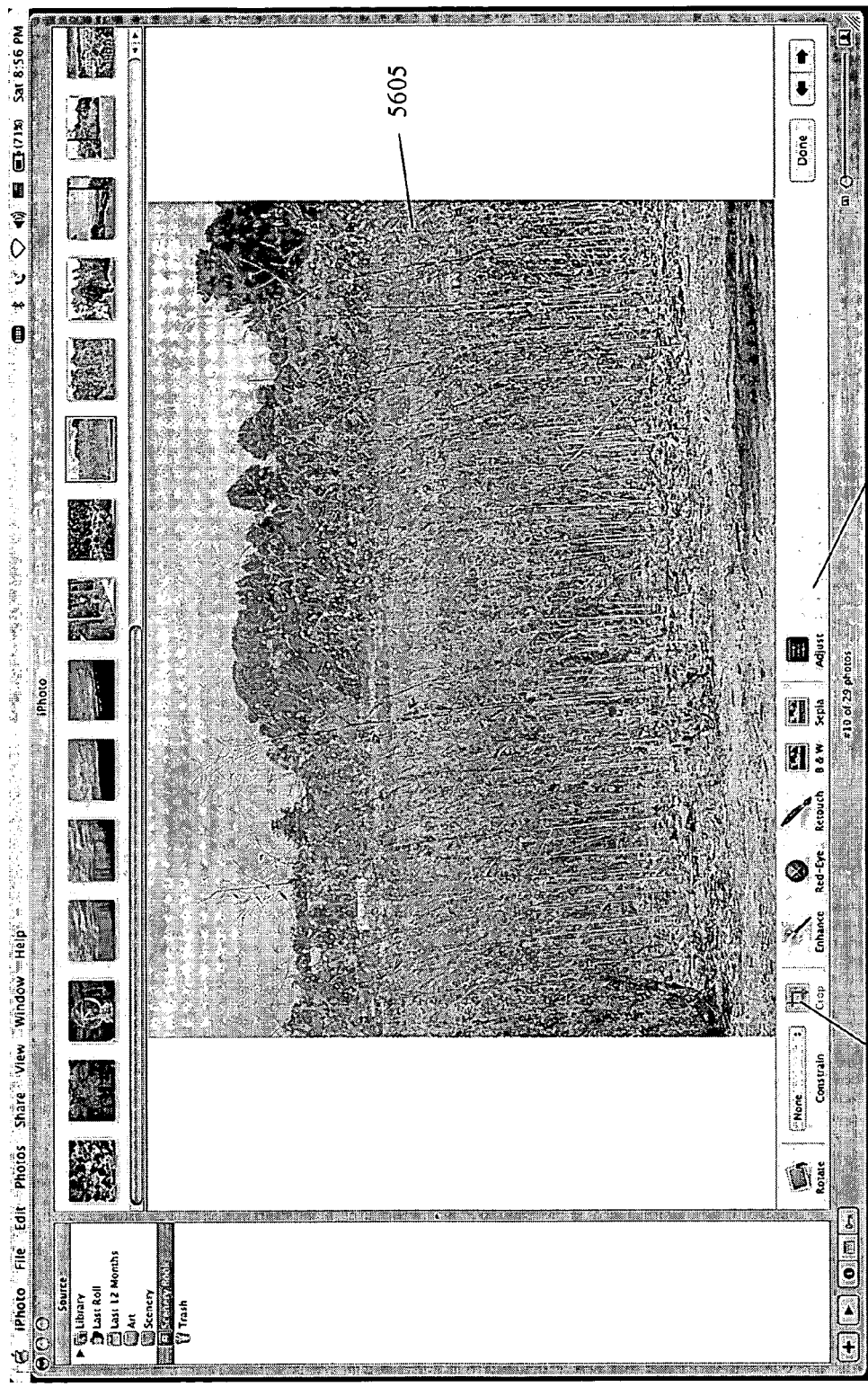
FIG. 56 illustrates that the edited-image window displays the picture that is being edited, while the image-edit-tools section includes icons for several edit commands.

The user can also initiate the editing of a picture while designing a photo book. To do this, the user can select the edit option in a command window 4105 that the user can open on top of the picture (e.g., by performing a control-click or right-hand click operation while the cursor is the selected picture). FIG. 55 illustrates the opening of the command window 4105 over the picture 5505. After this selection, the user can select the edit option. Such a selection replaces the photo-album display section 910 and the edit-control section 920 in the application's GUI display with edited-image window 5605 and image-edit-tools section 5610, as shown in FIG. 56. As shown in this figure, the edited-image window 5605 displays the picture that is being edited, while the image-edit-tools section 5610 includes icons for several edit commands.

Figure 57:
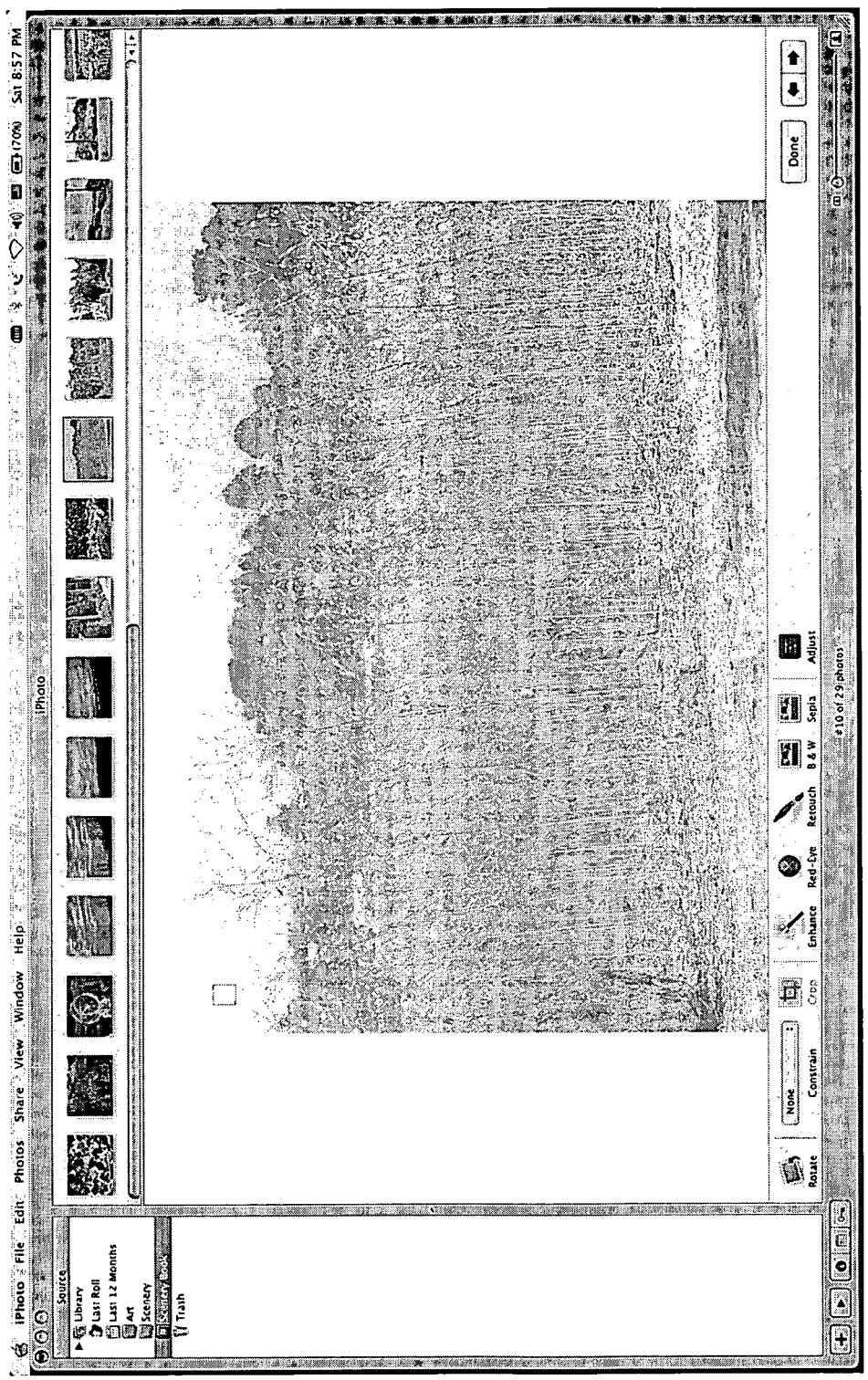
FIG. 57 illustrates the start of a cropping operation that is initiated after the user selects the crop icon.
Figure 58:
FIG. 58 illustrates the end of the cropping operation.
Figure 59:
FIG. 59 illustrates the resulting cropped picture in the window.

FIGS. 57-59 illustrate one example of an edit operation. Specifically, FIG. 57 illustrates the start of a cropping operation that is initiated after the user selects the crop icon 5620. FIG. 58 illustrates the end of the cropping operation, while FIG. 59 illustrates the resulting cropped picture in the window 5605. After the user has finished editing an image, the user can return the edited image to its picture field (i.e., can replace the edited-image window 5605 and image-edit-tools section 5610 in the application's GUI display with the photo-album display section 910 and the edit-control section 920) by double-clicking on the window 5605.

Figure 60:
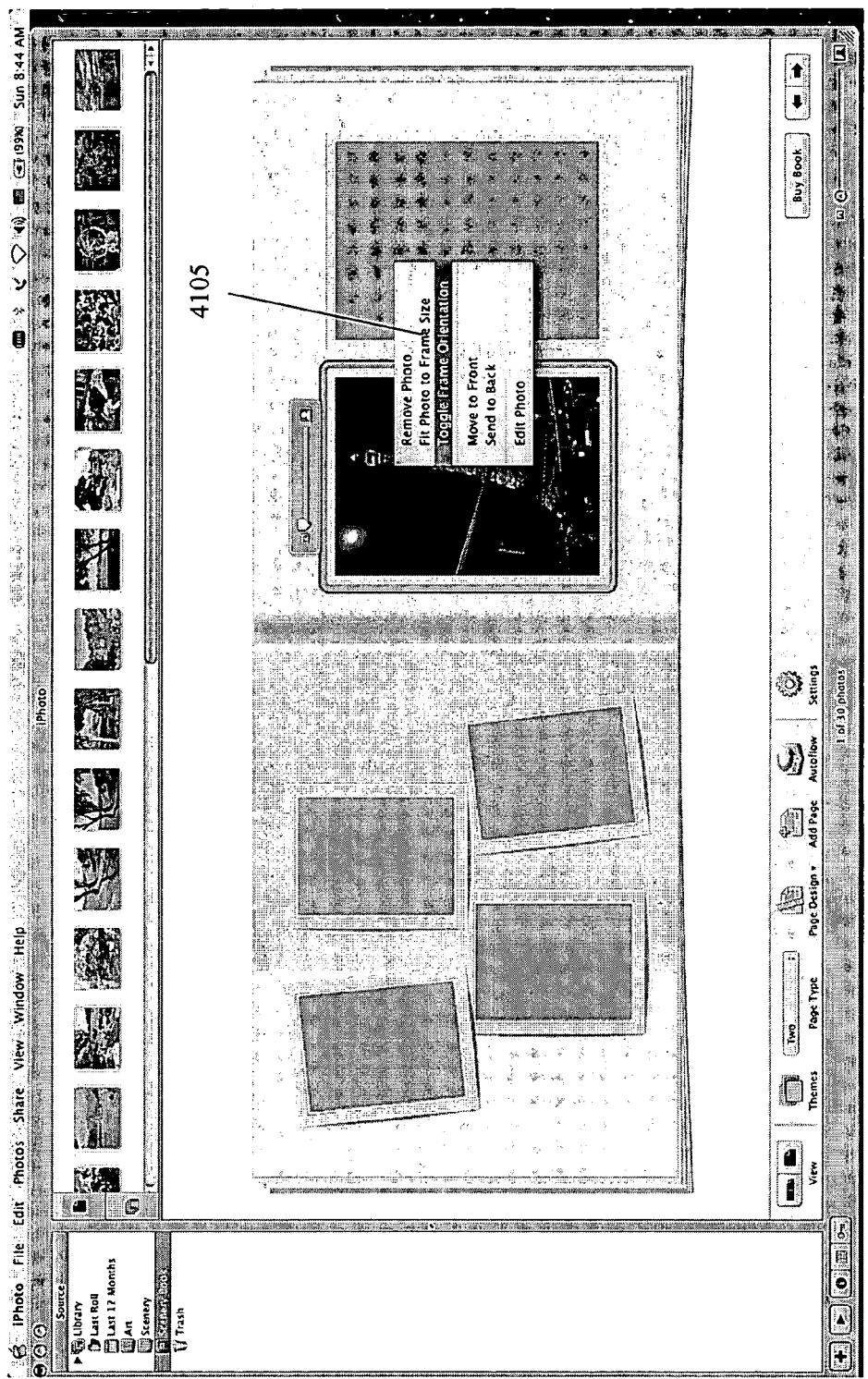
FIG. 60 illustrates that the user can also toggle the orientation of a picture field.
Figure 61:
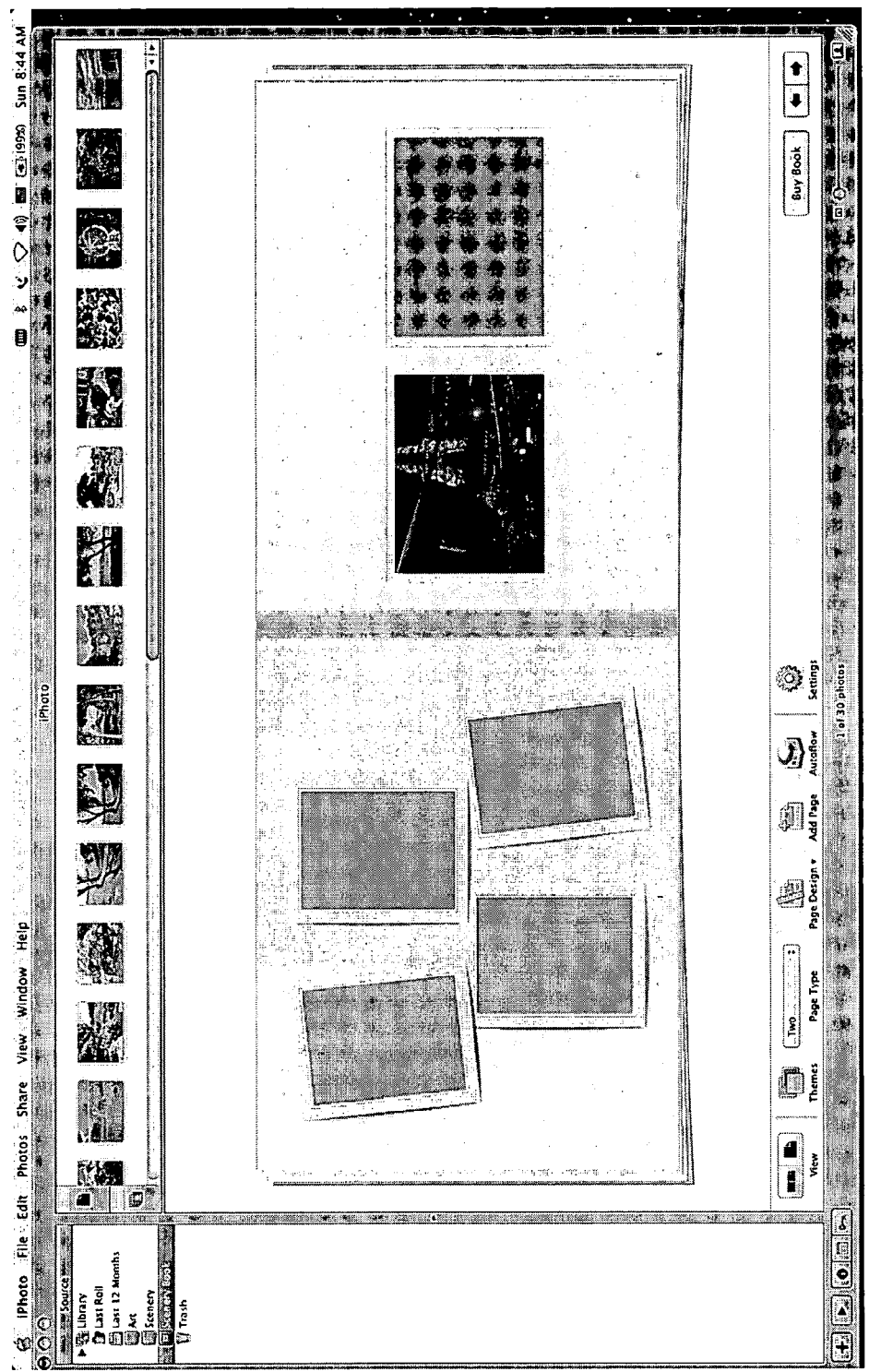
FIG. 61 also illustrates that the user can also toggle the orientation of a picture field.
Figure 62:
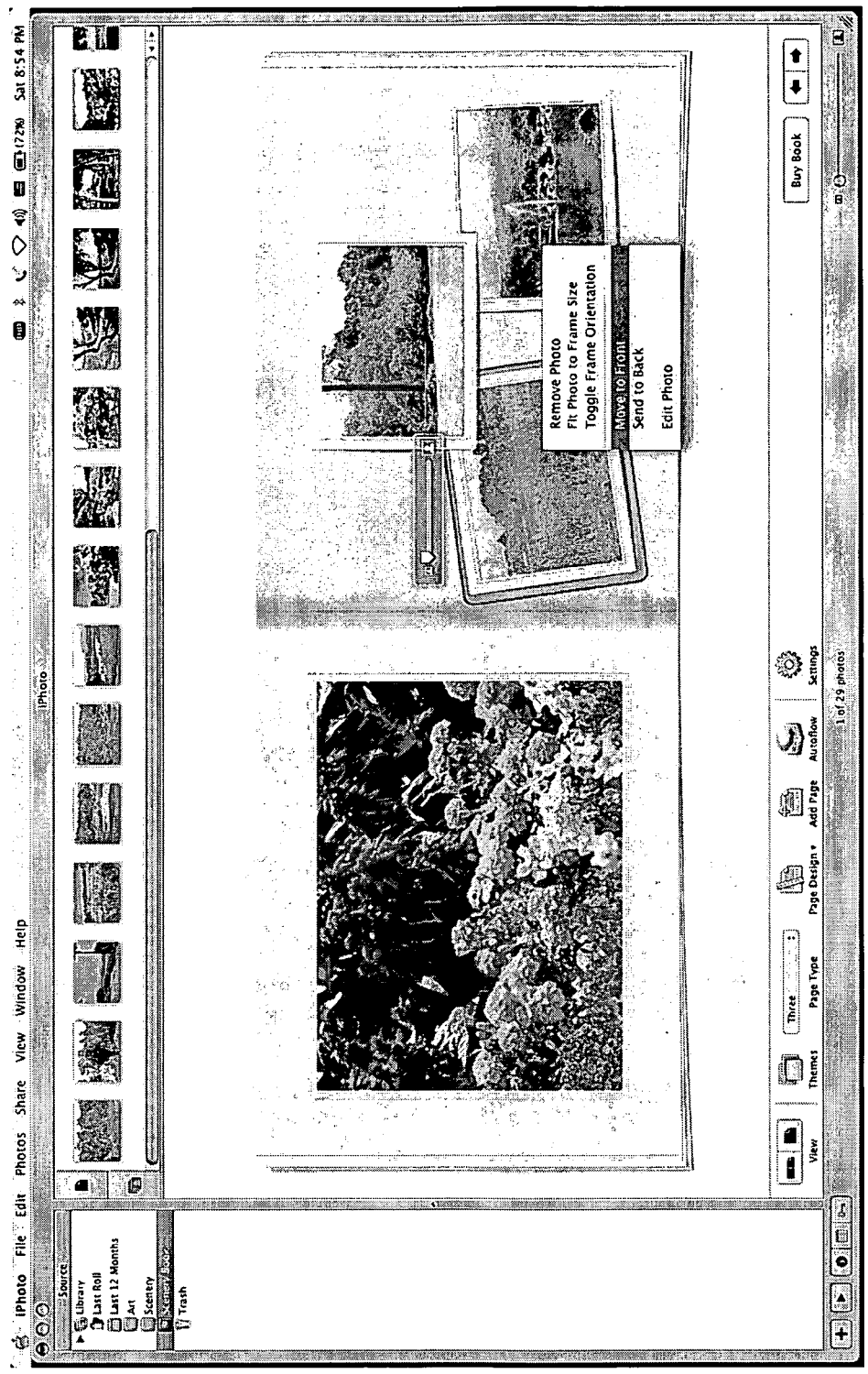
FIG. 62 illustrates that the user can move one picture field in front of another.
Figure 63:
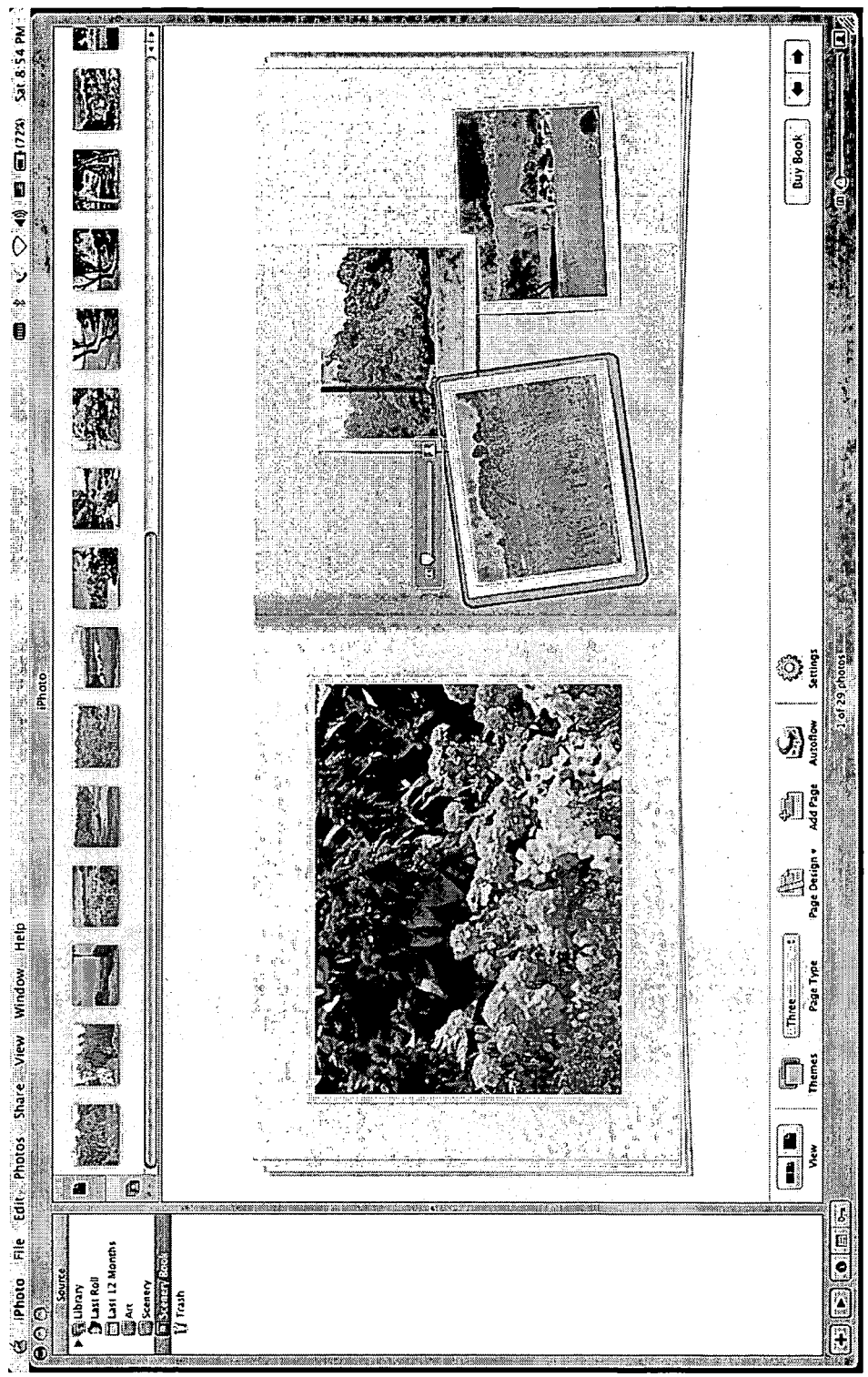
FIG. 63 also illustrates that the user can move one picture field in front of another.
Figure 64:
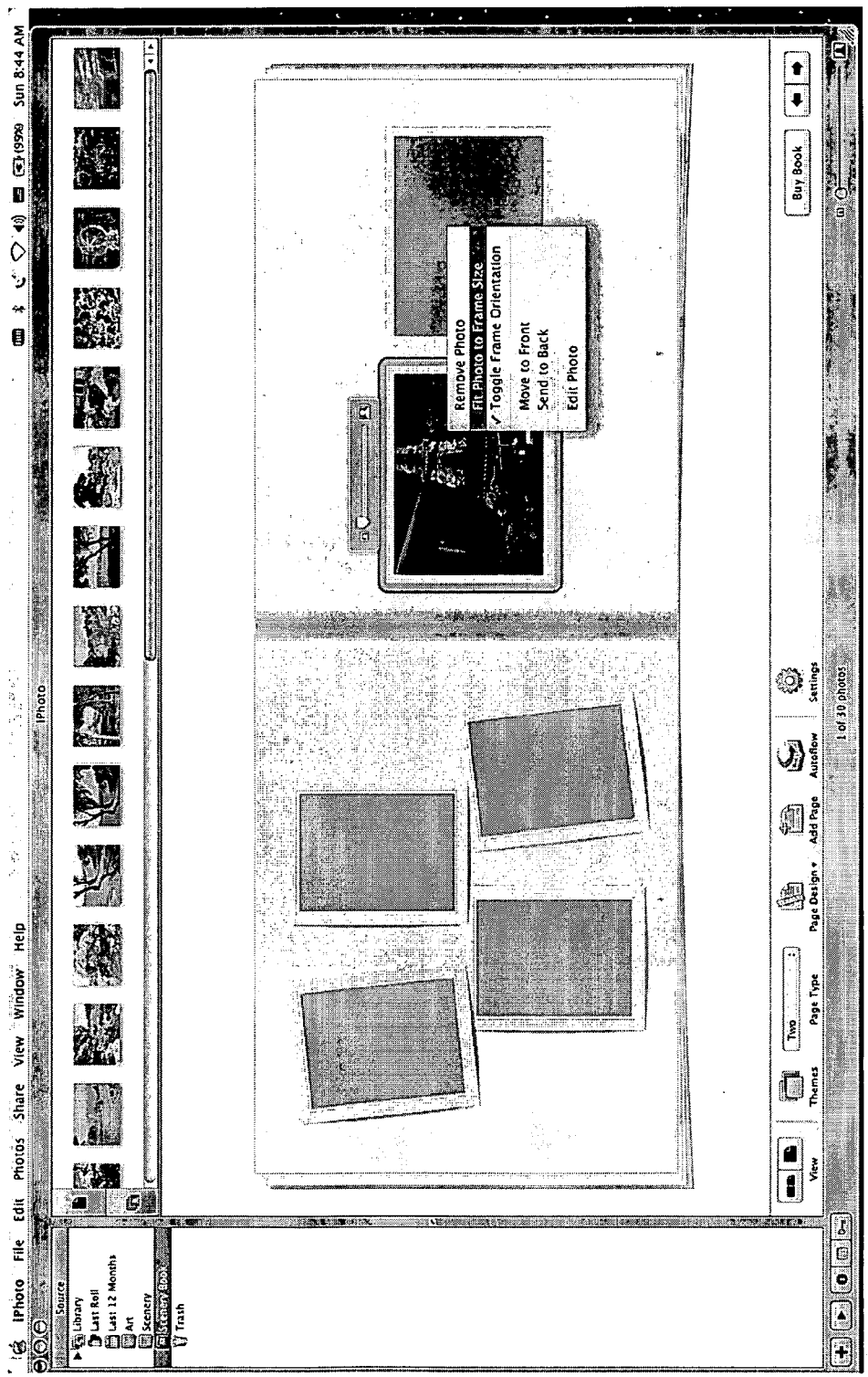
FIG. 64 illustrates that the user can present a picture that fits the size of a picture field.
Figure 65:
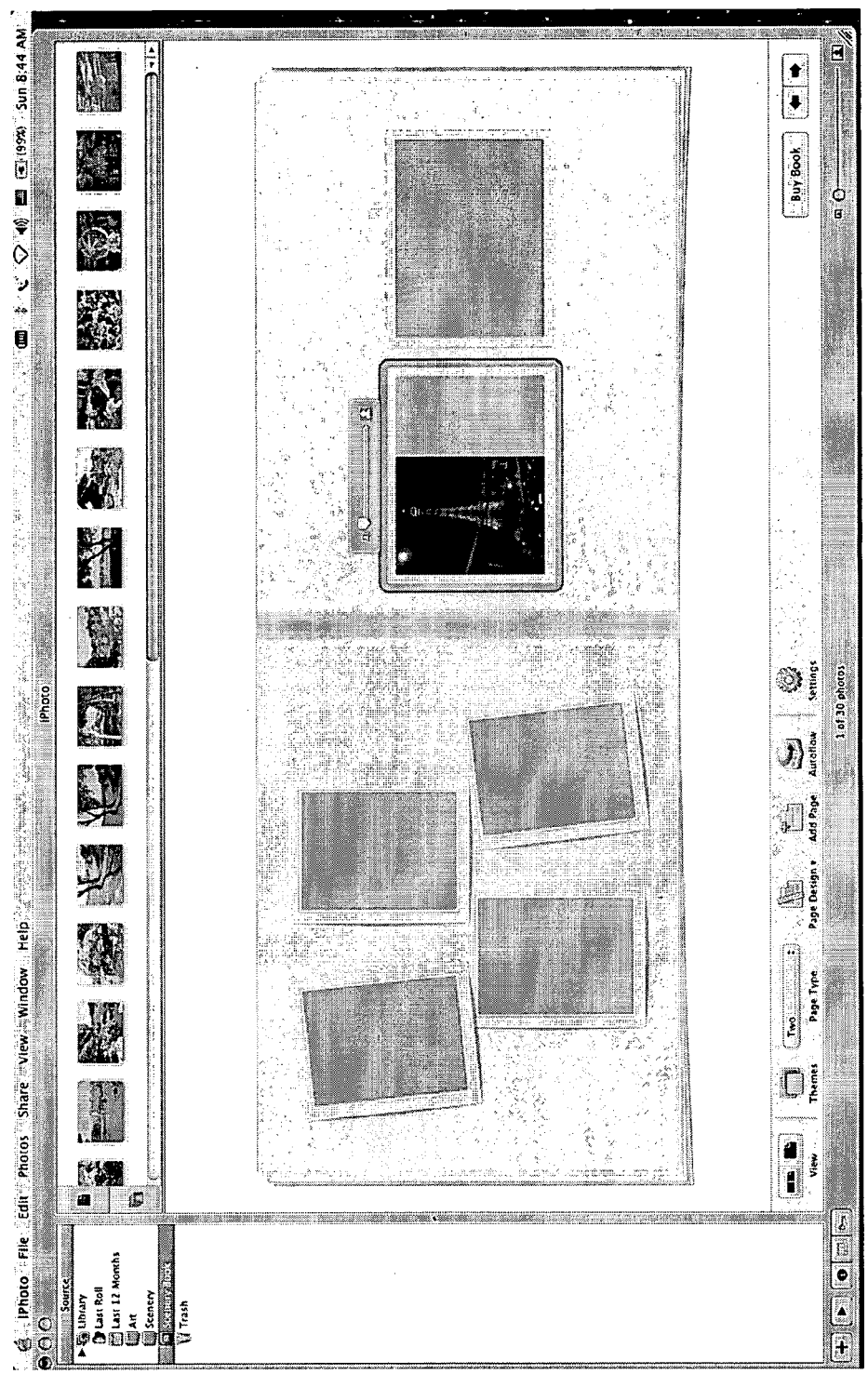
FIG. 65 also illustrates that the user can present a picture that fits the size of a picture field.

Through the command window 4105, the user can also (1) toggle the orientation of a picture field, as shown in FIGS. 60 and 61, (2) move one picture field in front of another, as shown in FIGS. 62 and 63, and (3) have the presentation of a picture fit the size of a picture field, as shown in FIGS. 64 and 65.

VIII. Automatic Insertion of Pictures

As illustrated in FIG. 8, the application provides the user with the option of manually inserting pictures in a selected photo book or having the application automatically insert these pictures in the selected photo book, after the user selects a photo book theme. If the user selects the automatic option, the application automatically inserts the picture in the picture fields of the photo book. After this automatic insertion, the user, however, is free to change the placement of the pictures, the orientation of the picture fields, the design of the photo book, etc.

As shown in FIG. 9, the book-edit-control section 920 also includes an auto flow icon 992. When the user selects this icon, the application automatically inserts any unplaced picture identified in the preview window 905 in the unused picture fields in the photo book. Also, as shown in FIG. 31, the command window 3105 includes a clean-up book command. When the user selects this command, the application performs one or more clean up operations to organize the photo book. Examples of these operations include removing unused picture fields in the photo book, removing unused pages of the photo book, etc. Different embodiments perform different clean up operations and different combinations of clean up operations.

IX. Changing Themes

Figure 66:
FIG. 66 illustrates the user's selection of the Theme icon while viewing a photo book that is based on the Watercolor theme.
Figure 67:
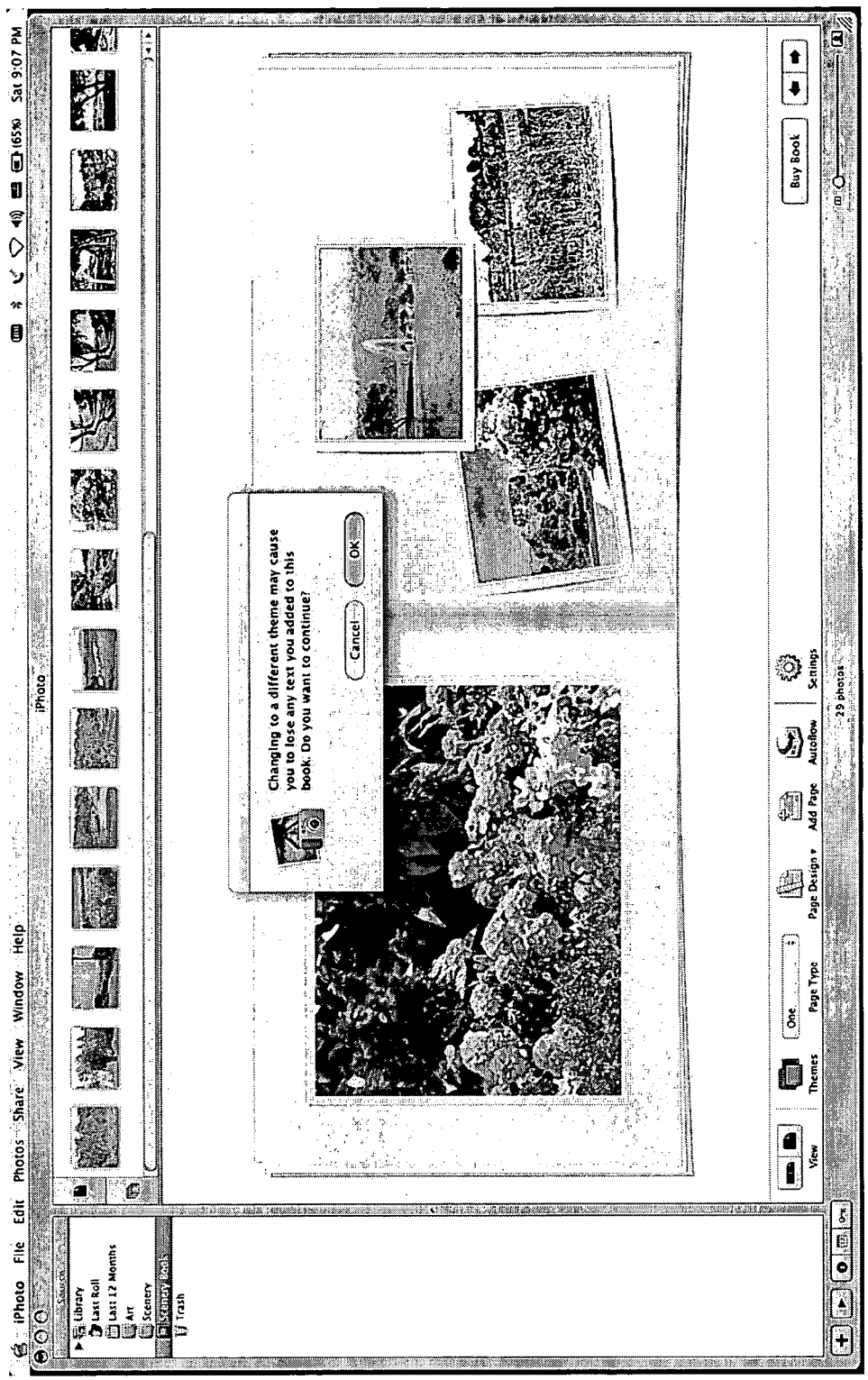
FIG. 67 then illustrates a warning that the user is presented after selecting the Theme icon.

Through a Theme selection icon 994 in the control section 920, some embodiments also allow a user to change the theme of a photo book after creating the photo book based on another theme. FIGS. 66-70 illustrate an example of a user changing the theme of a photo book. Specifically, FIG. 66 illustrates the user's selection of the Theme icon 994 while viewing a photo book that is based on the Watercolor theme. FIG. 67 then illustrates a warning that the user is presented after selecting the Theme icon 994. This warning informs the user that changing to a different theme may result in the loss of added text and request confirmation from the user whether to continue.

Figure 68:
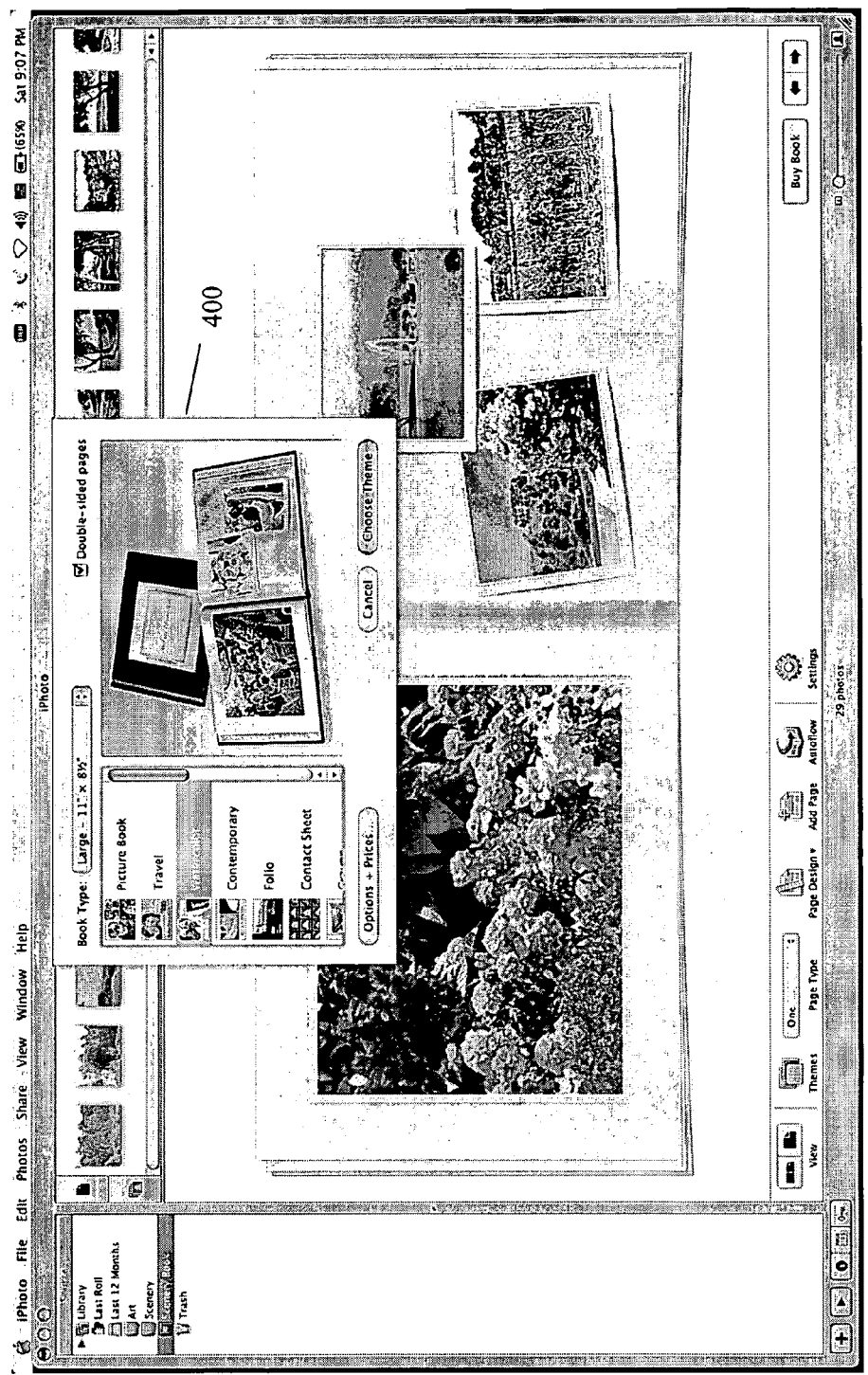
FIG. 68 illustrates that when the user confirms that he or she wishes to continue, the user is presented with the theme window.
Figure 69:
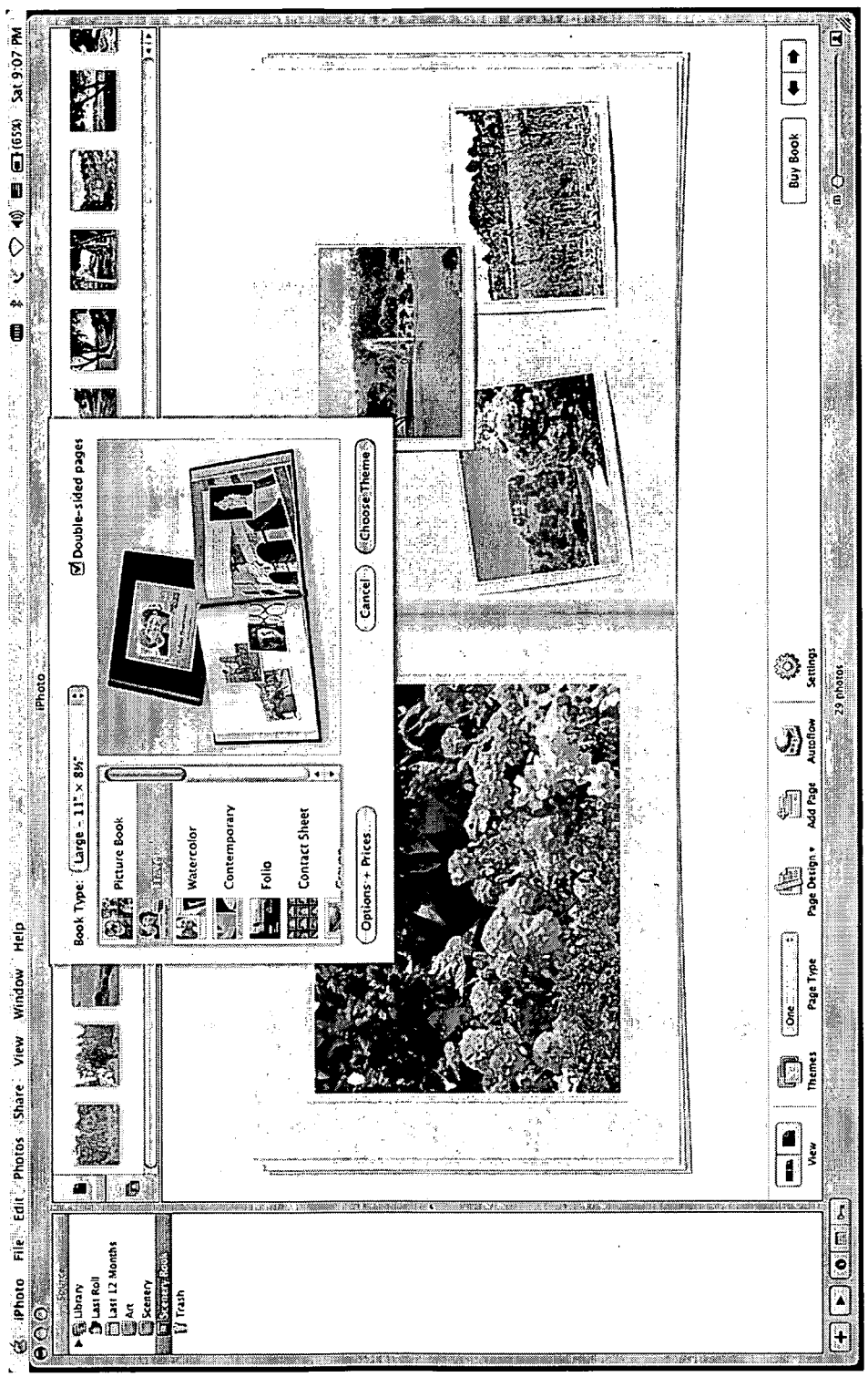
FIG. 69 illustrates the user selecting a different theme, which in this case is the Travel theme.
Figure 70:
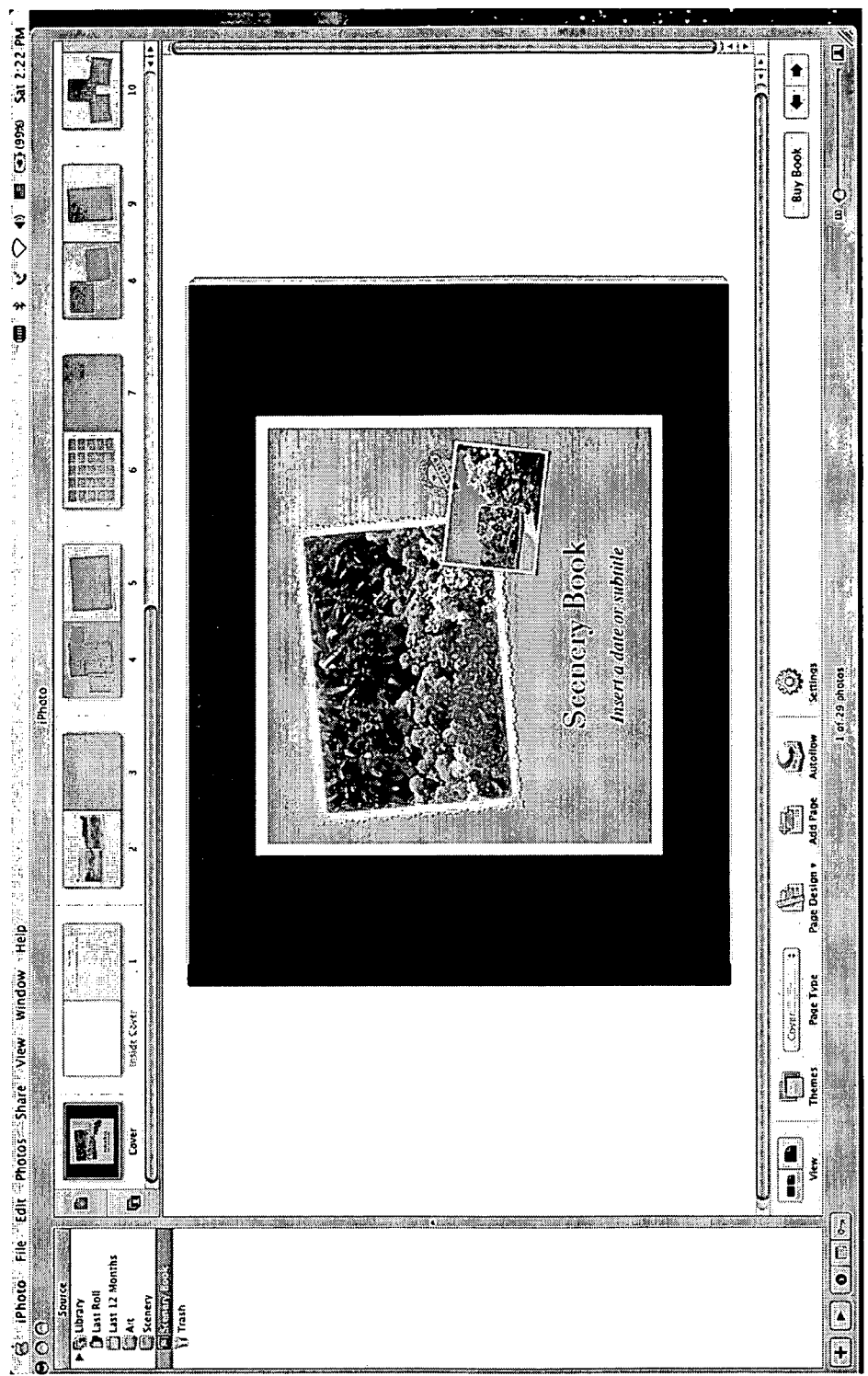
FIG. 70 illustrates the user being presented with a photo book that is based on the travel theme.

When the user confirms that he or she wishes to continue, the user is presented with the theme window 400 illustrated in FIG. 68. As mentioned above, the window 400 lists the available themes and provides a preview of each theme selected in the list. When this window opens, the selected theme in the list is the current theme and the preview provided is the preview of the current theme. FIG. 69 illustrate the user selecting a different theme, which in this case is the Travel theme. Finally, FIG. 70 illustrates the user being presented with a photo book that is based on the travel theme.

Once the user has completed designing the photo book and inserting pictures in the photo book, the user can order the photo book through an online transaction that is initiated by selecting a Buy Book command icon 996 in the control section 920.

X. Exemplary Flow of Potential Interactions

Figure 71:
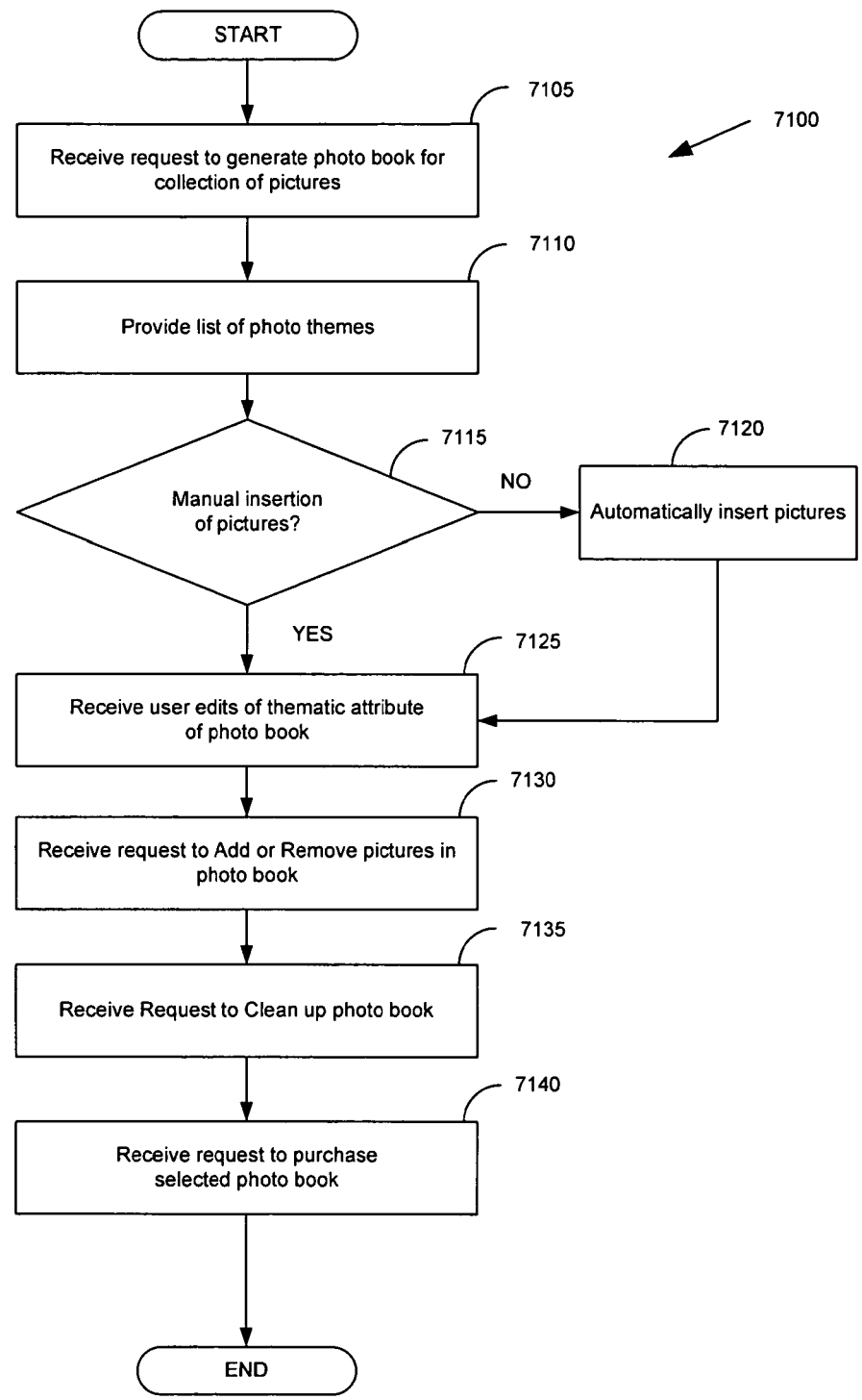
FIG. 71 conceptually illustrates a process that represents an exemplary flow of interactions between the user and the photo editing and organizing application of some embodiments of the invention.

FIG. 71 conceptually illustrates a process that represents an exemplary flow of interactions between the user and the photo editing and organizing application of some embodiments of the invention. The flow represents some of the ways in which the user can use the application to generate a photo book. However, the user may follow other sequence of operations in interacting with the application to generate a photo book.

As shown in this figure, the process 7100 initially receives (at 7105) a request to generate a photo book for a collection of pictures. Next, the process provides (at 7110) the user with a list of available photo book themes that the user can explore. The process then receives (at 7112) the user's selection of a photo book.

Next, the process 7100 asks (at 7115) the user whether the user wishes to manually insert the collection of pictures selected at 7105. If not, the process 7100 automatically inserts (at 7120) the collection of pictures in the selected photo book and transitions to 7125. However, when the process 7100 determines (at 7115) that the collection of pictures will be manually inserted in the selected photo book, the process 7100 transitions to 7125 from 7115.

At 7125, the process receives from the user edits of the thematic attribute of the photo book. Based on these received edits, the process edits the photo book. Next, at 7130, the process 7100 receives from the user (1) requests to add and remove pictures to the photo book and (2) requests to edit the pictures and the photo book.

After the editing operations at 7130, the process 7100 receives (at 7135) a request from the user to clean up the remainder of the photo book (e.g., to take out unused pages and move up the pictures, if necessary). A clean up operation might be required if during the course of editing (e.g., adding, removing, moving) the pictures, space in the photo book that was originally designed for a picture is empty. In such a case, during the clean up operation, the process 7100 edits the photo book to remove all such empty spaces. For instance, if a page of the photo book includes three spaces for pictures and only two pictures are inserted in that page, the process 7100 would edit that particular page to provide space for only two pictures.

After the clean up operations at 7135, the process 7100 receives (at 7140) a request from the user to purchase the selected photo book. The process facilitates this purchase through an online transaction (e.g., a transaction through the Internet). After this transaction, the process ends.

XI. Computer System

Figure 72:
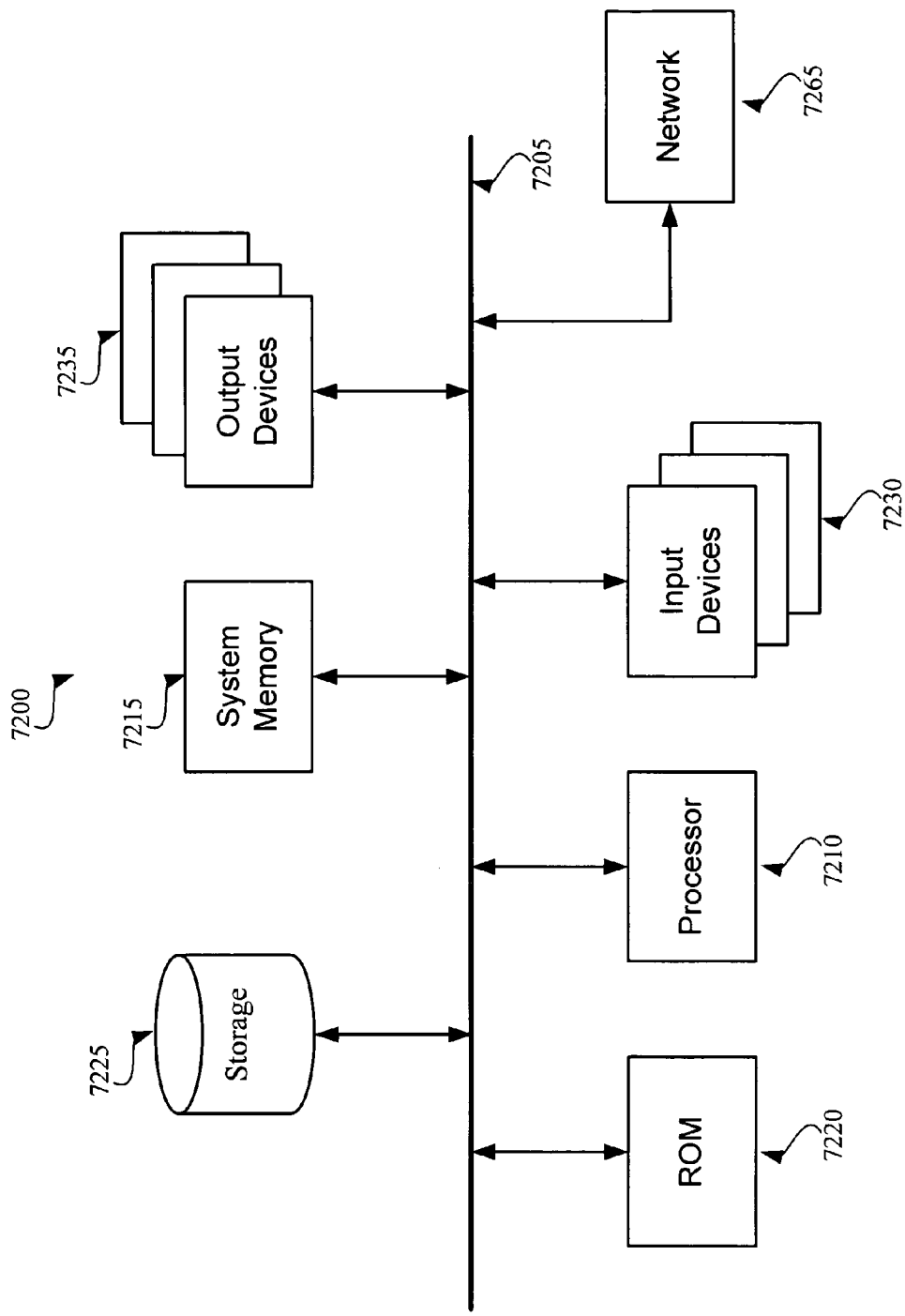
FIG. 72 conceptually illustrates a computer system with which some embodiments of the invention is implemented.

FIG. 72 conceptually illustrates a computer system with which some embodiments of the invention are implemented. Computer system 7200 includes a bus 7205, a processor 7210, a system memory 7215, a read-only memory 7220, a permanent storage device 7225, input devices 7230, and output devices 7235.

The bus 7205 collectively represents all system, peripheral, and chipset buses that support communication among internal devices of the computer system 7200. For instance, the bus 7205 communicatively connects the processor 7210 with the read-only memory 7220, the system memory 7215, and the permanent storage device 7225.

From these various memory units, the processor 7210 retrieves instructions to execute and data to process in order to execute the processes of the invention. The read-only-memory (ROM) 7220 stores static data and instructions that are needed by the processor 7210 and other modules of the computer system. The permanent storage device 7225, on the other hand, is a read-and-write memory device. This device is a non-volatile memory unit that stores instruction and data even when the computer system 7200 is off. Some embodiments of the invention use a mass-storage device (such as a magnetic or optical disk and its corresponding disk drive) as the permanent storage device 7225. Other embodiments use a removable storage device (such as a floppy disk or Zip® disk, and its corresponding disk drive) as the permanent storage device.

Like the permanent storage device 7225, the system memory 7215 is a read-and-write memory device. However, unlike storage device 7225, the system memory is a volatile read-and-write memory, such as a random access memory. The system memory stores some of the instructions and data that the processor needs at runtime. In some embodiments, the invention's processes are stored in the system memory 7215, the permanent storage device 7225, and/or the read-only memory 7220.

The bus 7205 also connects to the input and output devices 7230 and 7235. The input devices enable the user to communicate information and select commands to the computer system. The input devices 7230 include alphanumeric keyboards and cursor-controllers. The output devices 7235 display images generated by the computer system. The output devices include printers and display devices, such as cathode ray tubes (CRT) or liquid crystal displays (LCD).

Finally, as shown in FIG. 72, bus 7205 also couples computer 7200 to a network 7265 through a network adapter (not shown). In this manner, the computer can be a part of a network of computers (such as a local area network ("LAN"), a wide area network ("WAN"), or an Intranet) or a network of networks (such as the Internet). Any or all of the components of computer system 7200 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For instance, in the above description, numerous GUI operations (e.g., click, drag) are described while performing the above method. However, one skilled in the art will realize that other GUI operations may be performed to achieve the same results. Thus, one of ordinary skill in the art will understand that the invention is not to be limited by the foregoing illustrative details, but rather is to be defined by the appended claims.

We claim:

1. A non-transitory readable storage medium storing a program for execution by at least one processing unit, the program comprising sets of instructions for:

displaying a plurality of different selectable photo book themes specifying different photo book layouts for publishing a set of images to different physical photo books;

upon a first selection of a particular photo book theme, displaying a preview of the particular photo book theme;

upon a second selection of the particular photo book theme, displaying a photo book layout based on the particular photo book theme, wherein the photo book layout comprises at least one page for displaying a set of picture fields in a first orientation, each picture field for displaying an image in the first orientation;

replacing a first image displayed by a particular picture field in the first orientation with a second image in a second orientation;

editing the photo book layout by switching the orientation of all picture fields in the set of picture fields from the first orientation to the second orientation in order to accommodate the second image; and transmitting data regarding the photo book layout through the Internet in order to publish a physical photo book based on the photo book layout.

2. The non-transitory readable storage medium of claim 1, wherein the program further comprises sets of instructions for:

receiving, prior to displaying the photo book layout, a selection of a collection of images; and automatically laying out a set of pages of the photo book layout with the images from the collection.

3. The non-transitory readable storage medium of claim 2, wherein the set of instructions for automatically laying out the set of pages comprises a set of instructions for specifying different picture fields for the images in the collection.

4. The non-transitory readable storage medium of claim 1, wherein the program further comprises sets of instructions for:

displaying a question asking whether the set of images should be automatically inserted into pages of the photo book layout; and generating the photo book layout according to the selected photo book theme and a response to the question.

5. The non-transitory readable storage medium of claim 4, wherein the program further comprises a set of instructions for receiving, prior to generating the photo book layout, a selection of the set of images, wherein the set of instructions for generating the photo book layout comprises a set of instructions for automatically inserting the set of images into a set of pages of the photo book layout when the response is to automatically insert the set of images.

6. The non-transitory readable storage medium of claim 4, wherein the program further comprises sets of instructions for:

receiving, prior to generating the photo book layout, a selection of the set of images; and displaying, in a display area, a set of thumbnail images corresponding to the set of images for inserting into the photo book layout when the response is to forego automatic insertion of the set of images.

7. A method comprising:

displaying a plurality of different selectable photo book themes specifying different photo book layouts for publishing a set of images to different physical photo books;

upon a first selection of a particular photo book theme, displaying a preview of the particular photo book theme;

upon a second selection of the particular photo book theme, displaying a photo book layout based on the particular photo book theme, wherein the photo book layout comprises at least one page for displaying a set of picture fields in a first orientation, each picture field for displaying an image in the first orientation;

replacing a first image displayed by a particular picture field in the first orientation with a second image in a second orientation;

editing the photo book layout by switching the orientation of all picture fields in the set of picture fields from the first orientation to the second orientation in order to accommodate the second image; and transmitting data regarding the photo book layout through the Internet in order to publish a physical photo book based on the photo book layout.

8. The method of claim 7 further comprising:
receiving, prior to displaying the photo book layout, a selection of a collection of images; and
automatically laying out a set of pages of the photo book layout with the images from the collection.

9. The method of claim 8, wherein automatically laying out the set of pages comprises specifying different picture fields for the images in the collection.

10. The method of claim 7 further comprising:
displaying a question asking whether the set of images should be automatically inserted into pages of the photo book layout; and
generating the photo book layout according to the selected photo book theme and a response to the question.

11. The method of claim 10, wherein the method further comprises receiving, prior to generating the photo book layout, a selection of the set of images, wherein generating the photo book layout comprises automatically inserting the set of images into a set of pages of the photo book layout when the response is to automatically insert the set of images.

12. The method of claim 10, wherein the method further comprises:
receiving, prior to generating the photo book layout, a selection of the set of images; and
displaying, in a display area, a set of thumbnail images corresponding to the set of images for inserting into the photo book layout when the response is to forego automatic insertion of the set of images.

13. An electronic device comprising:
a set of processing units; and
a non-transitory readable storage medium storing a program for execution by at least one of the processing units, the program comprising sets of instructions for:
displaying a plurality of different selectable photo book themes specifying different photo book layouts for publishing a set of images to different physical photo books;
upon a first selection of a particular photo book theme, displaying a preview of the particular photo book theme;
upon a second selection of the particular photo book theme, displaying a photo book layout based on the particular photo book theme, wherein the photo book layout comprises at least one page for displaying a set of picture fields in a first orientation, each picture field for displaying an image in the first orientation;
replacing a first image displayed by a particular picture field in the first orientation with a second image in a second orientation;
editing the photo book layout by switching the orientation of all picture fields in the set of picture fields from the first orientation to the second orientation in order to accommodate the second image; and
transmitting data regarding the photo book layout through the Internet in order to publish a physical photo book based on the photo book layout.

14. The electronic device of claim 13, wherein the program further comprises sets of instructions for:
receiving, prior to displaying the photo book layout, a selection of a collection of images; and
automatically laying out a set of pages of the photo book layout with the images from the collection.

15. The electronic device of claim 14, wherein the set of instructions for automatically laying out the set of pages comprises a set of instructions for specifying different picture fields for the images in the collection.

16. The electronic device of claim 13, wherein the program further comprises sets of instructions for:
displaying a question asking whether the set of images should be automatically inserted into pages of the photo book layout; and
generating the photo book layout according to the selected photo book theme and a response to the question.

17. The electronic device of claim 16, wherein the program further comprises a set of instructions for receiving, prior to generating the photo book layout, a selection of the set of images, wherein the set of instructions for generating the photo book layout comprises a set of instructions for automatically inserting the set of images into a set of pages of the photo book layout when the response is to automatically insert the set of images.

18. The electronic device of claim 16, wherein the program further comprises sets of instructions for:
receiving, prior to generating the photo book layout, a selection of the set of images; and
displaying, in a display area, a set of thumbnail images corresponding to the set of images for inserting into the photo book layout when the response is to forego automatic insertion of the set of images.

* * * * *